United States Patent [19]

Vanderschel

[11] Patent Number: 4,531,204

[45] Date of Patent: Jul. 23, 1985

[54] COMPUTERIZED TRUCK INSTRUMENTATION SYSTEM

[75] Inventor: David J. Vanderschel, Houston, Tex.

[73] Assignee: Schlumberger Technology Corporation, New York, N.Y.

[21] Appl. No.: 178,859

[22] Filed: Aug. 18, 1980

Related U.S. Application Data

[63] Continuation of Ser. No. 944,462, Sep. 21, 1978, abandoned, which is a continuation of Ser. No. 356,233, May 1, 1973, abandoned.

[30] Foreign Application Priority Data

May 4, 1972 [GB] United Kingdom ............... 20846/72

[51] Int. Cl.³ .......................... G01V 1/40; G01V 1/24
[52] U.S. Cl. ........................ 367/25; 367/34; 364/422
[58] Field of Search ................. 367/25, 34; 181/103, 181/107; 364/422; 346/33 WL; 340/856-858

[56] References Cited

U.S. PATENT DOCUMENTS

| | | | |
|---|---|---|---|
| 3,319,230 | 5/1967 | Oastiel et al. | 364/200 |
| 3,405,389 | 10/1968 | Mosen | 340/87 |
| 3,638,484 | 2/1972 | Fixier | 324/323 |
| 3,639,911 | 2/1972 | Everett et al. | 361/422 |
| 3,641,505 | 2/1972 | Arti et al. | 364/200 |
| 3,665,415 | 5/1972 | Beard et al. | 364/200 |
| 3,689,876 | 9/1972 | Kampberg | 364/422 |
| 3,719,930 | 3/1973 | Hor | 364/200 |
| 3,905,025 | 9/1975 | Davis et al. | 364/200 |
| 3,986,163 | 10/1976 | Elliot | 367/69 |

*Primary Examiner*—Nelson Moskowitz
*Attorney, Agent, or Firm*—Pitts, Ruderman & Kesterson

[57] ABSTRACT

In a representative embodiment of the invention described herein, a well logging system for investigating subsurface formations is controlled by a general purpose computer programmed for real-time operation. The system is cooperatively arranged to provide for all aspects of a well logging operation, such as data acquisition and processing, tool control, information or data storage, and data presentation as a well logging tool is moved through a wellbore. The computer controlling the system is programmed to provide for data acquisition and tool control commands in direct response to asynchronous real-time external events. Such real-time external events may occur, for example, as a result of movement of the logging tool over a selected depth interval, or in response to requests or commands directed to the system by the well logging engineer by means of keyboard input.

20 Claims, 91 Drawing Figures

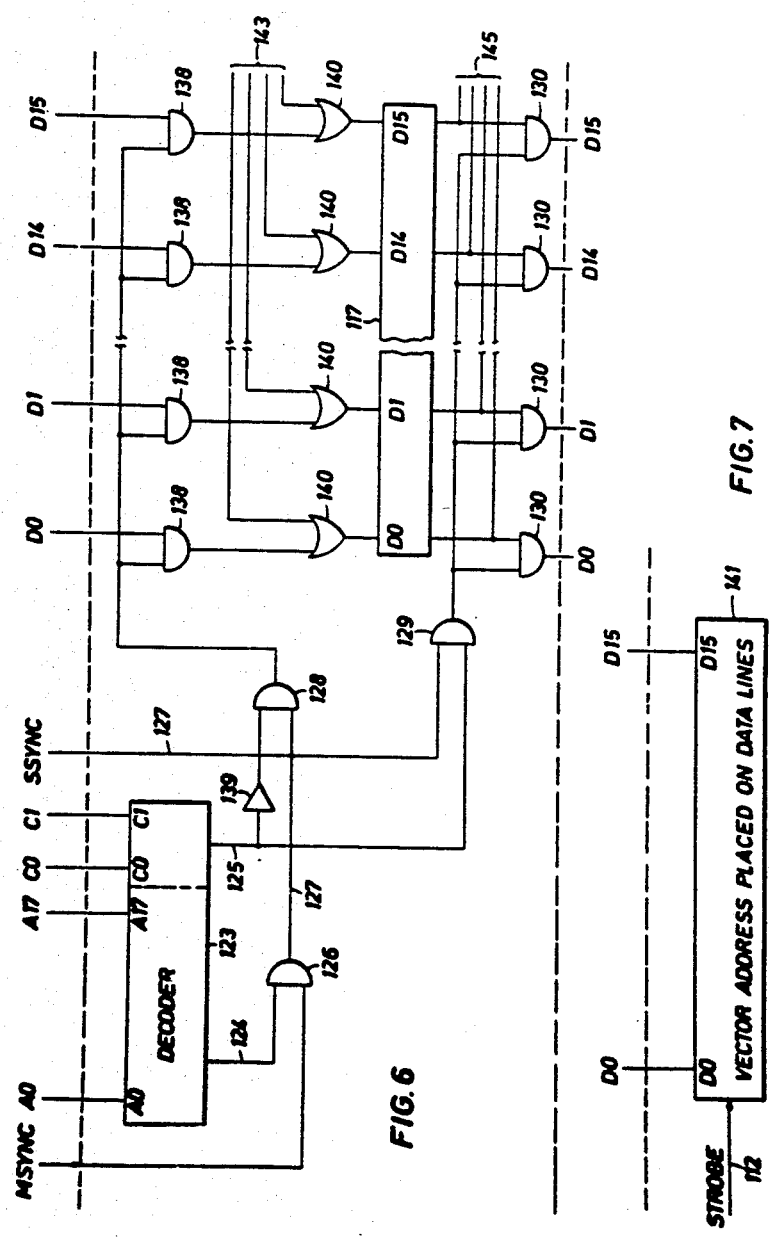

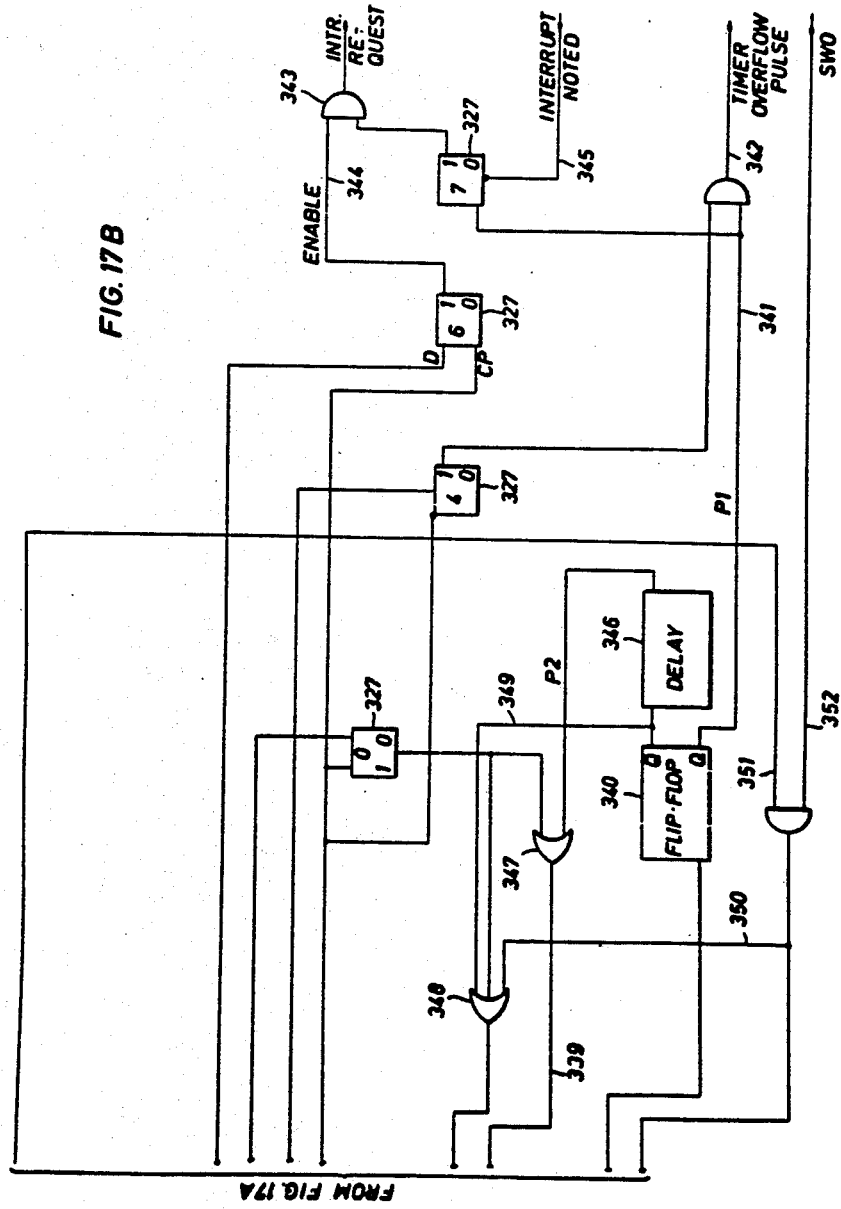

FIG.18A

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 0 | 0 | 0 | 0 | 0 | 0 | 0 | 0 | 0 | 0 | 0  | 0  | 0  | 0  | 0  | 0  |

18B

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 0 | 1 | 1 | 1 | 1 | 1 | 1 | 1 | 1 | 1 | 1  | 1  | 1  | 1  | 0  | 1  |

18C

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
| 0  | 1  | 1  | 1  | 1  | 1  | 1 | 1 | 1 | 1 | 1 | 1 | 1 | 1 | 1 | 0 |

18D

| 0 | 1 | 1 | 1 | 1 | 1 | 1 | 1 | 1 | 1 | 1 | 1 | 1 | 1 | 1 | 1 |

18E

| 1 | 0 | 0 | 0 | 0 | 0 | 0 | 0 | 0 | 0 | 0 | 0 | 0 | 0 | 0 | 0 |

| A0 | C1 | C0 | OUTPUT ON CONNECTING LINES |
|----|----|----|----------------------------|
| 0 | 0 | 0 | 194 (SWO) |
| 0 | 0 | 1 | 194, 197 (SWO, SPFS) |
| 0 | 1 | 0 | 195, 196, 198 (SLBI, SUBI, SPFC) |
| 0 | 1 | 1 | 195, 198 (SLBI, SPFC) |
| 1 | 1 | 1 | 197, 198 (SUBI, SPFC) |
| 1 | 0 | 0 | |
| 1 | 0 | 1 | |
| 1 | 1 | 0 | |

NOT USED { (last three rows)

TABLE I

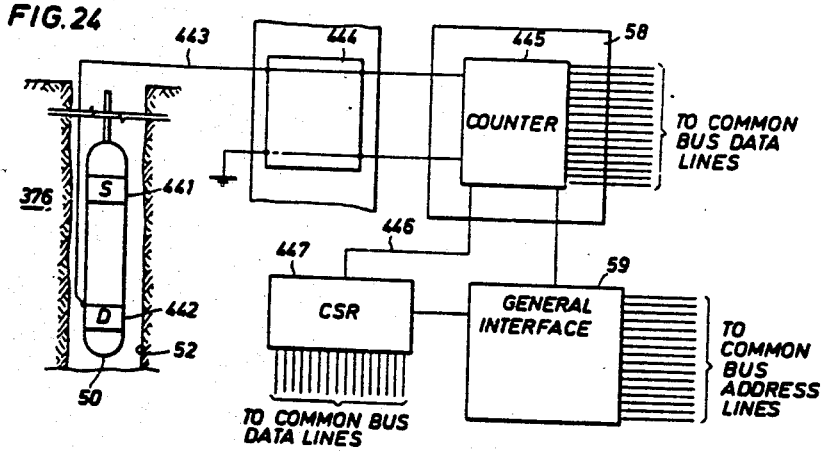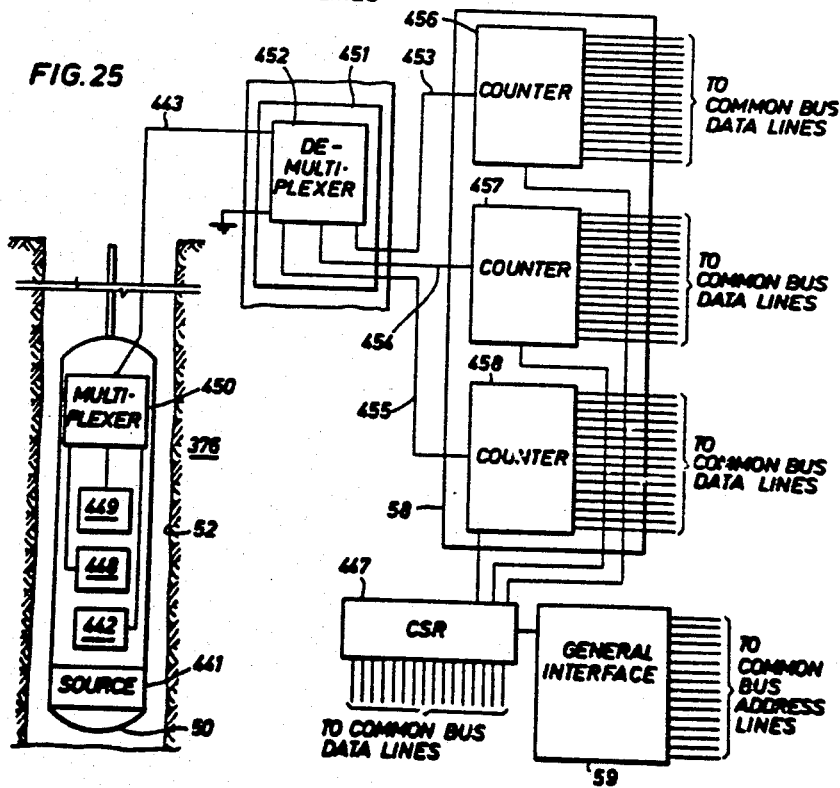

FIG. 30A
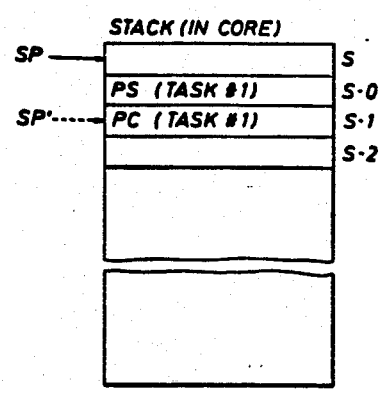
FIG. 30B
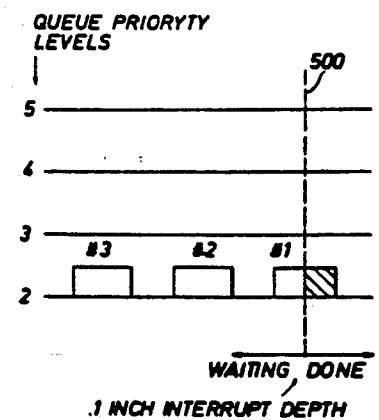
FIG. 30C
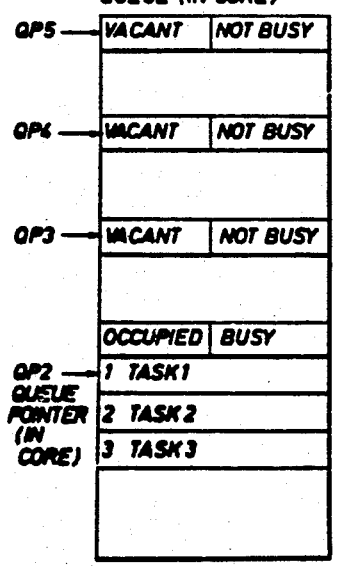

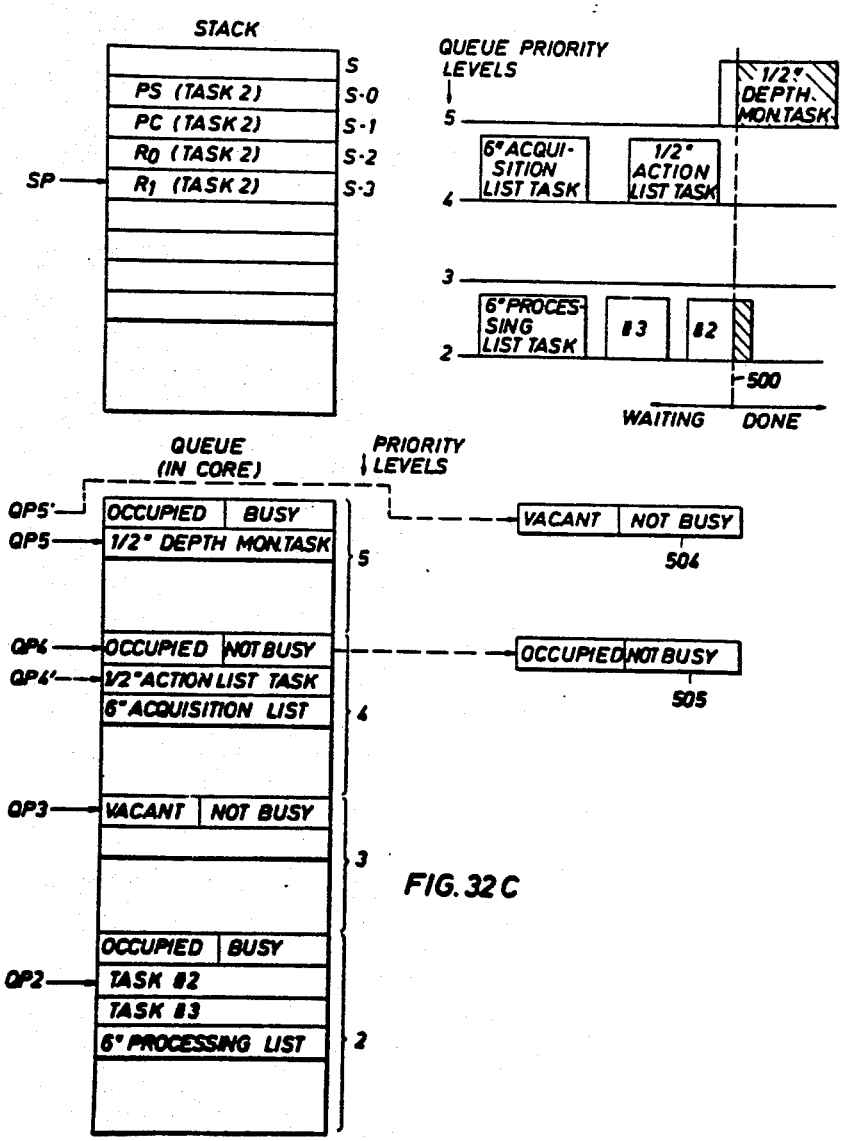

FIG. 34A
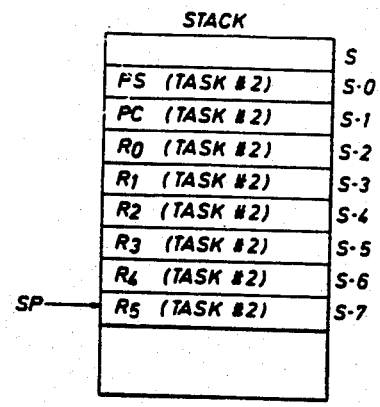
FIG. 34B
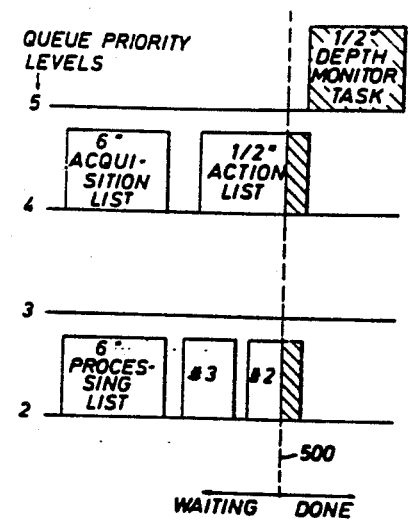
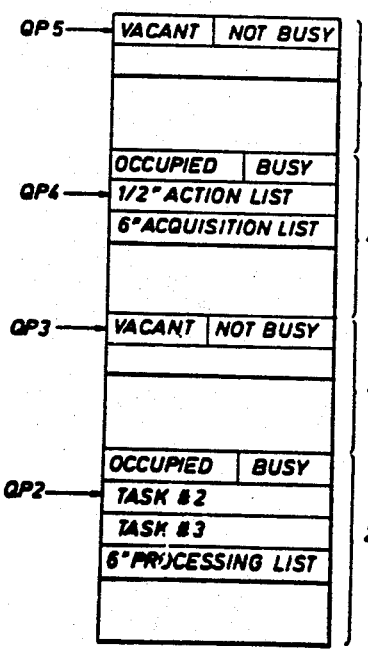
FIG. 34C

FIG. 35A
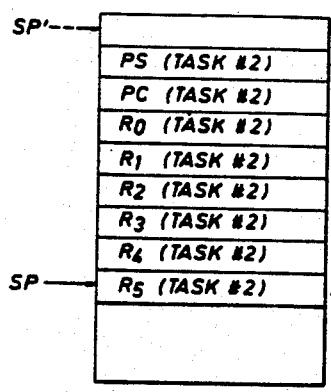
FIG. 35B
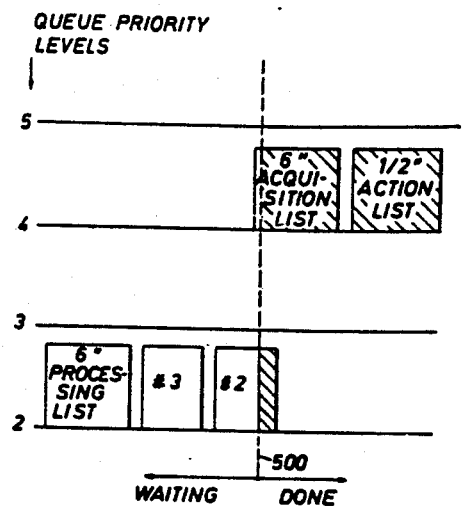
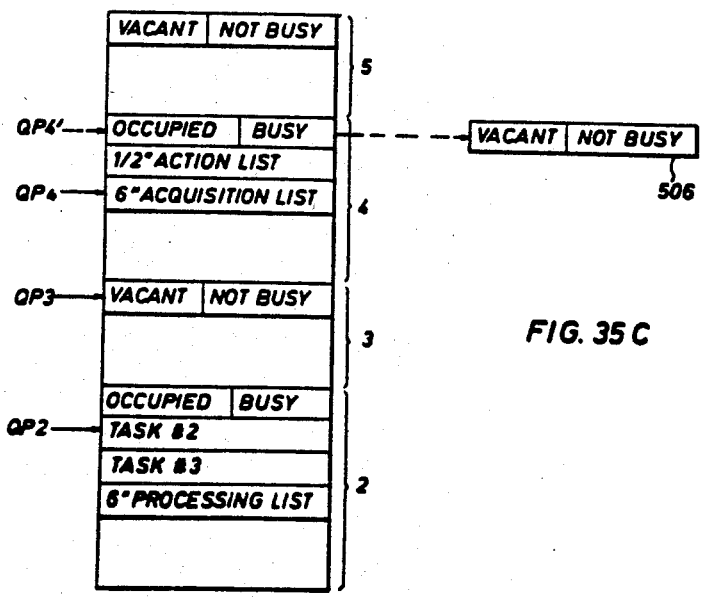
FIG. 35C

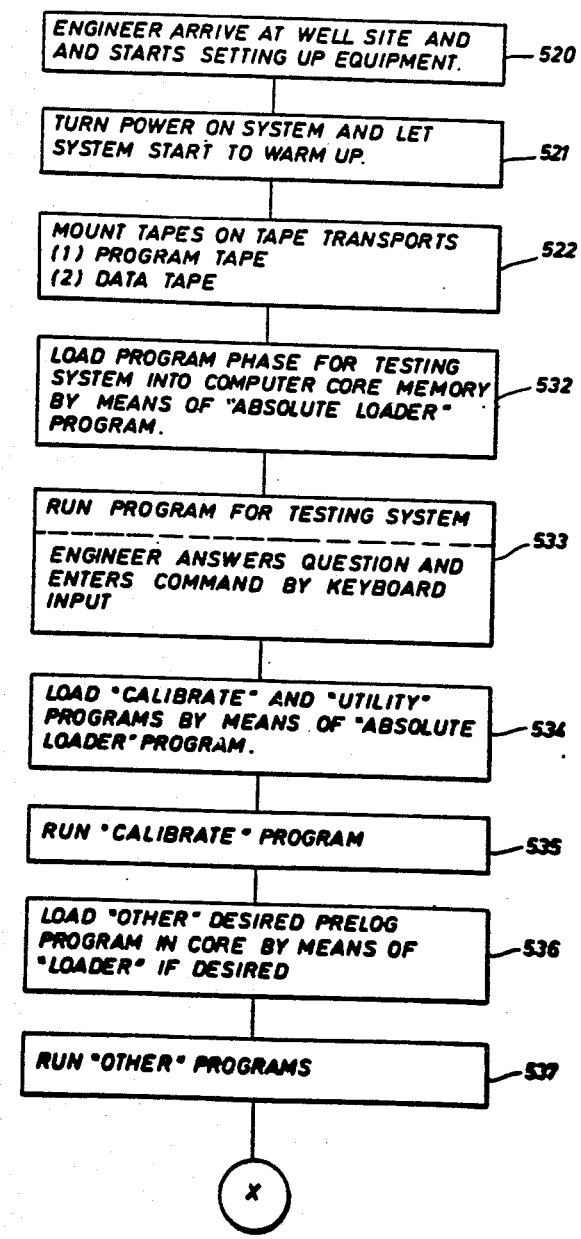

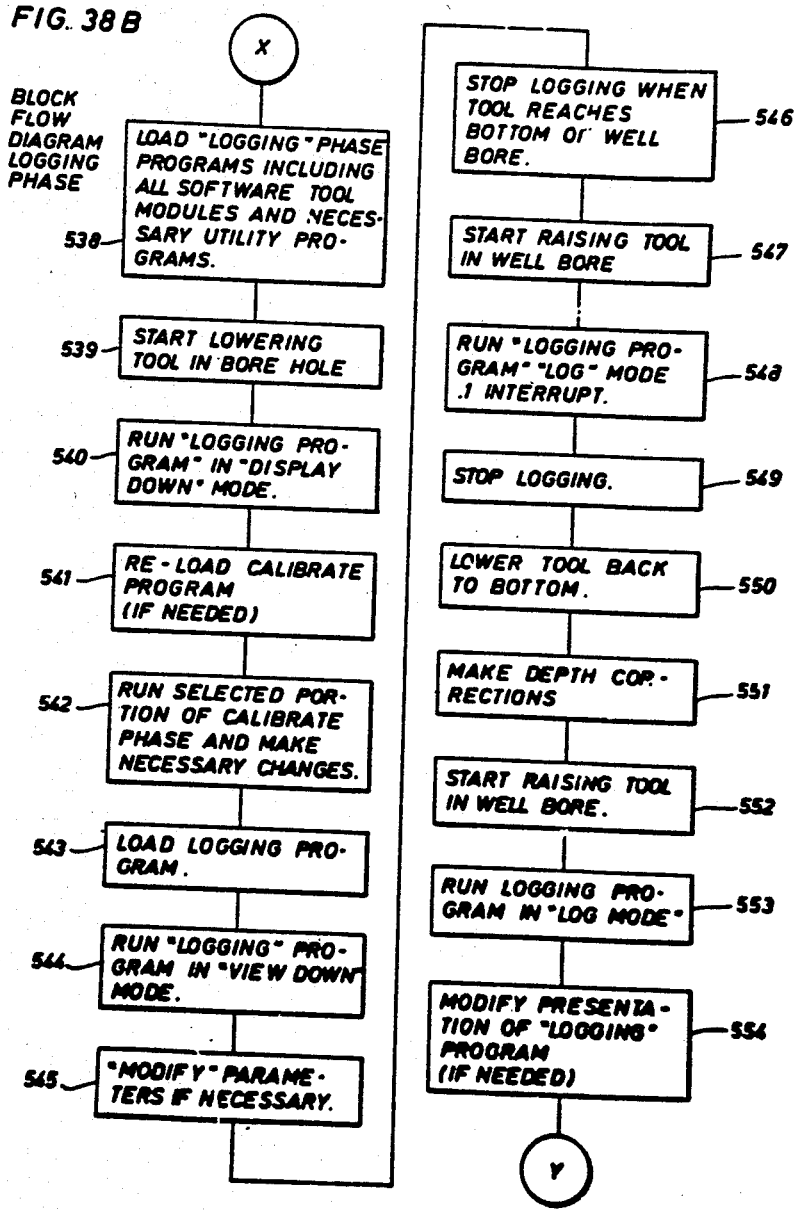

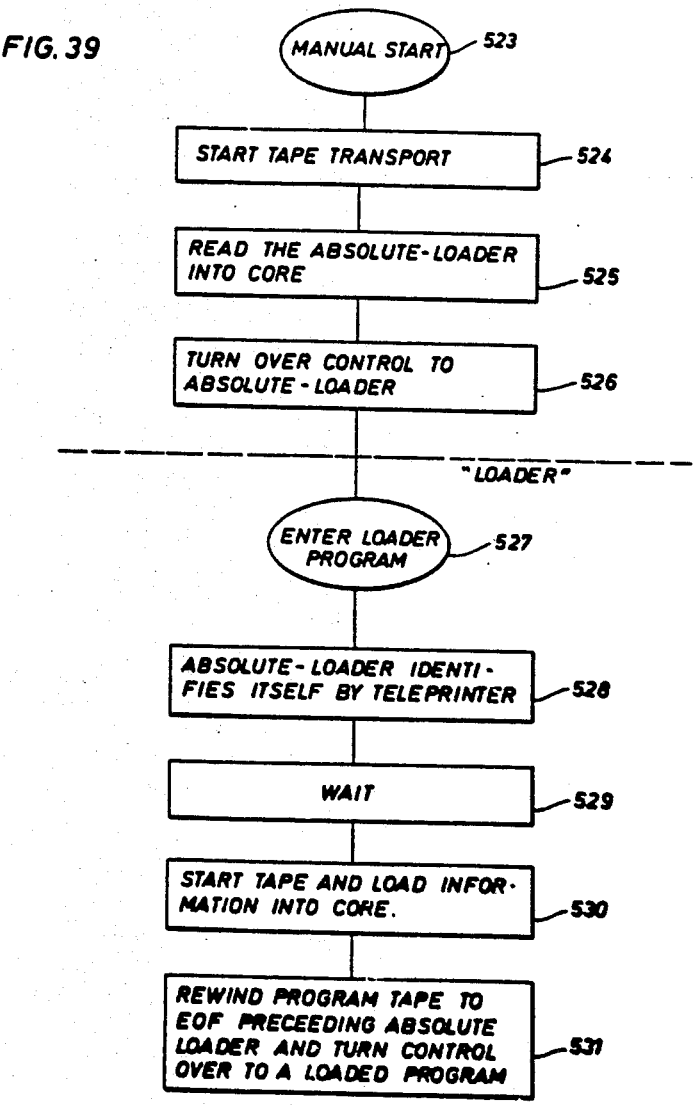

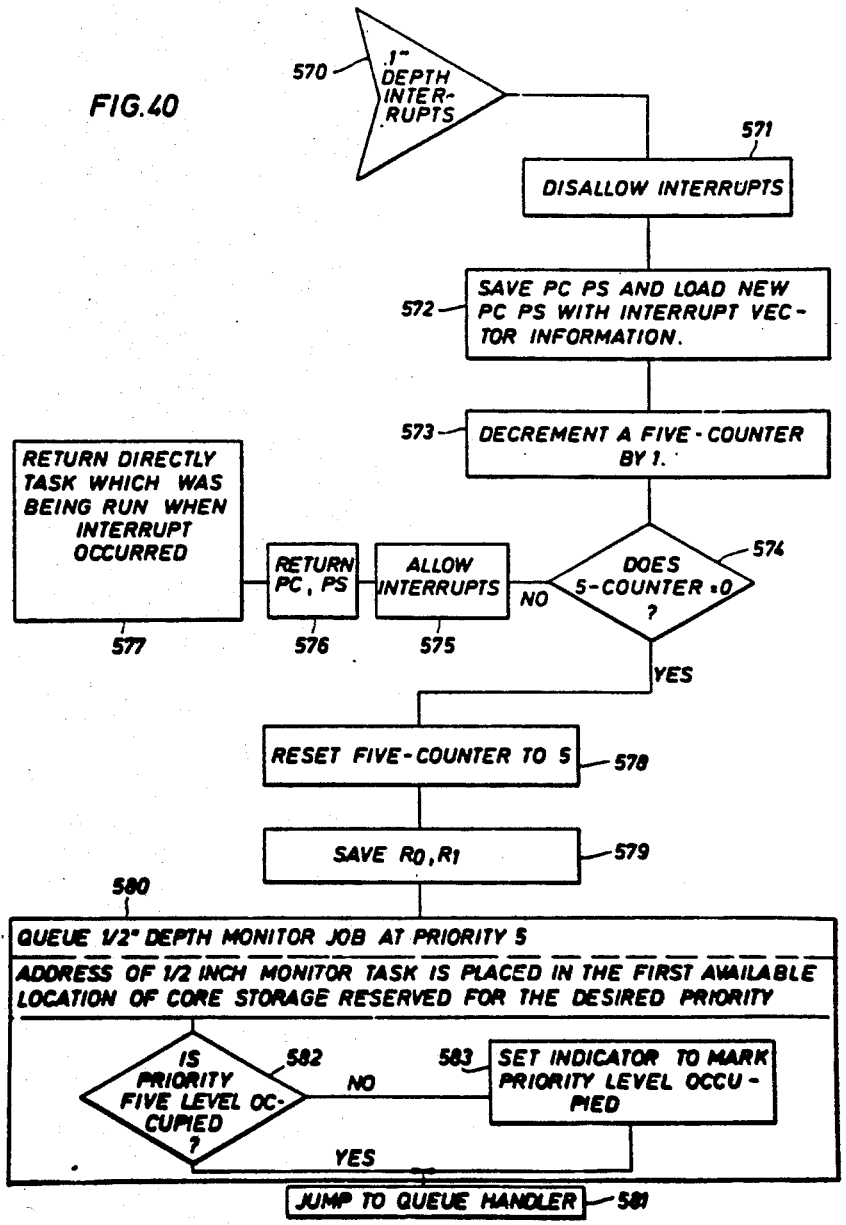

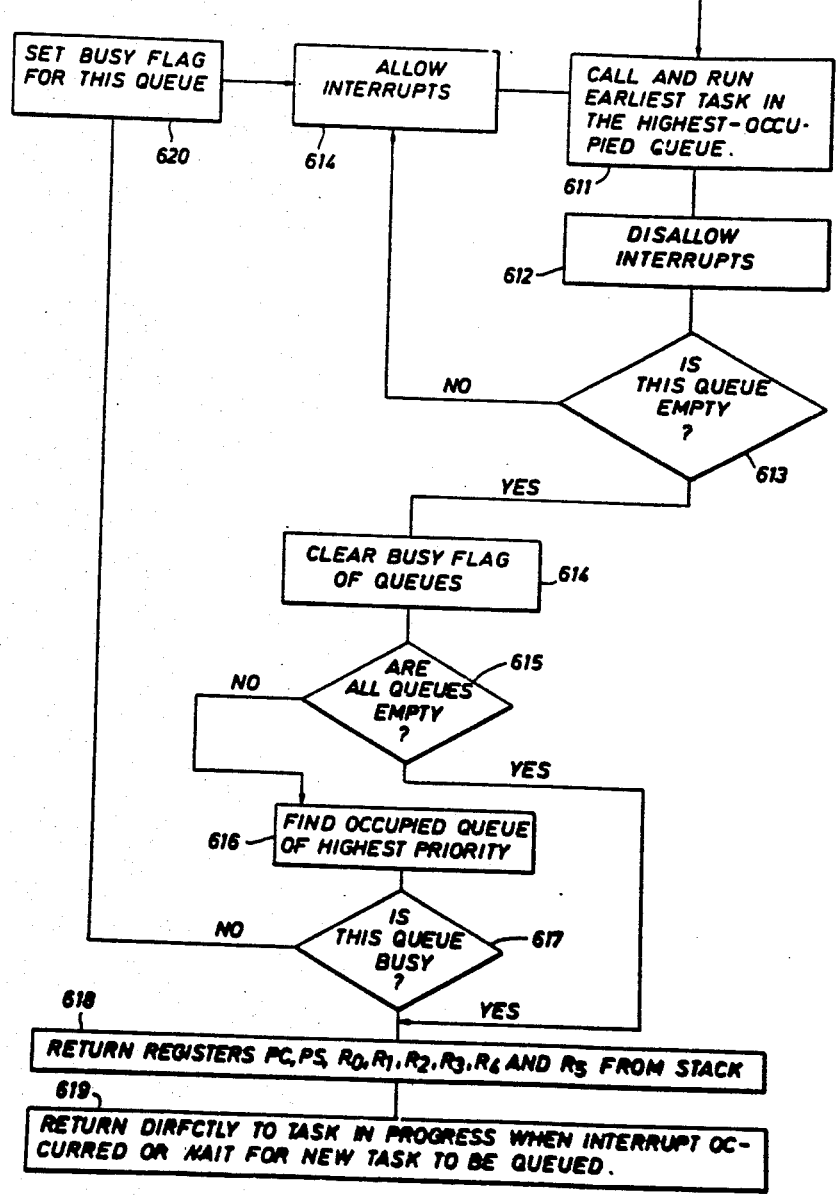

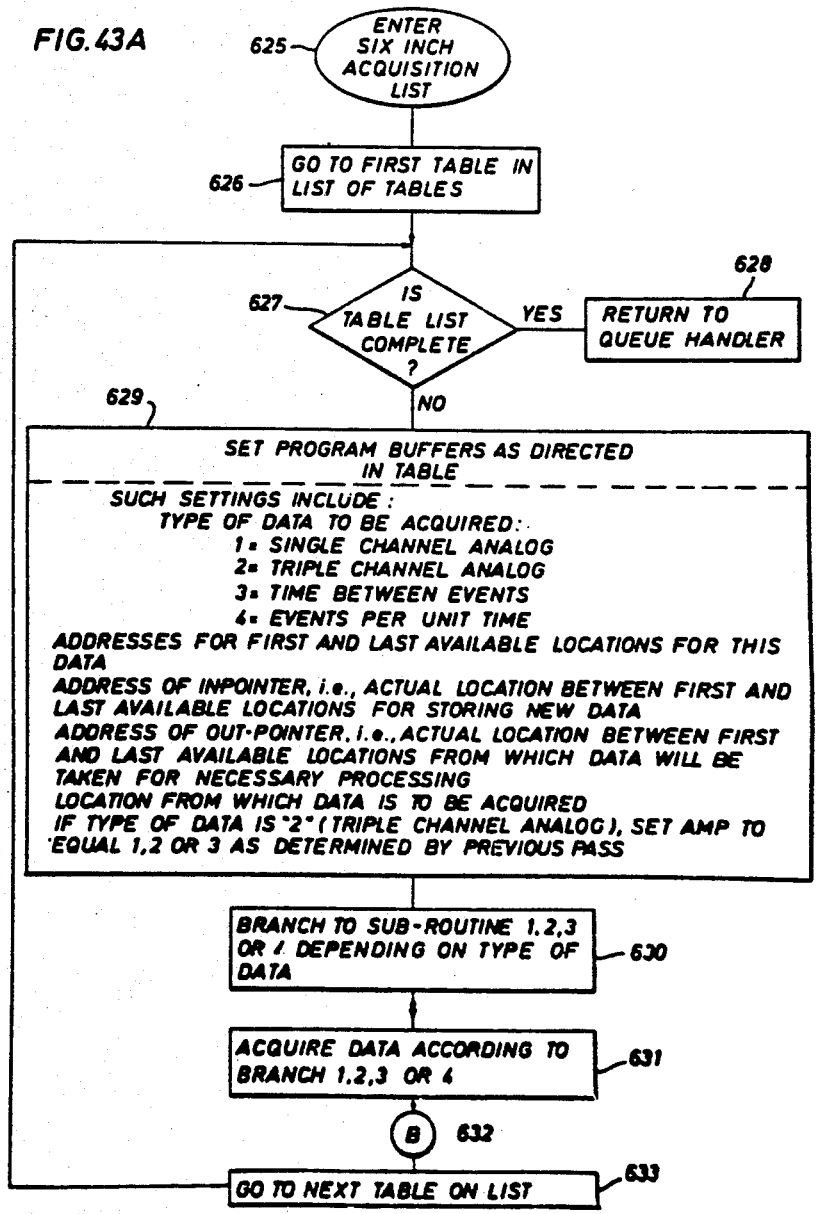

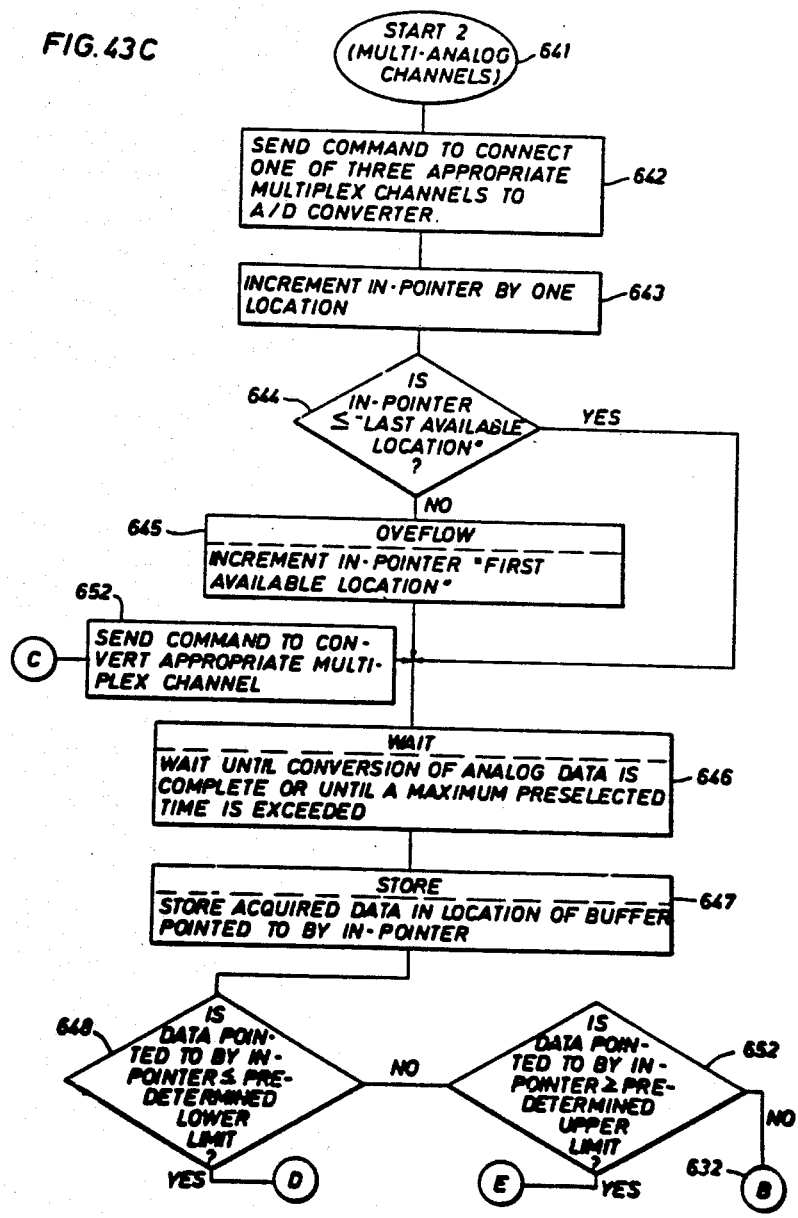

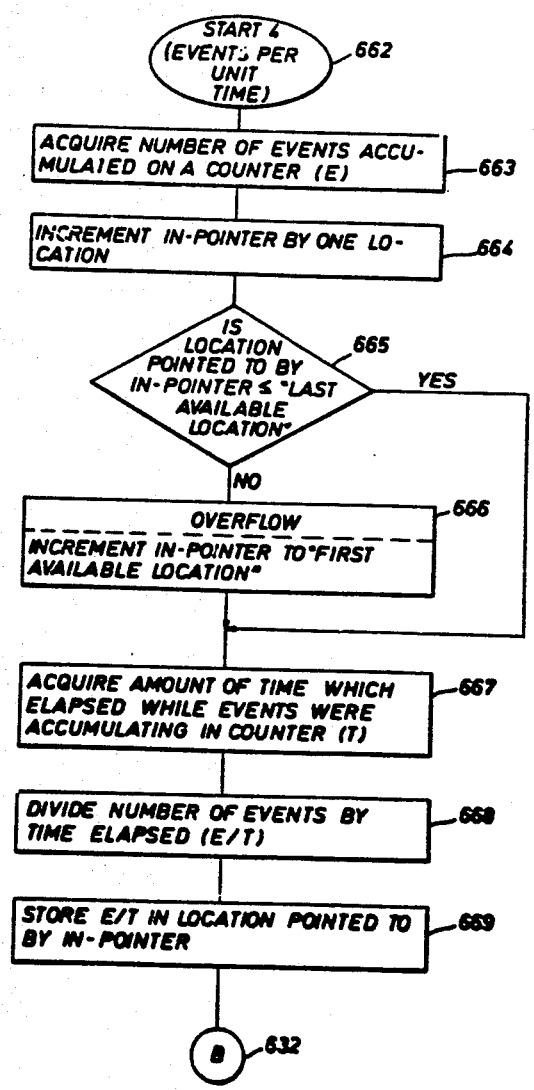

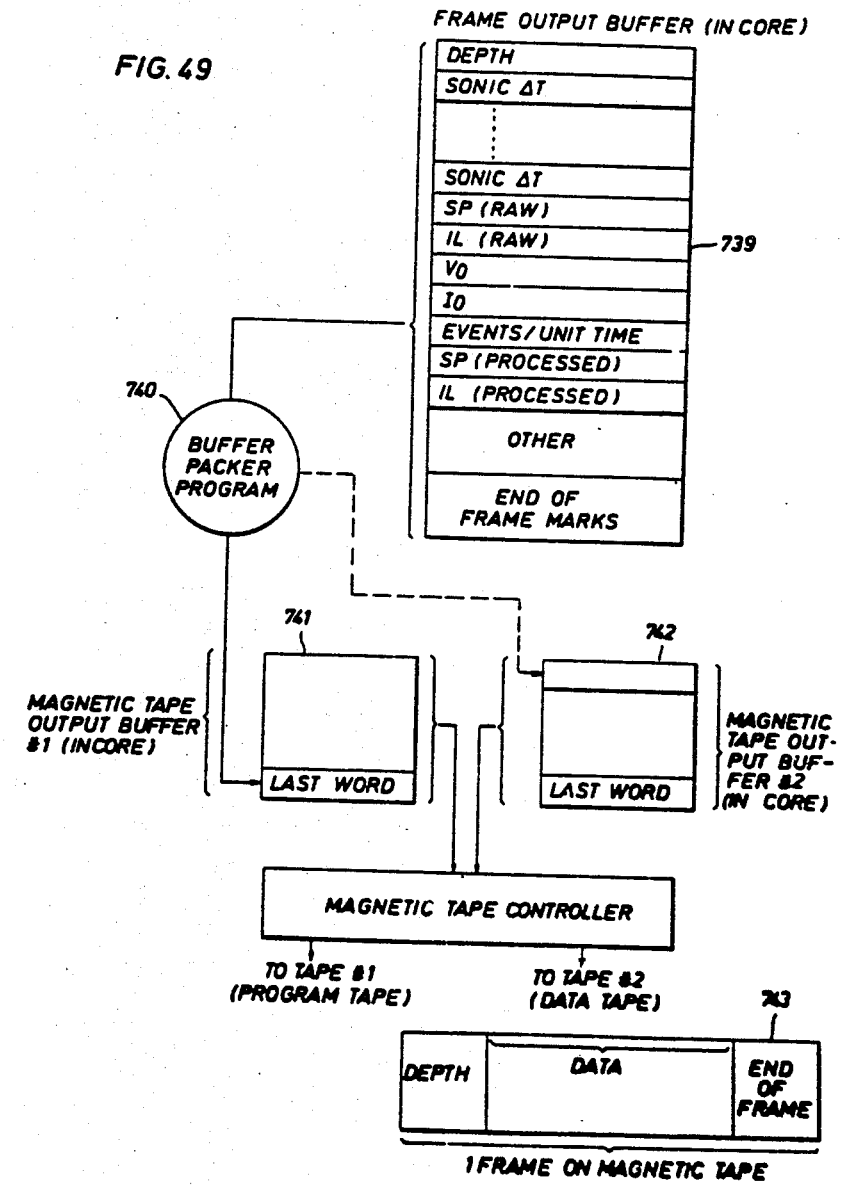

FIG. 50C: | RECORD TYPE | RECORD NO. | FILE NO. | | | |

FIG. 50B: | RECORD HEADER | DATA |

FIG. 50A: EOF EOF | RECORD #1 | EOF | RECORD #2 | EOF | RECORD #3 | EOF | RECORD #4 | EOF EOF

FIG. 50: EOF EOF | DATA FILE #1 (LABEL FILE) | EOF | DATA FILE #2 (TESTING) | EOF | DATA FILE #3 CALIBRATION | EOF | LOGGING FILES (#3-#N-1) | EOF | DATA FILE #N CALIBRATION | EOF EOF

FIG. 50D: EOF EOF | LOG-RUN #1 | EOF | LOG-RUN #2 | EOF | - - - - - - - - - - - | EOF EOF

FIG. 50E: EOF | FORMAT RECORD | TABLES | COMMON | DATA RECORD #1 | DATA RECORD #2 | | EOF

FIG. 50F: | RECORD HEADER | FRAME 1 | FRAME 2 | - - - - | FRAME N |

FIG. 50G: | DEPTH | DATA |

COMPUTERIZED TRUCK INSTRUMENTATION SYSTEM

This is a continuation, of application Ser. No. 944,462, filed Sept. 21, 1978, and now abandoned which is a continuation of patent application Ser. No. 356,233 filed May 1,1973, and now abandoned.

BACKGROUND OF THE INVENTION

In obtaining well logging measurements, a logging tool carrying one or more exploring or measuring devices is lowered into a wellbore for measuring various characteristicis of sub-surface earth formations. It is desirable in many instances to provide one or more visible records or logs of the investigated sub-surface characteristics at the well site within a relatively short time after the log has been run. Such logs may directly represent one or more analog type continuous measurements such as conductivity, spontaneous potential, sonic Δt, or gamma ray. Moreover, other logs may be representative of computed information which is derived by combining one or more of these direct measurements. Present well logging systems are, of course, capable of providing suitable logs of such direct measurements or logs produced from relatively simple analog or special purpose digital computing equipment shortly after the completion of a well logging run. However, logs showing data which requires relatively complex processing and computation have heretofore been unavailable for many hours or even several days after the logging runs. These time delays have been alleviated substantially by the current practice of transmitting the well logging measurements to a distant computer center for processing and computation of the data. Nevertheless, even with such transmission, there can still be situations where the resulting time delays are too long.

It also will be appreciated that many different types of well logs have been developed over the years for providing different information concerning various formation characteristics. Consequently, a great deal of complex downhole equipment, as well as the associated surface equipment, has been developed for each logging service. The complexity of much of this equipment has, of course, placed a substantial burden on the operating personnel to be certain that the logging tools are properly set up and calibrated and are being correctly controlled during logging.

Therefore, it is an object of this invention to provide a complete well logging system suitable for producing all types of high quality logs from wellbore data obtained from existing downhole logging tools.

It is a further object of this invention to provide a well logging system which requires a minimum amount of personnel interaction during a logging operation.

SUMMARY

The present invention provides new and improved system apparatus and methods for well logging. Briefly, the system of the present invention comprises a well logging tool for investigating characteristics of earth formations and other phenomena in and around a wellbore (either cased or uncased). The well logging tool will include one or more downhole investigating devices. As the logging tool is moved through the wellbore, signals or data representative of these downhole characteristics investigated by the logging tool are transmitted to the surface for processing, storing and display. In addition to the information or data from the wellbore, apparatus is also included for providing information concerning the location or depth of the logging tool in the wellbore. The system also includes a general purpose computer operating in real-time for controlling the receiving, processing storing and displaying of this downhole data and depth data. The computer itself operates in response to programming provided by some programming means such as a hardwiredread-only-memory (ROM) or a software package. The system further includes apparatus responsive to asynchronous events for controlling, at least in part, the receiving and processing of data by the computer. The asynchronous events typically could be any type of external input command. For example, a most important asynchronous input would be a signal from the apparatus for providing depth, indicating that specific distance had been traversed by the logging tool as it moves up the wellbore. Another asynchronous input will occur when a keyboard coupled to the system for providing information to the computer is used.

With regard to the computer responding to asynchronous events as it controls the receiving, processing, storing and displaying of logging data, an important aspect of the programming which controls the computer is that the execution of a first task or sequence of instructions may be temporarily halted while the computer branches to and executes a second task which is more critcal to the logging operation than the first task. After the more critical task is completed, the computer will return and continue executing the first task.

A particular embodiment of the programming for controlling which task is to be executed first includes a method for temporarily storing data pertaining to the first task interrupted by an asynchronous event, and queuing a second task along with any other waiting tasks in accordance with predetermined priorities such that the highest priority task is executed first by the computer. When the interrupted task has the highest priority, the computer re-acquires the temporarily stored data and resumes executing that interrupted task.

BRIEF DESCRIPTION OF THE DRAWINGS

FIG. 6 shows typical circuitry for transferring digital data in and out of a peripheral device which is a slave to the master circuit of FIG. 5;

FIG. 7 shows circuitry whereby a peripheral device which has obtained control of the system bus may direct the system computer to a new set of programmed instructions;

FIGS. 18A-18E is a diagrammatical representation of various stages of the timer digital output buffer in FIG. 17;

FIGS. 20-28 illustrate typical end-to-end circuit diagrams of various types of well logging services as they would operate with the system of FIG. 1;

FIGS. 30A-36A illustrate the changing condition of a section of core used as a stack during a typical interrupt operation of the system of FIG. 1;

FIG. 30B-36B illustrate the changing conditions of tasks waiting to be run by the computer of the system according to their priority during a typical interrupt operation of the system of FIG. 1;

FIGS. 30C-36C illustrate the various conditions of tasks waiting to be executed in a section of core set aside for queues during a typical interrupt operation of the system of FIG. 1;

FIGS. 38A-38C show a block flow diagram or flight plan in a typical well logging service from the setup phase to the post-log phase;

FIG. 39 is a flow diagram of the Bootstrap Loader and the Absolute-Loader programs of this system, which load the proper servicing programs into the computer of this system at the appropriate time;

FIG. 40 is a flow diagram of the Depth Interrupt Handler program used by the system of FIG. 1;

FIGS. 41A and 41B are flow diagrams of the Queue Handler program used by the system of FIG. 1;

FIG. 43A is a flow diagram of a program for data acquistion that might be used by the system of FIG. 1;

FIGS. 43B-43F are flow diagrams of particular portions of FIG. 43A;

FIG. 49 shows how processed data is recorded on a data tape by the system of this invention; and FIGS. 50-50G are diagrammatical layouts of the data tape of the system of this invention.

DESCRIPTION OF THE INVENTION

OUTLINE OF PRESENTATION

OVERVIEW
PREFERRED EMBODIMENT
  System Apparatus
    Computer to Peripheral Interface
      Introduction
      Common Bus
      Control of Common Bus
      Mass Data Transfers
      CPU Interrupt
    Peripheral Devices
      Magnetic Tape System
      Keyboard Input/Teleprinter Output
      Modem
      Visual Display
    Well Logging Apparatus
      Depth System
      General Interface
      A/D Converter
      Tool Modules
      Downhole Tool to GSI Connecting Circuitry
  System Operation
  System Programming
    Introduction
    Program Loading
    Program Tape
    Flight Plan
    Control Programs
      Introduction
      Depth Interrupt Handler
      Queue Handler
      Half-Inch Action List
      Six-Inch Acquisition List
      Six-Inch Processing List
      Keyboard/Printer Programming
    Depth Shifting
    Data Storage
    Data Tape

DESCRIPTION OF THE INVENTION

OVERVIEW

Figure 1:
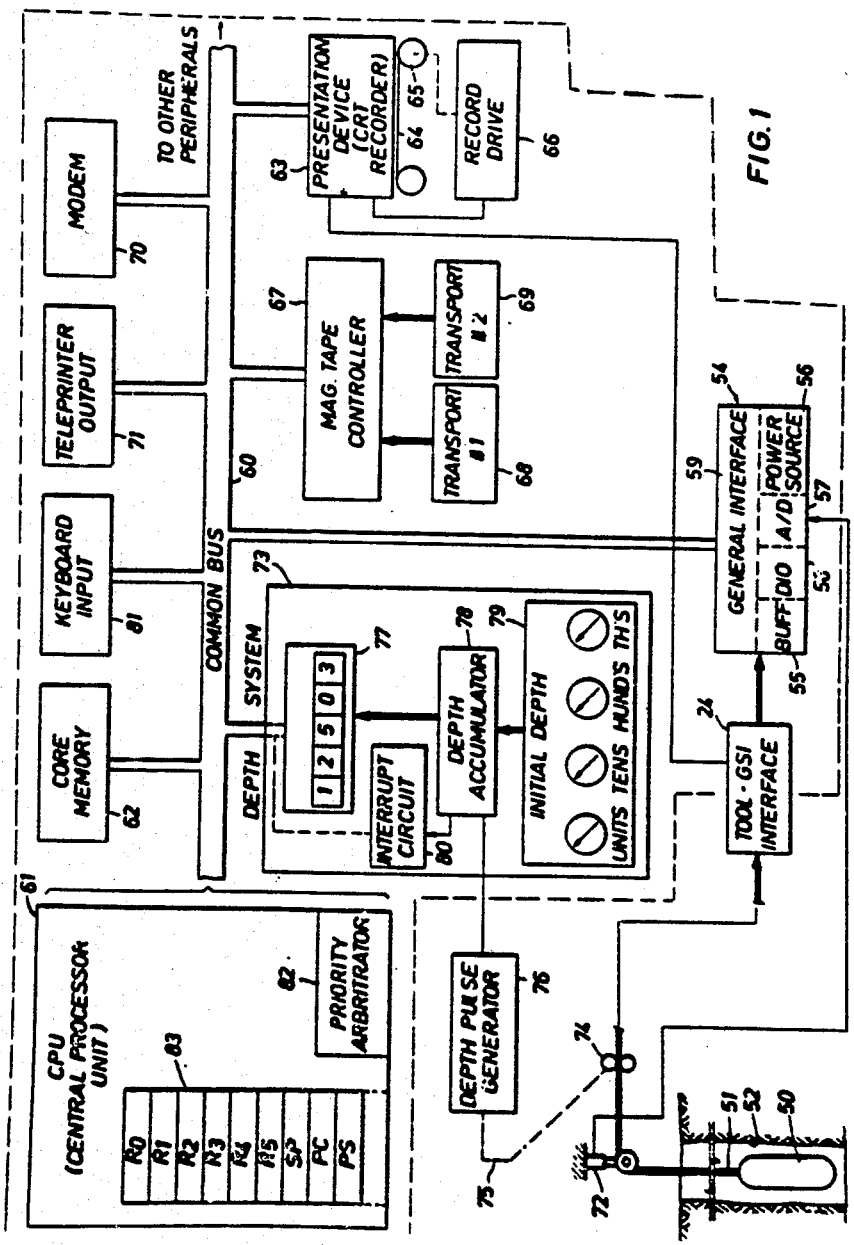
FIG. 1 is a block diagram of the well logging system of this invention.

Referring now to FIG. 1, there is shown a block diagram of a typical embodiment of a well logging control and data system incorporating the principles of the present invention. As a well logging tool 50, suspended on a typical logging cable 51, is moved within a wellbore 52 electrical signals are produced which are representative of selected subsurface earth formation characteristics. These electrical signals representative of earth formation data are conducted from within the logging tool 50 in the wellbore 52 to the surface by means of the multiconductor cable 51. The logging tool 50 is raised and lowered in a borehole by a suitable winch (not shown). The well logging tool 50 may contain one or more various types of investigating or sensing devices for determining various subsurface earth characteristics. The electrical signals produced by logging tool 50 from the various devices and representative of subsurface data may be in many forms and are supplied to a computer-controlled general surface instrumentation system (hereinafter referred to as "GSI") for processing and recording as will be discussed later. Some examples of the form which the signals produced by well logging tool 50 may take are:

(1) Analog—Such signals may simply vary in amplitude with respect to inherent characteristics in the formation, or the signal may be influenced or result from electrical inputs into the formation by the well logging tool itself. Examples include signals produced by exploring devices for obtaining Spontaneous Potential Logs, Induction Logs, LATEROLOG a registered trademark of Schlumberger; and Deep and Shallow Resistivity Logs. A description of such exploring devices and the signals which are produced by these devices can be found in U.S. Pat. Nos. 3,453,530; 3,638,105; 3,638,106; 3,226,633; 3,067,383; 3,014,175; and 2,933,674.

(2) Events-Per-Unit-Time—Such signals are produced, for example, by exploring devices which measure radioactivity for determining formation porosity. Such devices irradiate a formation transverse a wellbore with nuclear energy and then detect one of many resulting nuclear phenomenon, such as for example, the resulting radiation decay time. Descriptions of such exploring devices may be found in U.S. Pat. Nos. 2,769,918 and 2,842,695.

(3) Time-Between-Events—Such signals are produced by certain types of sonic or acoustic exploring devices. An important time interval, for example, in the sonic logging device is between the transmission of an acoustic energy pulse into a formation and receiving the signal from the formation at two or more receivers spaced along the logging tool and is referred to as the sonic-$\Delta t$. A description of typical acoustic or sonic exploring devices may be found in U.S. Pat. Nos. 3,321,041 and 3,257,639.

(4) Digital—Such signals include data from exploring devices which may at least partially process analog or event-per-unit-time data and then transmit digital data to the surface of the earth. A description of such an exploring device may be found in U.S. Pat. No. 3,309,521.

Each of the electrical signals produced by well logging tool 50 and transmitted to the earth's surface may have special requirements, such as voltage referencing, impedance matching and the like, which must be accommodated before the signals can be applied to the GSI. Also, each tool may have special and peculiar requirements concerning control of the various exploring devices which should be handled separately and apart from the requirements which are general or universal to all types of well logging tools.

These special and peculiar requirements are handled by a group 53 of individual Tool-to-GSI Interface circuits which will be discussed later in greater detail in conjunction with FIG. 2 and are hereinafter referred to as "tool modules".

In addition to the individualized signal processing necessitated by each unique downhole well logging sensing device and performed by the individual tool modules, there is a considerable amount of necessary signal processing that is common to many or all of the well logging devices. Therefore, as is illustrated generally in FIG. 1 and in more detail in FIG. 2, each tool module communicates with one or more of the signal and data processing modules contained in the "Logging Data Interface" circuitry 54 where the well logging signals representative of data receives additional signal processing. The following list of signal and data processing modules are included in the preferred embodiment of this invention:

(1) Buffering circuits 55, which may simply comprise receivers and drivers for providing isolation and, if needed, amplification of direct digital signals passing between the GSI and the downhole tool modules.

(2) Power supplies 56 for providing, high levels of power used in the downhole well logging devices.

(3) A/D (Analog to Digital) converter circuitry 57 for providing the necessary conversion of analog signals received from the tool module into digital signals suitable for use by the GSI.

(4) DIO (Digital Input/Output) circuitry 58 which includes a group of counters and timers for converting pulse trains and other types of digital or pulse signals received from the tool modules into digital signals suitable for use by the GSI. In addition, the timers in the DIO circuitry 58 also provide timing indications for use by the downhole tool modules.

A more detailed discussion of the modules contained in Logging Data Interface circuitry 54 will be provided hereinafter. In addition to the signal and data processing modules just discussed, "General Interface" circuitry 59 is also contained in the Logging Data Interface circuitry 54 for interfacing (by way of common bus 60) each of these signal and data modules with a "Computer Central Processor Unit" 61 (hereinafter referred to as the CPU) and other peripheral devices illustrated in FIG. 1. Primarily, General Interface 59 operates to provide addressing and decoding logic for transferring well logging data between the various signal and data modules and "core memory" 62 of CPU 61 or any other suitable peripheral unit connected to "common bus" 60. General Interface 59 also provides the logic circuit for interrupting a computer program in the process of being run by the CPU so that a more important task related to the logging data may be handled immediately. In addition to the above, further discussion will be provided hereinafter concerning the operations of the addressing, decoding logic and interrupt logic found in General Interface 59.

The CPU 61 operates under program control and normally in conjunction with core memory 62 to further process the digital well logging data in a desired manner. Such processing could take the form of enhancing raw data by making deconvolution or skin effect corrections (as discussed in U.S. Pat. Nos. 3,166,709 and 3,226,633) or of combining data from several different exploring devices (shown, for example, in U.S. Pat. No. 3,638,484). Once the data is in final form, either raw or processed, it is then also preferably transferred to core memory 62 where it is readily available for many and varied uses. These uses include the following:

(1) Output to a "presentation device" 63 for visually presenting the data (temporarily or permanently). Such a presentation device could include a CRT (cathode ray-tube) display recorder a galvanometer recorder, etc. If the presentation device 63 is to be used for producing a permanent type record, a film or recording medium 64 driven by a take-up reel 65 under control of the depth-responsive record drive 66 can be used for this purpose.

(2) Transfer to magnetic tape, for permanent storage by way of, for example, magnetic tape controller 67 and a tape transport such as is shown at 68 (tape transport 69 will be discussed hereinafter). Of course, other permanent storage devices such as disk storage units and necessary control apparatus may be used rather than magnetic tape storage.

(3) Transfer to modem 70 for transmission to a remote location over a telephone line or by way of radio.

(4) Transfer of specified data to the teleprinter output 71 or any other similar peripheral printout device.

In addition to the above-discussed subsurface formation or well logging data, other important data or measurements concerning the well logging operation may also be supplied to the GSI system. One such important measurement is the tension in the supporting cable 51 at the surface of the earth. This tension data, which is produced by tension measuring device 72, may be used, for example, to avoid overloading a cable and for correcting depth information which is also of most importance in well logging operations. With respect to such depth information, a suitable depth system 73 is also included in FIG. 1. As logging tool 50 is moved through wellbore 52, a so-called intervalometer wheel 74 is cooperatively arranged with cable 51 at the earth's surface for driving a shaft 75 as a function of the movement of the cable. Shaft 75 is coupled to a depth pulse generator 76 for producing a pulse as a given increment of cable passes intervalometer wheel 74. An example of how this can be accomplished is explained in U.S. Pat. No. 3,457,544. In this described embodiment, the interval between two successive pulses generated by the pulse generator 76 represents a distance of 0.1 inch of movement by the well logging tool 60 through wellbore 52. The depth system illustrated in FIG. 1 also includes apparatus for initializing depth and accumulating the 0.1 inch incremental depth pulses. These accumulated incremental pulses are then used to provide depth data for eventual output magnetic tape via unit 68 or 69, or for display by a depth display device 77 so that the data descriptive of the formation traversed by the wellbore can be correlated to the depth from which it was derived. To accomplish this, 0.1 inch depth pulses from depth pulse generator 76 are supplied to the input of a depth accumulator unit 78. Typically, unit 78 is initialized or reset to equal the depth of the wellbore to be logged by an initial depth circuit 79 which includes units, tens, hundreds and thousands thumbwheel switches. The 0.1 inch depth pulses from depth pulse generator 76 are then used to decrement the preset count in unit 78 as logging tool 50 moves up wellbore 52. Under control of a computer program, depth is read out of an addressable register contained in depth accumulator 78 and stored in core memory 62 for eventual output on magnetic tape or display on the presentation device 63. In addition, a so-called "depth interrupt" signal to be discussed hereinafter is provided by interrupt circuit 80 contained in depth system 73 each time a preselected number of depth pulses have been provided by depth pulse generator 76.

Since the apparatus and methods of the present invention are controlled by a computer such as CPU 61, it is necessary that a computer program be available to control CPU 61. This means, of course, that a computer program controls CPU 61 and the CPU in turn may control the well logging tool 50 as it does all of the associated surface peripheral equipment. Therefore, the GSI system further includes another magnetic tape transport 69 on which is mounted a tape containing information which should be stored in core memory 62 prior to a well logging operation. This information includes a data base (tables of constants, logging measurements to be made, and the like) and a plurality of computer programs all previously written on the program tape. The earlier-mentioned tape controller 67 controls both tape transports 68 and 69. It should be understood, however, that the use of the two tape transports 68 and 69 is for convenience only, and that one tape transport would be adequate, but would require changing back and forth between a program tape and a data tape at different phases of the well logging operation. In addition, the GSI system also includes a Keyboard Input 81 which may be used by the Engineer to communicate with the system or to make changes in a program after it has been stored in core memory 62. A more complete discussion of Keyboard Input 81 will be set out hereinafter.

PREFERRED EMBODIMENT
SYSTEM APPARATUS

Computer-to-Peripheral Interface

Introduction:

The system of this invention including all the components previously discussed is controlled by a general purpose digital computer which may be responsive to asynchronous events even when the computer is in the middle of processing a program. Digital Equipment Corporation of Maynard, Mass. has a commercially available computer called the PDP-11 which has been found to be highly satisfactory for use with the system. Therefore, to aid understanding of the interaction between the system hardware previously mentioned and to be described in detail hereinafter, the following discussion related to the PDP-11 computer is set out. A complete discussion concerning the operation of the PDP-11 system may be found in the manual entitled, *PDP-11 Handbook*, published by Digital Equipment Corporation. However, it should be clearly understood that the system of the present invention is not limited to the use of this particular computer. If a computer other than the PDP-11 were to be used, the basic operational theory of the invention would remain the same although some of the interfacing details might change.

As illustrated in FIG. 1, CPU 61 utilizes common bus 60 which comprises fifty-six conductors to communicate with every peripheral device including core memory 62 connected thereto.

As with most digital computer systems, each storage location in core memory 62 has an address. In addition to this, each of the several peripheral devices also has a block of addressable registers. Therefore, CPU 61 can manipulate each of the addressable registers of the peripheral devices as flexibly as though the registers were in core memory 62. The addressable registers contained in a peripheral device will typically include one or more 16-bit data registers and one or more 16-bit CSRs (control and status registers). The peripheral data registers are typically used to temporarily store data transferred to or from the device; whereas the CSRs are primarily used by CPU 61 to determine the status of the peripheral or to direct the peripheral to perform some act. Addresses, data and control information are sent along common bus 60 between CPU 61 and any one of the peripheral devices or between individual peripheral devices. Thus, the fifty-six conductors of the common bus 60 connect each one of the peripheral devices and CPU 61 in parallel.

Because CPU 61 and the peripheral devices are all connected in parallel, there must be some control as to which device may use common bus 60 at any specific instant in time. Therefore, any peripheral device other than CPU 61 must first request and gain access to common bus 60. Whenever any device connected to common bus 60 gains control of the bus through priority arbitrator 82 contained in CPU 61, it becomes "bus master" and may then communicate with any selected device on the bus which becomes its "slave". Such communication is carried on without interruption from any other peripheral device. Therefore, communication between any two devices connected to commmon bus 60 is in the form of a master-slave relationship, and it is interlocked so that for each control signal issued by the master device, there must be a response from the slave in order to complete a transfer of data. Consequently, communication is independent of the physical bus length and the response time of the master and slave devices. Any peripheral device may become bus master when no other device is using the bus and if its priority is of a higher level than the priority level of CPU 61 or the priority level of any other requesting device. However, at all other times including all data transfers involved in normal instruction processing CPU 61 is bus master.

For the priority arbitrator 82 to know to which device, CPU or peripheral, it is to grant the common bus 60, a priority structure is necessary and although in the PDP-11 the common bus priority arbitration logic is hardwired in priority arbitrator 82, it would also be possible to perform the same operations through software. The present invention is not concerned with whether this arbitration logic is hardwired or software since use of the PDP-11 computer as CPU 61 is optional.

In the PDP-11 computer, the priority arbitrator 82 operates so that common bus 60 is granted to whichever device has requested control at the highest of several possible priority levels. The present system has five possible priority levels, but is expandable to eight levels. A non-processor request (NPR) is the highest priority, and a priority seven request is the next highest, then a priority level of six, etc. Since the present system there are only five priority levels, the lowest possible level is a level four. All bus requests at priority level seven and lower, which are granted, are granted between instruction executions by the CPU 61 whereas NPR requests may even be granted between bus cycles of a single instruction execution. Since the granting of the bus to a peripheral device may occur at various times during the execution of programmed instructions by CPU 61, the CPU priority is also set under program control to one of the five levels. Therefore, when CPU 61 priority is set to a level such as, for example, priority level six, all bus requests on bus request level six and below are ignored. This allows operations of CPU 61 to take place without danger of being interrupted by a peripheral device having the same or lower priority level of CPU 61. It is possible to connect more than one peripheral device to the same bus request line. This is accomplished by connecting the devices in series. Therefore, as will be discussed hereinafter, when more than one device is connected to the same bus request line, the device connected to common bus 60 nearer CPU 61 will have a higher priority than a device further away.

Once a device other than CPU 61 has control of common bus 60, it may do one of two types of operations. These operations are: NPR data transfers; and interrupt operations. NPR data transfers can be made between any two peripheral devices without the supervision of CPU 61. Normally, these NPR data transfers will be made between a mass storage device, such as the magnetic tape system, and core memory. However, NPR data transfers may also take place between any of the peripheral devices. It should be noted that the state of CPU 61 is not affected by an NPR data transfer, and this is why the CPU can relinquish control for an NPR data transfer while an instruction is in the process of being executed. The other type of operation for which a peripheral device may make a bus request is the interrupt operation. Once a device has been granted control of common bus 60, it can request an interrupt which has the effect of interrupting the program or task that CPU 61 is presently processing. This is so that CPU 61 may then start processing another and more important program. Thus, when a peripheral device is granted bus control and then initiates an interrupt, that device having gained bus control places a "vector address" on common bus 60 which eventually operates to direct CPU 61 to the appropriate location in core memory 62 containing the new and higher priority program or service routine to be run. The essential data of the interrupted job is stored at specified locations of core 62 called "stack" and the called program is then processed by CPU 61. When the new job is completed, CPU 61 recalls the essential data of the interrupted program stored in stack and continues processing the interrupted job. It should be noted at this time, however, that a program being run in response to an interrupt may be interrupted itself by a bus request and subsequent interrupt having a still higher priority level. Thus, this still higher priority bus request may result in a third program being processed, which program has a higher priority than either of the previous two programs. If this occurs, CPU 61 will simply store the essential data of the second interrupted program in stack along with the essential data of the first interrupted program, and the third program will then be processed. Finally, of course, the originally interrupted program will be returned to in the reverse order it was stored and completed. To provide the necessary handling of registers for the interrupt procedure and other CPU functions, the CPU includes a number of so-called general or volatile registers $R_0$ through $R_5$ as shown at 83 in FIG. 1. Three additional registers designated "SP" (stack pointer), "PC" (program counter), and "PS" (program status) are particularly important with regard to program interrupts and will be described in more detail hereinafter.

Because of the real-time requirements of the system of the present invention, and the many unique types of peripheral equipment connected to common bus 60 which generates many different types of data signals the technique by which peripheral devices actually take over control of common bus 60 and then make data transfers or interrupt CPU 61 which may be processing a program should be understood. To accomplish this, more detailed discussion of common bus 60 is in order.

Common Bus:

It should be recalled that common bus 60 is comprised of fifty-six conductors. Forty of the fifty-six conductors are involved with data transfers. For example, sixteent lines are the actual data lines which carry sixteen bits of information between master and slave. Eighteen of these forty lines are reserved as address lines to be used by the master device to select the particular data register of the slave with which it will communicate. Two of the lines determine whether the transfer data is to be from the slave to the master device or from the master device to the slave device. Two more of the lines are for master and slave synchronization. Master-sync is a control signal used by the master device to indicate to the slave device that address and control information is present. Slave sync is the slave's response to the master that the address has been decoded and that the slave has either received the desired data or transmitted the data to the master. The last two lines available for data transfer are for devices connected to the common bus that use parity checks. It should also be noted at this point that all forty of the lines are bi-directional; that is, signals may flow through these lines in either direction.

Thirteen different conductors of the fifty-six conductors are used for priority arbitration of bus control. For example, five of the lines are priority bus request (BR) lines (i.e., NPR, BR-7, BR-6, BR-5 and BR-4) used by the particular peripheral device to request control of the bus; and another five of the lines are the corresponding bus grant lines (i.e., NPG, BG-7, BG-6, BG-5, and BG-4). These bus grant signals are the response from priority arbitrator 82 to the peripheral device making the bus request. The bus grant signals are asserted in accordance with the priority determination. A single line is used as the selection acknowledgment line. Selection acknowledgment (SACK) is asserted by the device that has requested and received a bus grant. Bus control passes to this device when the current bus master completes its operation. If this SACK signal is not received within a specified time after a bus grant signal has been sent, time will run out and the bus grant will be cleared automatically so that a new bus master may be appointed. Another single line is the interrupt line which is used by the bus master to assert a signal for interrupting CPU 61. The last line of the thirteen available for priority arbitration is the bus busy line. A signal is asserted on this line by the appointed master device to indicate that the bus is being used.

The forty lines available for data transfers and the thirteen lines available for priority arbitration make up a total of fifty-three lines. The remaining three lines are miscellaneous control lines and will not be discussed further as an understanding of the function of these lines is not necessary to understand the system operation.

Figure 3:
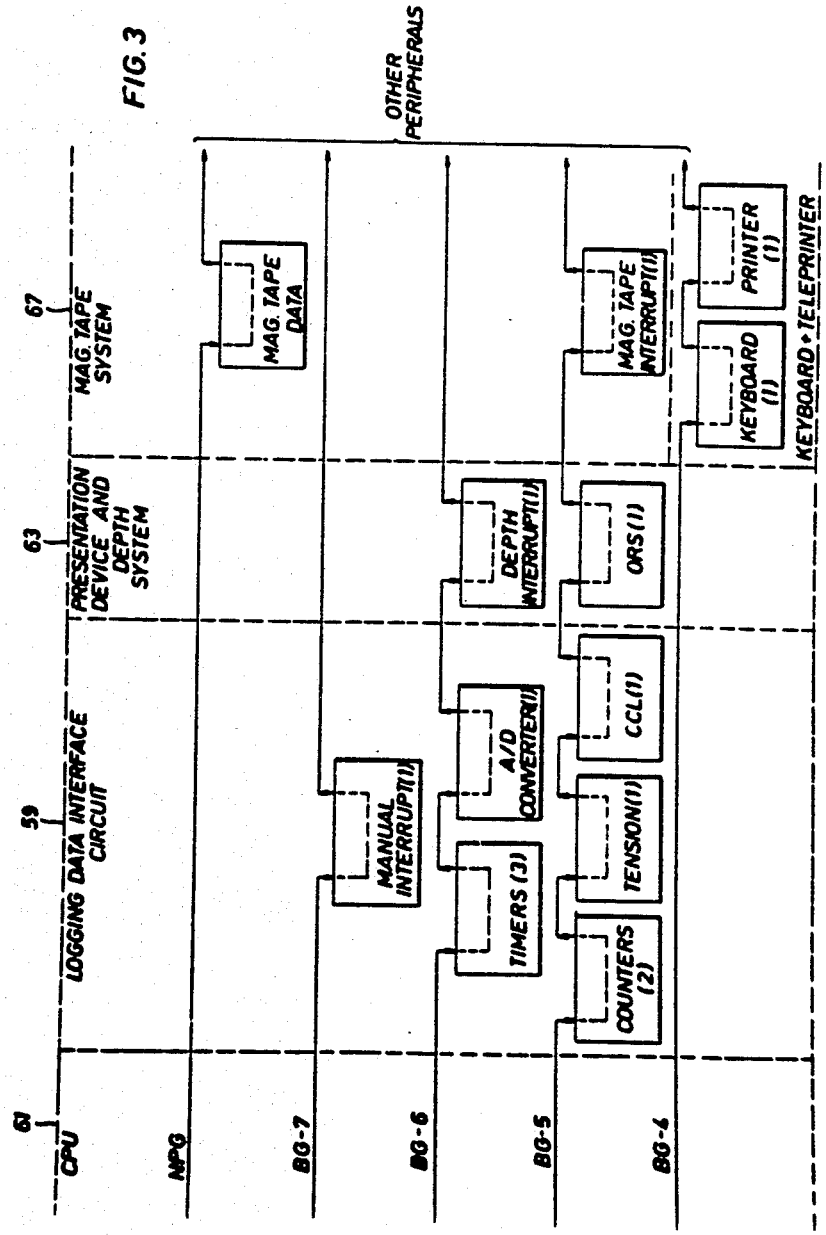
FIG. 3 shows the priority levels of various peripheral components having the capability of interrupting the operation of the system shown in FIG. 1.

Control of Common Bus:

Transfer of common bus 60 control fron one device to another is determined by priority arbitration logic found in priority arbitrator 82 which is part of CPU 61. Request for control of common bus 60 can be made at any time (asynchronously) on the bus request (BR) and non-processor request lines (NPR). The arbitration logic checks for an NPR request as an instruction is being executed (since these NPR requests take precedence even over use of the bus by CPU 61), and if such a request is present, the priority arbitrator 81 selects the requesting device as the next bus master. However, assuming there was not an NPR request then, at the end of each instruction execution, the priority arbitrator 82 checks the bus request lines against the priority of CPU 61 and if a higher priority request is present, the priority arbitrator selects the requesting device as the next bus master. This arbitration procedure may occur simultaneously while data is being transferred between two other devices. When the device scheduled to become the new bus master is selected, it waits for the present master to indicate that the bus is not busy. The newly selected device becomes bus master and asserts busy itself. The bus grant signals always pass serially through each device connected to the corresponding level in the system. FIG. 3 is a block diagram which shows the serial connection of the many peripheral devices used in the present invention. The device making the request blocks the grant signal from being transmitted to the next device on the line. Thus, the serially connected devices pass the grant signal on until the signal arrives at the peripheral device which made the request. This results in the device closest to the processor having the highest sub-priority on each request level.

Figure 4:
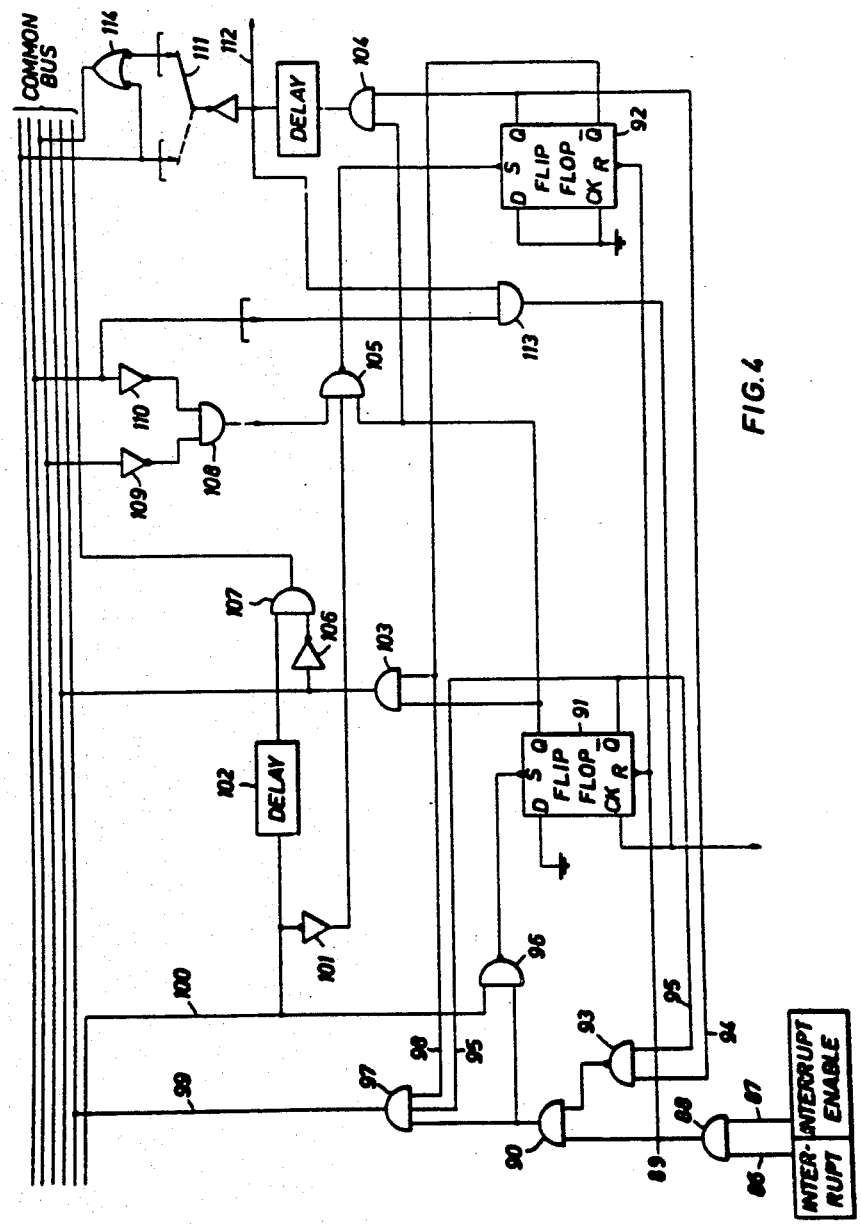
FIG. 4 shows a typical circuit whereby a peripheral device of this sytem may obtain control of the system bus.

The sequence of events by which the above-discussed bus mastership transfer takes place may be more readily explained by referring to the Bus Control request circuitry illustrated in FIG. 4. The illustrated circuit is typical, and it should be understood that any peripheral device capable of becoming bus master must have a similar circuit included therein. The device desiring control of the bus will assert a request on the bus request line assigned to it. The assigned line may, of course, be the NPR line or anyone of the other four bus request lines. However, for the following example, it will be assumed that the requesting circuit is connected to BR-6 (bus request line 6). (NPR and BR-7 lines are at a higher priority level, and BR-5 and BR-4 lines are at a lower priority level.) As shown in FIG. 4, when a peripheral device has a need to take control of the common bus, an initiate signal will be placed on line 86. This signal may then be combined with a signal on line 87, which in this example represents an enabling signal from the CPU. If both of the two signals are present at the same time, AND gate 88 provides a signal output on line 89. The enabling signal may not be present at all times, since it is possible that there could be a sequence of operations during which the CPU would not want the peripheral device to have the capability of becoming bus master. If this is the case, the enabling signal on line 87 will not be present, and any initiate signal appearing on line 86 attempting to make a bus control request would not be passed through AND gate 88. The bus request signal, or "1", on line 89 in the present example is then applied to one of the two inputs of AND gate 90, and is also applied to the reset input of flip-flops 91 and 92. The other input to AND gate 90 from inverting AND gate 93 will already be a "1". This is because the output of the inverting AND gate 93 will be a "1" except when both of the inputs to inverting AND gate 93 are "1's". However, in the present situation, the input signal to AND gate 93 on line 94 is from the Q output of flip-flop 92 and is therefore a "0", whereas the input to AND gate 93 from line 95 is from the $\overline{Q}$ output of flip-flop 91 and is a "1". Therefore, since both inputs of AND gate 90 are "1's", AND gate 90 will supply a "1" output. The "1" output from AND gate is then applied to one of the two inputs to inverting AND gate 96 and to one of the three inputs of AND gate 97. One of the remaining two inputs to AND gate 97 is supplied by line 95 which, as has already been explained, is presently supplying a "1". The third input to AND gate 97 on line 98 is also a "1"

as its source is the $\overline{Q}$ output of flip-flop 92. Therefore, since a signal on input line 87 completes all three of the inputs to AND gate 97 being "1"'s, AND gate 97 will send a bus request signal by way of connecting line 99 to BR-6 (bus request line 6). The priority arbitration logic of the CPU will receive the signal asserted on BR-6 along with any other signals from peripheral devices requesting control of the bus. The priority level of these various signals is evaluated by a priority arbitrator 82 (FIG. 1) discussed heretofore and compared with the priority level of the CPU. If the request signal on line BR-6 from AND gate 97 has the highest priority entering priority arbitrator 82 and a new bus master has not already been selected, (that is, a selection acknowledgment is not outstanding) the priority arbitrator will assert the corresponding bus grant signal on line BG-6. Then, as has already been explained and as can be seen from FIG. 3, each device on line BG-6 which is closer to the CPU than the requesting device passes the BG signal along until it arrives at the circuitry illustrated, which is, of course, the device requesting bus control. Once the bus grant signal finally arrives at the circuitry shown in FIG. 4, the bus grant signal, a "1", will be applied by way of line 100 to inverter 101 to delay circuit 102 and to the second input of inverting AND gate 96. Upon the arrival of the "1" signal at inverting AND gate 96, the output of AND gate 96 will change from a "1" to a "0" since both of the inputs to the AND gate will now be "1's". Therefore, flip-flop 91 will be driven to the set condition. This will occur since flip-flop 91 (as well as flip-flop 92) is set or reset on the trailing edge of a positive pulse. Therefore, the Q output of flip-flop 91 will change from a "0" to a "1", and the $\overline{Q}$ of output 91 will change from a "1" to a "0". When the $\overline{Q}$ output of flip-flop 91 changes from a "1" to a "0" one of the necessary three inputs to AND gate 97 is removed, and therefore, the bus request signal out of AND gate 97 is removed from line BR-6. With the change of the Q output of flip-flop 91, a "1" is applied to AND gate 103 and 104 and also to inverting AND gate 105. When the "1" signal from the Q output of flip-flop 91 is applied to AND gate 103, this gate will then supply a "1" output because the other input to AND gate 103 is connected by way of line 98 to the $\overline{Q}$ output of flip-flop 92. The "1" output of AND gate 103 is then applied to inverter 106. The output of inverter 106 supplies one of the two necessary inputs to AND gate 107. The other input to AND gate 107 is the BG-6 signal supplied from delay circuit 102. The normal output condition for inverter 106 is a "1" since the input of inverter 106 is normally a "0" supplied to AND gate 103. Now, if the illustrated circuit were not the requesting device, the output from AND gate 103 would be a "0" and the output from inverter 106 would be a "1". Therefore, when the delayed BG-6 signal was applied to AND gate 107, it would pass on through AND gate 107 and back on to the BG-6 common bus line to the next device connected in series thereto. However, since the illustrated circuit is the requesting device, the "1" signal from BG-6 is stopped at AND gate 107. This is because the request signal from AND gate 90 which set flip-flop 91 by way of gate 96, which in turn resulted in the output of AND gate 103 changing to a "1", and which in turn resulted in the output of inverter 106 which is applied to AND gate 107 going to a "0". The purpose of the delay circuit 102 is to insure that a status change in inverter 106 (initiated by a change in AND gate 103 and flip-flop 91) will have time to occur before the "1" signal from BG-6 arrives at AND gate 107.

The "1" output of AND gate 103, in addition to being applied to inverter 106, is also applied to the SACK (selection acknowledgment) line of the common bus. When the SACK signal arrives at priority arbitrator 82 of FIG. 1, the "1" signal on BG-6 will be removed. Recalling now that the bus grant "1" signal from BG-6 was applied to inverter 101, it will be appreciated that a "0" signal (inverted bus grant "1" signal) from inverter 101 will be applied to inverting AND gate 105 rather than a "1" which is usually present at inverting AND gate 105 from inverter 101. One of the other two inputs to inverter AND gate 105 is, as has already been explained, from the Q output of flip-flop 91. Therefore, when flip-flop 91 changes state as a result of receiving the bus grant signal, a "1" appears at the input of inverter AND gate 105. The other input to inverter AND gate 105 becomes a "1" when the two inputs to AND gate 108 are both "1's". Both inputs to AND gate 108 will be "1's" only if neither a slave sync signal nor a bus busy signal are present on the common bus. This is accomplished by inverting the slave sync signal and the bus busy signal by way of inverters 110 and 109 respectively.

Therefore, it is seen that the output of inverting AND gate 105 will not change from a "1" to a "0" prior to (1) the priority arbitrator in the CPU sending a bus grant signal to the present circuitry; (2) the present circuitry receiving the bus grant signal and acknowledging same with a SACK signal; and (3) the previous bus master and its slave have completed use of the common bus. However, once these three requirements have occurred, the normal "1" output of inverter AND gate 105 will change to "0", and flip-flop 92 will be driven to the set condition. When flip-flop 92 is set, the $\overline{Q}$ output of flip-flop 92 changes from a "1" to a "0". Therefore, a "1" signal will no longer be applied to AND gate 97 from flip-flop 92 which will, of course, also prevent a new bus request signal from being sent out from the present circuit. The $\overline{Q}$ output from flip-flop 92 is also applied to AND gate 103. Therefore, when the $\overline{Q}$ output changes from a "1" to a "0", the output from AND gate 103 will also change from a "1" to a "0". This means, of course, that the SACK signal placed on the common bus by this present circuitry will be removed and also, that the output of inverter gate 106 will change from a "0" to a "1". Therefore, all future bus grant signals will pass through AND gate 107 and back onto BG-6 of the common bus. In addition to the $\overline{Q}$ output changing from a "1" to a "0", the Q output from flip-flop 92 will change from a "0" to a "1". With this change, the present circuitry is still further inhibited from requesting bus control since with the presence of a "1" at the input of inverting AND gate 93, the output signal from AND gate 93 cannot be a "1". The "1" signal from the Q output of flip-flop 92 is also applied to the remaining input of AND gate 104. Therefore, since both inputs to AND gate 104 are now "1's", AND gate 104 will also provide a "1" output. The "1" output of AND gate 104 is applied through delay 104A to switch 111, line 112 and AND gate 113. At AND gate 113, the "1" signal is combined with the slave sync signal for purposes of further preventing any bus control request signals from being initiated by the present circuitry and for gating off the output of AND gate 104 after a slave sync signal has been received by the circuitry. This may be accomplished by "clocking" or again changing the state of flip-flop 91. This means, of course, that the $\overline{Q}$ output of flip-flop 91 will change from a "0" to a "1". Consequently, both inputs to inverter AND gate 93 will now be "1's", and therefore, the output of inverter AND gate 93 will change from a "1" to a "0". Thus, a bus control request signal cannot pass through AND gate 90. The clocking signal from AND gate 113 and applied to flip-flop 91 also, of course, results in the Q output changing from a "1" to a "0". Since the Q output controls AND gate 104, it can be seen that the "1" output signal from AND gate 104 will be removed. As mentioned above, the "1" output of AND gate 104 is also applied to switch 111. If the purpose of this particular bus request is for a mass data transfer, switch 11 will be in the position shown, and the signal from AND gate 104 will be placed on the bus busy line of the common bus by way of OR gate 114. However, if the bus request is set up for causing an interrupt, then switch 111, will be in the position illustrated by dashed lines such that an interrupt signal as well as a bus busy signal is applied to the common bus. In addition to being applied to switch 111 and AND gate 113, the output of AND gate 104 is also available on line 112 for use as an internal signal in the peripheral device to signify that the bus request processing has been completed, and the control of the bus has been granted to that device. This means that the peripheral device may then proceed with either data transfers or with an interrupt. The technique for using this signal for accomplishing these two purposes will be discussed in the following paragraphs.

Figure 5:
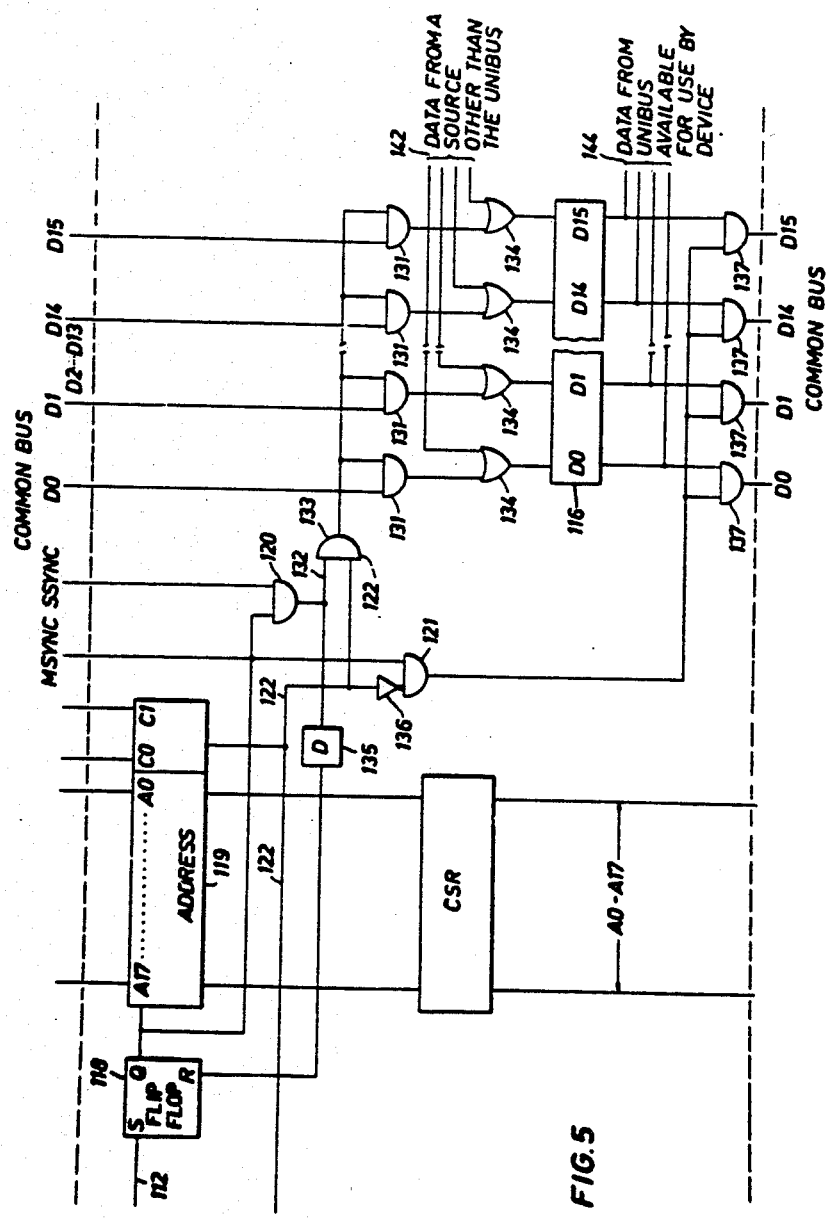
FIG. 5 shows typical circuitry for transferring digital data in and out of a master peripheral device having control of the system bus.

Mass Data Transfers:

If the purpose of the peripheral device requesting control of the bus was to perform data transfer, the interrupt would typically be by a non-processor request or NPR. However, data transfers could be accomplished at lower levels of priority. In any event, the technique of the data transfer for an NPR priority or a lower requested priority would be similar. Therefore, referring now to FIGS. 5 and 6, the technique for making data transfers by the present system will be described. FIG. 5 is representative of circuitry in the peripheral device which has become bus master, as a result of the previously discussed bus request circuitry. FIG. 6 represents typical slave circuitry in a second peripheral device for either transmitting data to the master device from the slave or from the master device into the slave. It should also be understood that although two different types of circuitry are used to represent a master device and a slave device respectively, typically each peripheral device may perform as either a slave or master. Therefore, a typical peripheral circuit would in actuality contain both the master circuitry shown in FIG. 5 and the slave circuitry shown in FIG. 6. It is also possible as will become more apparent later, that the data registers 116 and 117 of the master and slave devices illustrated in FIGS. 5 and 6 respectively could in reality be the same registers if the appropriate control circuitry were also present. However, for ease of explanation, the master circuit and the slave circuit are shown as completely separate circuits.

For mass data transfers, all bus activity is asynchronous and depends on interlocking of the control signals. In every case, a signal from a slave device is generated in response to a signal from a master device, and the master signal is dropped in response to the received slave signal. This removes the necessity of critical timing circuits and allows the bus to operate with various devices running at different speeds.

To perform the actual data transfer after the bus request has been granted to the peripheral device as previously discussed in conjunction with the bus request circuitry shown in FIG. 4, the output of AND gate 104 of that bus request circuit will be applied by line 112 to the set input of flip-flop 118 illustrated in FIG. 5. When flip-flop 118 is set, the Q output of flip-flop 118 will change from a "0" to a "1". Therefore, a "1" signal will appear at the strobe input of the address register circuit 119. The "1" signal from Q output of flip-flop 118 will also be supplied to the master sync line of the common bus, to one of the two inputs to AND gate 120 and to one of the two inputs to AND gate 121. The "1" signal received from the Q output of flip-flop 118 will strobe register 119 such that the address of the desired slave device will be put on the address lines A0 through A17 of the common bus. In addition, the appropriate signals will be put out on the two control signal lines C0 and C1 which determine whether data is to be transmitted from the master to the slave or from the slave to the master. Line 122 represents an input signal for internally setting register 119 to the desired mode. For example, if data is desired to be transmitted from the slave device to the master device a "1" signal might be applied to the register 119 by way of line 122, otherwise a "0" would be applied. Therefore, now referring to the slave circuit illustrated in FIG. 6, the signals on the address lines A0 through A17 and on the two control lines C0 and C1, will be received at decoder 123 of the addressed slave circuit. Decoder 123 of the slave circuit will then decode the address on lines A0 through A17 and place a signal on line 124 indicating the decoder has decoded its address. In addition, the decoder 123 wil also determine whether the slave circuit is to transmit data or receive data by decoding the signals on lines C0 and C1. If we assume for this example that the data are to be transmitted from the slave device to the master device, decoder 123 will put a "1" signal on line 125. Conversely, if data were to be received by the slave from the bus master, a "0" signal would be placed on line 125 instead of a "1". The output on line 124 from decoder 123 is one of two inputs to AND gate 126. The other input to AND gate 126 is the master sync signal which was placed on the appropriate line of the common bus by the master device. Therefore, once the slave device has decoded its address and received the master sync signal, a "1" signal will be applied to line 127 by AND gate 126. The "1" signal on line 127 is then applied to the appropriate line of the common bus as the slave sync signal. In addition, the "1" is also applied to AND gates 128 and 129. As a result of the two "1" signals being applied to AND gate 129 by way of connecting lines 125 and 127 respectively, data stored in digital register 117 will be placed on the common bus data lines as a result of the "1" signal output from AND gate 129. This "1" output from AND gate 129 is supplied to AND gates 130 so that data in the register 117 will pass through AND gates 130 and on to the common bus data lines. Referring again to the master circuit illustrated in FIG. 5, the slave sync signal (from AND gate 126 of the slave circuit) will be received at AND gate 120 and the data signals will be received at the several AND gates 131. Therefore, since a "1" signal is already present from the Q output from flip-flop 118 at AND gate 120, the occurrence of the slave sync signal will result in AND gate 120 providing a "1" output on line 132. Since the data is being transferred from the slave to the master, there will also be a "1" signal present on line 122. Thus, both inputs to AND gate 133 are "1's", resulting in a "1" output being provided to each of the several AND gates 131. Therefore, upon receiving the sync signal and the data signals, data register 116 of the master device will be loaded by way of OR gates 134 and AND gates 131. The "1" output on line 132 from AND gate 120 will also be applied to reset input of flip-flop 118 after a suitable delay provided by delay circuit 135. The purpose of delay circuit 135 is to assure enough time for registers 134 to be loaded before the master sync signal is removed from the common bus. Therefore, after the delay, flip-flip 118 will be reset which will remove the master sync signal from the common line along with the slave address signals and the two control signals C0 and C1. Once the master sync signal has been removed from the common bus by the master device, it can be seen in the slave circuitry of FIG. 6 that the slave device will in turn remove the slave sync signal from the common bus. Therefore, it can be seen that after data has been transferred from the slave device to the master device, the two circuits as shown in FIG. 5 and FIG. 6 are automatically returned to their original status. It should be understood, of course, that the above-described operation may be carried on as many times as desired for making data transfers. To make such multiple transfers, it is necessary that the master peripheral device also have some means of determining how many words of data are to be transmitted and when such transmission is complete. The process for transmitting data to a slave device from the master device is very similar to the above-described process. However, there are the following differences: In the master device circuitry shown in FIG. 5, the input to the address register 119 on line 122, (which determines whether the data transfer is to be to or from the master device) will be a "0" rather than a "1" which is opposite from the situation in the transfer of data from the slave to the master. Therefore, after this "0" signal is inverted by inverter 136 to a "1", the "1" input to AND gate 121 along with the master sync signal, the "1" signal from the Q output of flip-flop 118 will result in a "1" output from AND gate 121. This "1" output from AND gate 121 is then applied to the several AND gates 137. Therefore, data from data registers 116 will be put out on the data line of the common bus at substantially the same time the address signals and the two control signals C0 and C1 are put on the common bus. This means that the slave circuit illustrated in FIG. 6 will receive data signals at AND gates 138 almost simultaneously as it receives its address at decoder 123. Therefore, when the decoder 123 makes the determination that this slave circuit is the appropriate slave circuit and that data is to be received from the master device, a "1" signal will be applied to AND gate 126 by way of line 124 and a "0" signal will be applied to inverter 139 by way of line 125. Inverter 139 will then invert the "0" signal applied thereto and a "1" will be applied to AND gate 128. In addition, since the master sync signal and the "1" signal on line 124 from decoder 123 will both be present at AND gate 126, AND gate 126 will provide a "1" signal to AND gate 128. Therefore, since both inputs to AND gate 128 are "1's", it can be seen that the slave circuit will strobe the data from the common bus data lines into register 117 by way of AND gates 138 and OR gates 140 at the same time a slave sync signal is placed on the common bus by connecting line 127. Once the slave sync signal is received at the master circuitry shown in FIG. 5, the master sync signal, the address signals, the control signals C0 and C1, as well as the data signals from AND gates 137 will be removed from the common bus. Thus, the master circuitry of FIG. 5 as well as the bus request circuitry of FIG. 4 will be reset and ready for another data transfer if and when desired.

CPU Interrupt:

If the purpose of requesting bus control of FIG. 4 is for processing an interrupt, then switch 111 will be in the dashed position such that an output from AND gate 104 will place both an interrupt signal and a bus busy signal on the common bus. At approximately the same time the interrupt signal is placed on the line, the signal from AND gate 104 will also be applied by way of connecting line 112 to vector address read only memory (ROM) 141 shown in FIG. 7. The vector address register 141 will then place a vector address on the "data lines" of the common bus. Once the interrupt signal and the vector address on the data lines has been received by the CPU, the CPU will assert slave sync after the data (i.e., interrupt vector address) has been read into the CPU. The bus master device will then receive slave sync as asserted by the CPU and clear the interrupt line, the data lines and the bus busy line as discussed with respect to data transfers. When the CPU sees the interrupt signal cleared, the CPU will clear the slave sync signal and enter into the necessary sequence as directed by the vector address received on the data lines to process the new program.

Therefore, from the foregoing it can be seen that after the new bus master has completed either data transfer or an interrupt process, the bus busy signals will be cleared such that a new bus master can take control of the bus. If a new bus master is not selected by the processor, the processor will assert a busy signal and continue processing any tasks of lesser importance which have not been completed until a new bus request from one of the peripherals occurs. Thus, it can be seen by the use of this type of real time control, considerable flexibility is available for use by the system of the present invention.

Peripheral Devices

Magnetic Tape System:

As has been mentioned, it is desirable that the system of this invention include auxiliary memory devices for recording derived data as well as for storing the necessary programs for controlling the CPU. In the described preferred embodiment, this auxiliary memory device is a magnetic tape system comprising a controller 67 and two tape transports 68 and 69 as illustrated in FIG. 1. In a normal operating mode, one of the transports would support a magnetic tape containing the many data tables and varied programs necessary for controlling the system (via the CPU) and the other transport would provide permanent storage for newly obtained data. Suitable transport and controllers are readily available from many commercial sources, and only a summary discussion of this part of the system will be presented. Although, as mentioned above, one transport is typically used for holding the tape which stores the required programs and the other transport is used for holding the tape which stores the derived data, the following discussion will not make such distinctions as a magnetic tape controller with the aid of instructions from the CPU by way of suitable CSR's is typically well equipped to handle the problem of determining whether the "program" or the "data" transport should be operating.

Since a magnetic tape system is used as the source of the controlling programs and is also the source for storing the derived data, it can be seen in the system of the present invention that the transmission of data between the controller of the magnetic tape system and the common bus must be bi-directional. Therefore, for a magnetic tape storage device to properly interface this system of the present invention, it will preferably include interfacing circuits similar to the bus control request circuit, the master circuit, the slave circuit and the vector address circuit shown in FIGS. 4 through 7 respectively.

In a typical situation, the magnetic tape controller 67 illustrated in FIG. 1 would be under CPU instructions to transfer at an NPR level a number of digital words contained on the program tape to a suitable memory location, such as core memory 62. For example, if it is assumed that the CPU, by way of hardwire, manual programming or earlier software programming has directed the magnetic tape system to move the magnetic tape containing the program instructions to the first word in a particular block of instructions such that the first word of instruction may be read off of the tape by the recorder read-head and placed in a data register connected to the common bus, and if it is also assumed that the magnetic tape system has instructions as to the memory address at which the first data word is to be stored and the total number of words to be transferred from the magnetic tape, then it can be seen that the system is prepared to transmit data to core memory 62. Referring now to FIGS. 4 and 5 in conjunction, such a data transfer will be explained. The CPU will have set appropriate CSR's (controls and status registers) in the magnetic tape system (by either hardwire instructions or earlier-programmed instructions) such that the address of the appropriate memory location at which the first data word is to be stored will be placed on the common bus line by register 119 of FIG. 5 at the appropriate time. Therefore, referring to FIG. 4, when the CPU is ready for the block of data to be transferred, an initiate enable signal is applied to line 87. Now, since the magnetic tape system is already prepared to place data on the common bus, the first word of data to be transmitted will have been read from the program tape and placed in register 116 (by way of lines 142) of the magnetic tape system's master circuit which is illustrated in FIG. 5. Therefore, an initiate interrupt signal will already be present on line 86 of FIG. 4.

It should be noted at this time, that many magnetic tape formats may possibly be used. The tape format in this described preferred embodiment is a nine channel tape. Eight of these channels will be used for data and the ninth channel will be used for parity check. Therefore, since the data register 116 is a 16-bit register and the tape can only handle 8 bits of data at any one time, the tape must read two successive tape locations into the register to fill register 116 with 16 bits of data. This means that the 8 bits of data from the first of two tape locations will be read into the lower 8 bit bytes of register 116 and then 8 bits of data from the second of two tape locations will be read into the upper 8 bit bytes of register 116. Therefore, eventually a 16-bit word will be loaded into 16-bit data register 116. Each time two new bytes of data are transferred from the tape to register 116 by way of line 142, an initiate signal will be supplied to line 86 of FIG. 4.

Therefore, in the present example, since the initiate interrupt signal is present when the CPU applies the interrupt enable signal on line 87 the magnetic tape system will eventually obtain control of common bus according to the sequence of events already discussed in conjunction with the circuitry shown in FIG. 4. Now, when the magnetic tape system (a peripheral device) has gained control of the bus, a strobe signal will be sent out on line 112 by the bus request circuitry to circuitry of the type illustrated in FIG. 5, and at the same time, a bus busy signal will be applied to the common bus. Recalling the earlier discussion of the operation of the circuit shown in FIG. 5, it should be remembered that receiving a strobe signal on line 112 results in the address stored in address register 119 and the data in register 116 being placed on the common bus address and data lines respectively. When the data has been read into the appropriate memory location in accordance with a slave circuit of the type illustrated in FIG. 6, the data and address line of the common bus are cleared and in condition to make another transfer. In addition to clearing the address and data lines of the common bus, completing the data transfer will also cause the address contained in address register 119 to be increased by one location and will decrement a counter in the peripheral device which keeps count of the number of data words that have been transferred. It should be recalled at this point that when the data transfer is taking place at the NPR level such transfer occurs between bus cycles and therefore temporarily prevents bus access but does not interfere with the program instruction being executed by the CPU. Therefore, when the 16-bit word of data has been transferred from register 116 into the appropriate core memory location, the CPU will continue processing of its present tasks. After the contents of register 116 have been transferred, the address of register has been increased by a location and the count of the number of data transfers decremented and while the CPU is busy with its other tasks, data register 116 is loaded with the next two bytes of data from the program tape. When the loading of register 116 is complete, an initiate signal is again sent to the priority arbitration in the CPU, and the above-mentioned procedure is repeated. This eventually results, of course, in the second word being transferred to core memory. This continues until all the words contained in the particular block of data on the program tape have been transferred. When the last word has been transferred, the counter originally set equal to the number of transfers desired to take place will have been decremented to zero. When this happens, a different and lower level bus control request circuitry of the magnetic tape system will initiate a request for bus control. After this lower level control is granted, a vector address will be strobed onto the data lines of the common bus according to the method described in conjunction with FIG. 7. This vector address will direct the CPU to a very short program contained in core memory which will in turn inform the CPU that the appropriate block of data has been transferred from the program tape into core and that the initiate enable signal present on line 87 of the circuit shown in FIG. 4 should be removed. This description of a NPR data transfer is a preferred method of transferring data from the magnetic tapes system to core memory in this system. That is, it requires less time from the CPU than second and third possible methods which will now be described in conjunction with FIGS. 4, 6 and 7.

In a second method, the CPU will have set appropriate CSR's in the magnetic tape system such that the vector address of a program containing the memory location at which the block of data is to be stored will be placed on the common bus data lines by register 141 of FIG. 7 at the appropriate time. Therefore, referring to FIG. 4, when the CPU is ready for the block of data to be transferred, an initiate enable signal is applied to line 87. Now assuming that the magnetic tape system is prepared to place data on the common bus, the first word of data to be transmitted will be present in register 117 of the magnetic tape system's slave circuit which is illustrated in FIG. 6. Therefore, an initiate signal will already be present on line 86 of FIG. 4. Now, since the initiate signal on line 86 is present when the CPU applies the initiate enable signal on line 87, the magnetic tape system will obtain control of the common bus according to the sequence of events already discussed, and a strobe signal will be sent out on line 112 to circuitry of the type illustrated in FIG. 7, and at the same time, a bus busy signal and an interrupt signal are applied to the common bus. Recalling the earlier discussion of the operation of the circuit shown in FIG. 7, it should be remembered that receiving a strobe signal on line 112 results in the vector address stored in register 141 being placed on the common bus data lines. By responding to the interrupt and the vector address, the CPU is advised that register 117 has been loaded and is ready for use. Thus, according to priority levels of other waiting tasks, the CPU will eventually read the data stored in register 117 and transfer the data to an appropriate location in memory. That is, at the appropriate time, the CPU would simply send out the proper address to decoder 123 and strobe the data out of register 117 and into memory. When this one 16-bit word of data has been transferred from register 117 into the memory location, the CPU will return to the processing of the other tasks. After the contents of register 117 have been transferred, and while the CPU is busy with other tasks, data register 117 is loaded with the next two words on the program tape by way of connecting lines 143. When the loading of register 117 is complete, an initiate signal is again sent to the priority arbitration in the CPU, and the above-mentioned procedure is repeated. This eventually results, of course, in the second word being transferred to core memory. This continues until all the words contained in the particular block of data on the program tape have been transferred. At this point, there will be no further initiate signals applied to line 86 of the circuit shown in FIG. 4. In the third possible method, the magnetic tape system never initiates a request for control of the common bus and never becomes bus master. Instead, the magnetic tape system only acts as a slave device. In such a transfer, after the CPU has instructed the magnetic tape system to read a word of data from the magnetic tape, the CPU would then wait until the data had been loaded into the 16-bit data register 117 shown in FIG. 6. When the magnetic tape system indicated that the data register 117 was loaded by setting a done bit in a command and status register, the CPU would then send out the proper address to decoder 123 and move the data out of register 117 and into the appropriate memory location. The CPU would then wait until the second word had been loaded into the data register 117 and would repeat this process until the whole block of data had been transferred. In most situations, the second and third techniques would not be desirable for data transfer between the magnetic tape system and core memory, since constant redirection of the CPU would result in excessive loss of time by the CPU. There are data transfers between other types of peripheral equipment, however, where such data transfers are most appropriate and are used by the system. These devices will be further discussed hereinafter.

To transfer data from a memory source onto the storage tape, the process is substantially the same as the first method of transferring data from the tape system to core memory. In a manner similar to transmitting data from tape to core, the address of the first core location and the number of data words to be transmitted will be set into the appropriate CSR's of the magnetic tape system.

When the CPU is ready for the data transfer, the CPU sends an interrupt enable signal to the appropriate CSR of the magnetic tape system. If we assume that the magnetic tape system is ready to receive data, this enable signal will immediately result in an initiate signal on the NPR line of the common bus. The CPU will then turn over control to the magnetic tape system according to the previous discussion made in conjunction with FIG. 4. The transfer of data from core memory to the magnetic tape system will proceed as just described for a transfer of data from the tape to core except the slave (core memory) will transmit the data contained in the address memory location to register 116 located in the master device (FIG. 5) rather than receive data from register 116. After the data word has been transferred to register 116, the address in register 119, representative of the location of the first data word to be transmitted will be increased by a location, the counter keeping track of the number of data transfers taking place will be decremented and the CPU will return to processing other tasks until the magnetic tape system finishes writing the data contained in register 116 on the data tape by way of connecting lines 144 and is ready to receive a new data word. The data in the data registers 117 is broken down into the upper and lower bytes and written on the 9-channel tape (8 data channels; 1 parity channel) in serial fashion. When the magnetic tape system is ready to receive another word, the system will again send out a bus request signal on the NPR request line of the common bus. Of course, this transfer of data will continue until the complete block of data has been placed or written on the storage tape. After the block of data has been transferred, the magnetic tape system will cause an interrupt informing the CPU of this fact in the same manner as described with respect to transferring data from the tape to core memory. Data may also be transmitted between core memory and the magnetic tape system in a manner similar to the second and third techniques described for transmitted data between the tape and core memory. As before, however, these second and third methods may be too time consuming and therefore the first method is preferred. The many housekeeping chores of writing on a data tape are typically accomplished by the magnetic tape recorder and transports and since such information and apparatus is readily available and known by those skilled in the art and since such operation does not comprise part of the present invention, no further discussion of these processes will be given.

Keyboard Input/Teleprinter Output:

During an actual well logging operation it is often desirable to make minor changes in the data contained in the program tables (that is, change certain constant input parameters such as the mud filtrate resistivity, $R_{mf}$, etc.) or to print out information concerning certain conditions of the program, the system, or the logging operation in general for ascertaining, for example, whether or not changes should be made to the program and data tables. To provide such input and output information exchanges between the engineer operating the system and the system, the system of the present invention includes a keyboard 81 and a teleprinter output unit 71. As in the case of the magnetic tape unit, suitable units are readily available from many manufacturers. The operation of these two companion units will be broken down into two distinct operations. The possible techniques of transmitting data from core memory (or other peripheral storage registers) to the teleprinter are very similar to the second and third previously discussed techniques of writing on the magnetic tape. For example, according to one mode, the CPU will address the appropriate slave circuit such as that shown in FIG. 6. At the time the address of register 117 in the teleprinter is placed on the common bus address line, the master sync signal and the data signals necessary for causing the desired character to be printed on the teleprinter are also placed on the appropriate common bus lines to that register 117 is loaded with the desired data. When the teleprinter has used the data signals by way of connecting lines 145 and has caused the character to be printed out, a "done" bit will be set in an appropriate CSR. The CPU which has monitored the done bit either continuously or periodically will then send the next set of signals on the common bus lines to cause the second character to be printed. This process may continue until the complete message has been printed by the teleprinter. However, because of the excessive amount of time necessary for monitoring the done bit, this technique is too time consuming for most applications. Therefore, the preferred method for printing a message is that the CPU will address and load the data register 117 of the slave unit in the manner already discussed and then continue working on any other task that may require processing. In the meantime, the teleprinter will take the necessary required time to complete printing the character, and when finished will cause a bus request at some level such as BR-4 for purposes of interrupting and notifying the processor that the teleprinter is now ready to receive a second word. The CPU once being advised that the teleprinter is available will take care of all necessary and higher priority tasks and will then send out data signals on the data line to cause the second character to be printed. Thus, by using this technique, the CPU can send the data necessary for a single character, return to more important tasks and when the printer has completed printing the single character then cause a second character to be printed. This technique obviously results in a considerable time saving over the first described technique.

The operation of the keyboard also uses a similar technique. Referring now to FIGS. 6 and 7, when an engineer decides to send a message to the computer, a character key will be struck which results in the appropriate information or binary digital signals being loaded into data register 117 by way of lines 143 and OR gates 140. At the same time the data register is loaded, the keyboard makes a bus request by means of a bus request circuit similar to that shown in FIG. 4. Once the bus request has been granted by the CPU, an interrupt is sent out to the CPU, and a strobe signal is sent out on line 112 to the vector address register circuitry of FIG. 7. This interrupt along with the vector address has the effect of advising the CPU that a data word has been placed in the keyboard data register and should be processed. Therefore, at the proper time according to the priority logic, the CPU will branch off and process the data word from the keyboard slave data register 117. The CPU will then continue processing any other programs then awaiting processing. When the engineer hits a subsequent key the same procedure takes place. Eventually, of course, the engineer will have completed typing in a message to the CPU. It should be pointed out at this point, that it is not necessary that the engineer wait between typing characters as the speed of the computer is so fast that it is likely to be physically impossible that the engineer would strike two keys in rapid enough succession that the CPU would not have already processed the previous word and have cleared the register for the second word. Once the complete message has been typed in at the keyboard, the engineer will type in a message complete signal which will result in the CPU eventually reading the total message to determine what action is requested by the engineer.

Modem:

In certain situations the necessary computations and routines for providing a given computed measurement may require more storage capacity than is conveniently available in the core memory 62. In such cases, therefore, modem 70 may be fed raw or partially processed well logging measurements under program control for transmitting to a distant location for processing by a larger computer having sufficient core storage. It is also possible that the information derived from previously logged wells might be important to information being derived from a well presently being logged. In such a situation, the newly obtained information might best be transmitted by way of modem 70 to a central location for processing and evaluation while the logging tool 50 is being operated. One example of the system for feeding well logging data to a modem for such purposes can be found in U.S. Pat. No. 3,599,156. The technique for transferring data from core memory to the modem for transmission to a remote location is similar to the technique discussed for transmitting data from core to the teleprinter system. That is, the data word is placed into data register 117 (See FIG. 6) contained in the modem, and then while the modem is processing the data word; that is, transmitting it to the remote location, a new data word is read into register 117. This may be accomplished by either the earlier described techniques of the CPU monitoring and waiting for the modem to completely process the data before a new data word is read into register 117 or by causing an interrupt to be sent to the CPU to inform the CPU that the modem is now available for receiving a new word for transmission. The system, of course, would operate in the reverse situation for bringing data from a remote location into core storage if this were desired, and the technique would be very similar to the above technique except data is transmitted from register 117 to core memory instead of from core memory to register 117. Again, it should be recognized at this point that the modem, the magnetic tape system, and the keyboard and teleprinter system are all commercially available hardware and the above discussions are for purposes of acquainting the reader with their operations.

Visual Display:

In addition to recording the data derived from the wellbore on magnetic tape, the present invention also includes a display system which provides a visual presentation of the data. A display system particularly suited for use with this system of the present invention is the unique and valuable well logging recorder described in a copending application filed by J. W. Elliott on Mar. 2, 1970 and having Ser. No. 015,790 filed on Mar. 2, 1970, and issued as U.S. Pat. No. 3,986,163 on Oct. 12, 1976.

Figure 8:
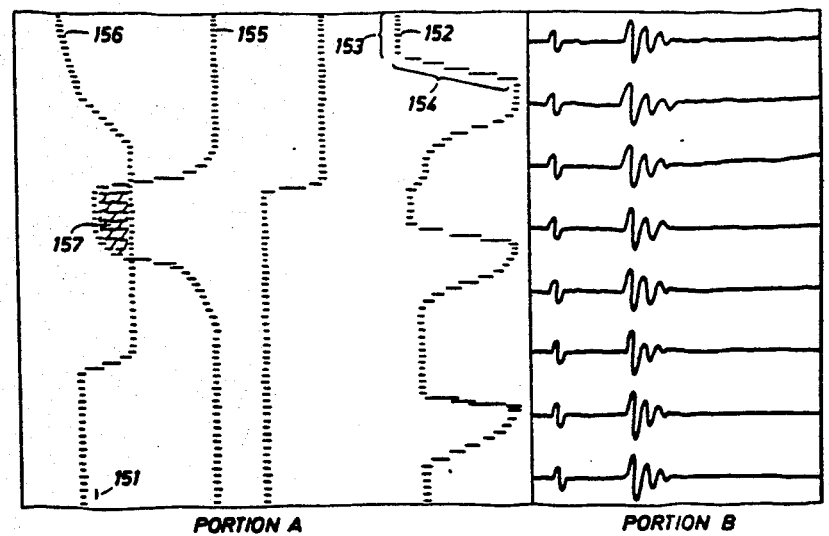
FIG. 8 is a representative of a typical section of a log produced by the visual presentation display device of FIG. 1.

The recorder described in the copending application is a multichannel recorder having a CRT (cathode-ray tube) as a display medium. The electron beam of the CRT is repetitively swept along the horizontal axis of the screen of the CRT, and during each horizontal sweep the beam is turned on and then off one time for each of the many channels at a point along the horizontal axis representative of the data being recorded. Each of the channels available for recording has a bias voltage level associated with it for purposes of evenly distributing the location of the channels along the horizontal axis of the CRT. In such a recorder, the vertical drive of the CRT does not vary in proportion to the applied data signal. However, in one embodiment, prior to each sweep the position of the electron beam is incremented a preselected distance along the vertical axis. Referring now to FIG. 8, there is shown an illustration of how a plurality of channels of data could be presented on the screen of the CRT. In this example, the incremental distances 151 between successive sweeps is greatly exaggerated to demonstrate how the recorded data or curve of each channel is in reality built up of many segments; a segment of each trace being produced with each horizontal sweep of the CRT beam. A unique feature which allows the recording to provide constant intensity traces should also be noted. Referring to curve 152 of FIG. 8, it can be seen that the length of each segment varies as the rate of change of the data varies. Thus, the segments 153 are short during a DC or slowly changing signal and the segments 154 are longer representing the increased rate of change of the signal. In the actual recorder described in copending application Ser. No. 015,790 filed on Mar. 2, 1970, and issued as U.S. Pat. No. 3,986,163 on Oct. 12, 1976, the vertical incremental steps are so small and close to each other that the individual segments are invisible and the resulting curves appear to be continuous. In still another embodiment of the recorder described in the copending application, a recording medium such as photographic film may be moved past the face of the CRT screen along the vertical axis in preselected increments prior to each sweep of the electron beam of the CRT. If this embodiment is used, it is not necessary for the CRT electron beam to be indexed along the vertical axis, as each sweep of the electron beam would be recorded at a location on the photographic film at a preselected increment from the location where the previous sweep recorded. In such an embodiment, the illustration shown in FIG. 8 would be representative of a developed portion of the photographic film. In should also be pointed out at this point that the recorder described in the copending application Ser. No. 015,790 filed on Mar. 2, 1970, and issued as U.S. Pat. No. 3,986,163 on Oct. 12, 1976 also has the built-in capability for coding each of the individual traces such that may be readily recognized. The recorder also has the capability for generating several specific types of coding patterns to fill in selected areas on the recording medium. For example, if curve 155 crosses curve 156 in the representative recording to FIG. 8, coding of the areas between the two cross curves could be generated such as in shown at 157. To use the trace and area coding capabilities of this recorder, it is necessary to provide instructions as to how each trace is to be coded and what type of area coding is to be placed between which traces. Such instructions may be provided to the described recorder in accordance with programmed instructions from the CPU. To record a multiplicity of channels and to provide such trace and area coding, the recorder uses an addressable data register for each channel, and as many other addressable CSR's (control and status registers) as necessary to instruct the recorder as to traces, area coding and other necessary information. For example, to use the CRT recorder for providing a recording, on a photographic film, the CPU will load a data register (similar to register 117 in the slave circuit of FIG. 6) for each channel with the well logging data to be recorded. When all of the data registers are loaded, the CPU will then instruct the CRT recorder to "step" the film an incremental distance along the vertical axis and then to sweep the electron beam horizontally across the screen of the CRT. As the electron beam sweeps across the screen of the CRT, the data contained in the many data registers will be used to determine the location along the horizontal axis at which the electron beam will be turned on and off for each channel. After the electron beam has traversed the screen, the beam will be turned off or "blanked" during the retrace of the beam. The CPU will be made aware of the electron beam completing its sweep by way of an interrupt, and will load new data into the several data registers for another sweep. This procedure is repeated, of course, each time it is desired to record data on the CRT recorder. As will become apparent, therefore, except for the ususually large number of control and status registers used for properly setting up the CRT recorder, the transmitting of data between the recorder and core memory is very similar to the transmitting of data between the teleprinter and core memory. For example, the recorder uses a bus control request circuit such as is shown in FIG. 4, and as many slave data receiving circuits such as shown in FIG. 6 as there are channels available for recording data. The operation of the CRT recorder, with respect to the CPU and the common bus, is therefore, as follows. When the CPU is ready to record data by way of the CRT recorder, each of the many data registers of the slave type illustrated in FIG. 6 are addressed by the CPU in sequence and loaded with the appropriate data. After the data is loaded in all of the registers, the CPU will instruct the recorder to increment the photographic film and then to sweep the electron beam across the screen. After making these instructions to the recorder, the CPU will then return to the processing of other tasks. As the beam is swept across the CRT screen, separate indicia representative of each data channel are recorded on the film as described earlier. When the sweep is completed, the CRT recorder will initiate a bus request by way of a bus control request circuit of the type shown in FIG. 4. After gaining control of the bus, the CRT will, by way of an interrupt signal and a vector address circuit (of the type illustrated in FIG. 7) inform the CPU that the sweep is complete and that the recorder data registers are again available for new data. After this procedure has been repeated many, many times, a recording of the type shown in FIG. 8 will result. It should also be pointed out that this recorder could operate without using the bus control request circuitry of FIG. 4 and the vector address to provide an interrupt. That is, the CPU would continuously or periodcally monitor the recorder until the beam sweep completed as indicated by a done bit in one of the CRSs and then place new data in the registers. This technique would be undesirable in most situations due to the excessive amount of times the CPU would be kept away from processing other important tasks.

Well Logging Apparatus:

As was mentioned heretofore, if well logging data is to be effectively used, it is necessary that the data be accurately coordinated with the depth of the wellbore from which the data was obtained. There are at present many techniques familiar to those skilled in the art for correlating well logging data with depth, and any of these techniques that offer overall sufficient accuracy as well as provide accurate indications of small increments of the wellbore being traversed by the downhole investigating device may be used.

Depth System—In the depth system shown in FIG. 1, it will be recalled that a wheel 74 is driven in response to the movement of the well logging cable 51. A shaft connected to measuring wheel 74 is also connected to depth pulse generator 76 such that rotation of measuring wheel 74 results in pulses being generated by depth pulse generator 76. As previously discussed with respect to FIG. 1, each depth pulse represents a movement of the well logging cable 51 in the wellbore by a predetermined amount, such as for example 0.01 inch. These 0.01 inch depth pulses are then applied to depth system 73 where they are processed. Also, referring to FIG. 1, it will be recalled that tension at the surface on well logging cable 51 is sensed by tension device 72.

Figure 9:
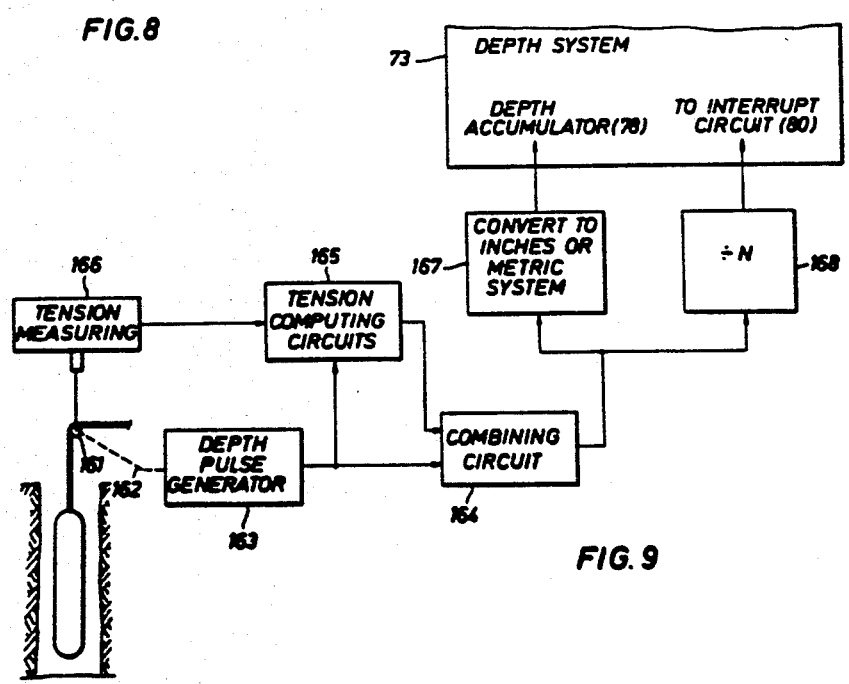
FIG. 9 shows a block diagram of a depth system for providing depth information and pulses indicative of the well tool traversing a specific increment of wellbore suitable for operation in the embodiment of FIG. 1.

It is highly desirable that information concerning the tension exerted on the cable supporting the tool be maintained. Since the tension in the cable will be maximum at the surface, this value can be continuously monitored by way of tension device 72. In addition to monitoring the tension to avoid an overloaded cable and possible breaking, the tension information can also be used for correcting depth information. This is especially important since the difference between measured depth of a well logging tool in a wellbore and the actual depth often vary by a significant value due primarily to stretch in the cable; and cable stretch is primarily a result of the tension in the cable. Therefore, if depth can be corrected with respect to the tension in the cable, differences between measured depth and actual depth can be significantly reduced. A very valuable and unique method of making depth corrections to the measured depth as a function of tension in the supporting cable is described in U.S. Pat. No. 3,566,478. The system of the present invention may readily include a depth correction system which incorporates the concepts of the above patent. For an in-depth understanding of such related depth corrections, reference should be made to the patent. However, for purposes of better understanding the present invention and how such a system may be incorporated into the present invention, a summary of the depth correction system taught in U.S. Pat. No. 3,566,478 is described in the following paragraphs. Referring now to FIG. 9, there is shown a block diagram of a depth system as it may be incorporated in the preferred embodiment of this invention. As in FIG. 1, encoder or measuring wheel 161 drives mechanical shaft 162 connected to depth pulse generator 163 which produces electrical pulses, each of which is representative of the well logging tool traversing 0.01 inch in the wellbore. The 0.01 inch pulses are applied to a pulse combining circuit 164 and a tension circuit 165. Also applied to the pulse combining circuit 164 are correction pulses from tension circuit 165 which may be added or substrated to the 0.01 inch encoder pulses for purposes of correcting the train of 0.01 inch indication pulses with respect to changes in tension. These correction pulses from circuit 165 are derived from the tension measurement produced by tension measuring device 166 and from other information including a measuring wheel calibration factor. Therefore, the output of the pulse combining circuit 164 consists of a series 0.01 inch depth pulses corrected for tension. This corrected train of pulses is then made available to converter circuitry 167 where the 0.01 inch pulses will be appropriately divided to produce 0.1 foot pulses or 0.1 meter pulses whichever is desired. The 0.1 foot pulse or 0.1 meter pulses are then applied to depth accumulator 78 of FIG. 1. The 0.1 inch corrected pulses are also applied to a divide by N circuitry 168. After being divided by the appropriate number (N), the output of the divide by N circuitry 168 is then connected to depth interrupt circuitry 80 of FIG. 1 wherein a bus control request circuitry of the type shown in FIG. 4 is triggered for purposes of causing a depth interrupt. The significance of a depth interrupt will be discussed in detail hereinafter.

General Interface—In the well logging industry, there presently exist many varied downhole logging tools. In addition, there is rapid and continuous development of new types of downhole logging tools. If existing and newly developed tools are to be operable with the system of the present invention, it is necessary to develop appropriate tool modules to interface with the system for each of the downhole logging tools. Therefore, to avoid costly and complex design problems, it is desirable to keep the actual tool modules as simple as possible. To accomplish this, the described preferred embodiment illustrated generally in FIG. 1 and more specifically in FIG. 2 employs a logging data interface circuit 54 which includes DIO circuitry 58, A/D converter circuitry 57 and buffer circuitry 55 to handle the complex yet usual interface problems. In addition, the general interface circuitry 59 provides direct communication between the common bus and the DIO 58, A/D converter 57 and buffer 55 signal processing circuits.

Figure 10:
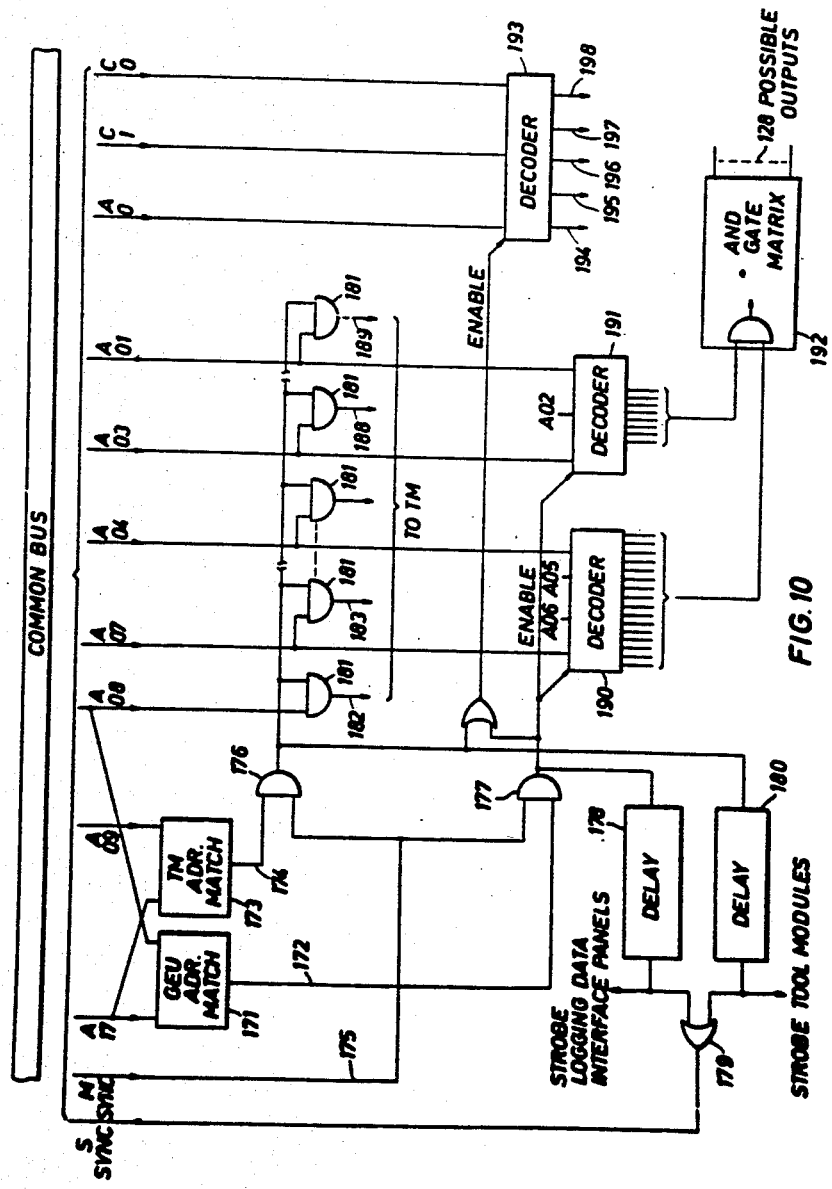
FIG. 10 shows addressing circuitry contained in the General Interface panel of the system shown in FIG. 1.

Referring now to FIG. 3, it can be seen that there are many possible interrupts which occur as a result of signal from the general interface 59. For example, in the described embodiment general interface 59 is illustrated in FIG. 3 as providing nine possible interrupts. This number could vary, of course, as the need varies. Therefore, general interface 59 contains at least as many bus control request circuits similar to that shown in FIG. 4 and vector address circuits of the type shown in FIG. 7 as there are interrupts. At the present, bus control requests from the general interface circuit 59 shown in FIGS. 1 and 2 are not made except for purposes of interrupting the CPU. Consequently, mass data transfers do not occur between logging data interface circuitry 54 and common bus 60 when general interface 59 is operating as the master device. However, mass data transfers may be expected to occur routinely between logging data interface circuit 54 and common bus 60 when general interface 54 acts as the slave device. Therefore, there are no circuits presently in the general interface of the type shown in FIG. 5. It should be appreciated, however, that if future development made mass data transfers desirable when general interface 54 was bus master such capability could readily be achieved by simply adding a circuit of the type shown in FIG. 5. There is only one slave circuit in general interface 59 of the type shown in FIG. 6. In addition, address of this slave circuit is somewhat specialized as is shown in FIG. 10. Comparing the circuit shown in FIG. 10 with the address control portion of the slave circuit shown in FIG. 6, it can be seen that all of the involved signals; namely master sync, slave sync, A0 to A17 and the control signals C0 through C1 are the same. Also, the purposes of these signals basically remains the same. There are differences, however, which are for purposes of simplifying and reducing the apparatus necessary for addressing the individual tool modules and the DIO and A/D converter panels. For example, when the master device sends out an address on common bus lines A0 to A17 and the type of data transfer on line C0 through C1 (that is, whether the data was to be transferred into the master or out from the master) the information is processed by this specialized circuitry in a manner similar to that discussed concerning other peripheral devices. A difference, however, is that instead of the signals which control the type of data transfer coming in only on lines C0 and C1, in the specialized circuitry the control signals come in on C0, C1 and A0. This leaves, of course, one less line for conveying addressing information on the address lines. That is, the address will be conveyed on lines A1 through A17 rather than A0 through A17. The reason for using this extra line (A0) for purposes of determining the type of data transfer will be explained hereinafter. In the circuitry of FIG. 10, it can be seen that the lines A9 to A17 are used to determine whether or not addressed data register is one of the 256 possible addresses to a tool module or whether the addressed data register is one of the 128 possible registers contained in one of the specialized signal processing panels such as the DIO or A/D converter. In other words, the address decoder 171 will place a signal on line 172 when the address data register is one of the 128 data registers contained in the specialized signal processing panels. Contrarily, the address decorder 173 will place a signal on line 174 when the address data register is one of the 256 tool module registers. If either one of these two decoders recognize the proper address, and the master device has placed a master sync pulse on the common bus line, a slave sync pulse will be returned to the master device. This occurs as a result of the master sync signal coming in on line 175 being applied to AND gate 176 and 177. Therefore, if a signal was also present on line 172, both inputs to AND gate 177 would be satisfied and a signal would be sent through delay circuit 178, OR gate 179 and placed on the slave sync common bus line. Similarly, of course, if instead a signal appeared on line 174, an output signal would occur from AND gate 176 and be gated through delay circuit 180 and OR gate 179 such that it is placed on the slave sync line. Thus, it can be seen that the technique for generating the slave sync circuit in this embodiment is very similar to that shown in the embodiment of FIG 6. Now, if we again assume that an output occurred from AND gate 176, it can be seen that this output, in addition to being applied to delay circuit 180, would also be applied to the AND gates 181 for purposes of gating the address lines 182 through 189 so that any signals on these lines will arrive at the tool modules. Once these signals arrive at the tool modules, a decoder in each module will look for a match and if one of the tool modules finds an address match, the appropriate data gates will be affected. On the other hand, if the address decoder 171 discovers an address match, the output from AND gate 177, in addition to being applied to delay circuit 178, will also be applied to the two decoders 190 and 191 for purposes of enabling these decoders. Lines A1 through A3 are also applied to decoder 191 and depending upon the combination of the digital signals applied to these lines, one of 8 output lines will be activated. Similarly, lines A4 through A7 are applied to decoder 190 such that an output on one of 16 lines from decoder 190 will occur depending upon the combination of inputs on lines A4 through A7. The group of 8 lines from decoder 191 and the group of 16 lines from decoder 190 is then applied to an AND gate matrix 192 such that a particular combination of a signal on one of the 16 lines and one of the 8 lines will result in particular output. From this 16 by 8 AND gate matrix 192 therefore there will be a possible 128 outputs from AND gate matrix 192. Each one of these 128 outputs is then available for use to initiate the appropriate data registers in one of the specialized signals processing panel such as the DIO or A/D converter.

Recalling now that in addition to the two control lines C0 and C1 used by the circuit of FIG. 6 for purposes of determining whether the data would be into the slave or out of the slave and whether the upper bytes, lower bytes or both are to be transferred, the present embodiment uses these two signals as well as the A0 address signal. Decoder 193 has the capacity of placing a signal on one or more of 8 discrete output lines from decoder 193 depending upon the combination of input signals on lines A0, C0 and C1. In the present embodiment, 5 of the outputs are used; however, it is obvious that if the need should arise, other outputs would be available. The combination of inputs on the 3 lines and the corresponding outputs on one of the lines 194 through 198 is illustrated in Table 1. The first output from decoder 193 on line 194 labelled SWO, which stand for "slave word out" simply instructs the addressed slave register to place its contents on the common bus data lines. No distinction is made between upper or lower bytes as the master device has the choice of accepting one or both of the bytes. The second output labelled SLBI, which stands for slave lower byte in, instructs the addressed slave register to read in from the common bus only the lower byte of a word (i.e., the lower 8 bits of a 16 bit word). The third output, SUBI, which stands for slave upper byte in, instructs the addressed slave register to read in from the common bus only the upper byte of a word (i.e., the upper 8 bits of a 16 bit word). The fourth output and fifth output, SPFS and SPFC which stands for slave pulse flag set, and slave pulse flag clear, respectively are for use with destructive readout devices. Since it is not necessary to understand the operation of such destructive readout devices to understand the present invention, further discussion is not appropriate in this discussion.

Therefore, from the above discussion, it can be seen that rather simplified address decoding circuitry may be present in either the tool modules or the specialized signal processing panels since a great deal of the decoding has already been accomplished by the general interface circuitry shown in FIG. 10. Thus, the simplified addresses and the appropriate control signals are sent to the individual data registers in these specialized signal processing circuits where the decoding is finished and the circuit prepares to either send data to the master device or to receive data from the master device.

As was earlier mentioned, much of the complex signal processing is done in the specialized DIO circuit and the A/D converter circuits which are connected to the general interface circuitry.

Figure 11:
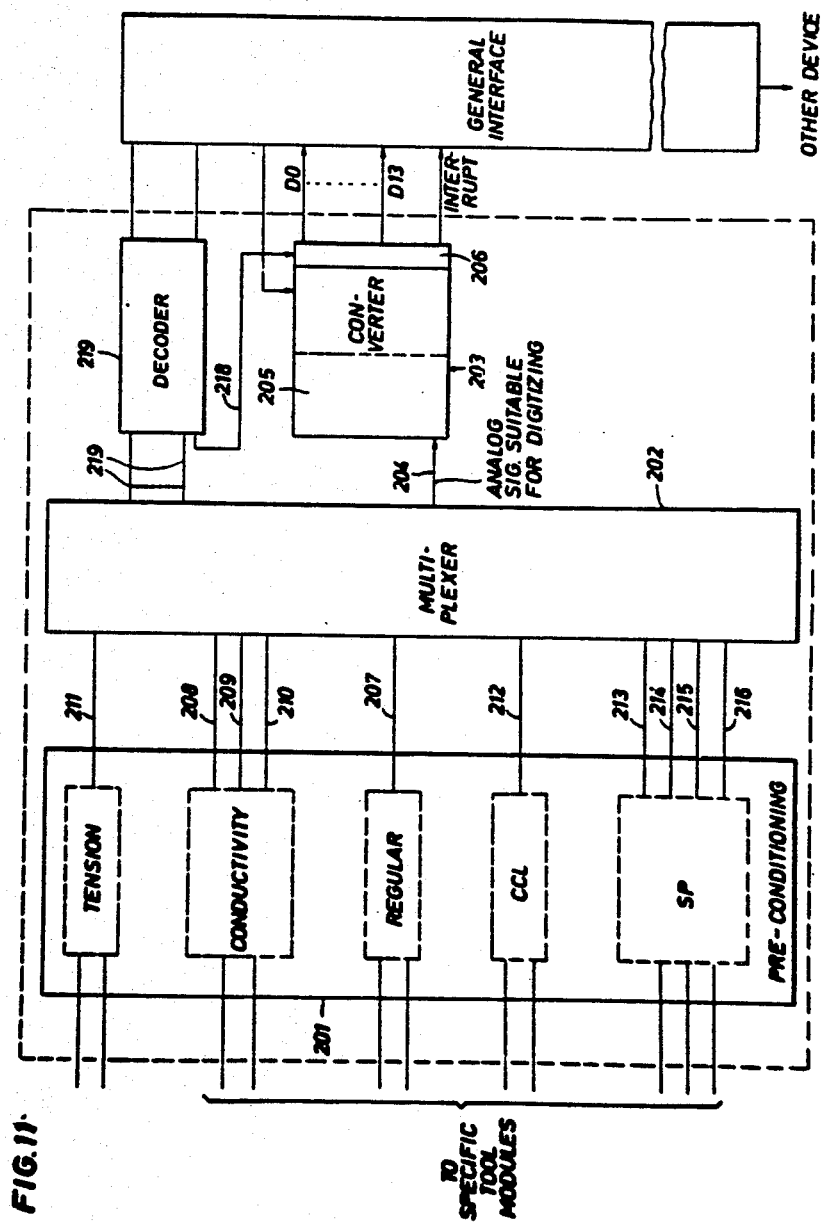
FIG. 11 show a block diagram of the A/D conversion circuitry used in the systems of FIG. 1.

A/D Converter—The signals received from the many downhole investigating devices will essentially be of two types—analog or "digital". However, since the GSI is a binary digital system, any analog data received from the downhole investigating devices must be converted to digital signals. Because the analog signals produced by well logging devices vary greatly in amplitude and dynamic range, a great many difficulties arise in providing a system which can handle so many diverse analog signals and make satisfactory A/D conversions. Such analog to digital conversions could, of course, be accomplished by simply providing for each received analog signal an analog to digital converter specifically designed for the applied analog signal. However, such an approach would be extremely costly and would also result in the use of an unacceptable amount of space. Therefore, the conversion of an analog signal to a digital signal in the present invention is accomplished by a system that is essentially comprised of three portions. Referring now to FIG. 11, these three portions are shown as comprising: (1) the precondition portion 201 which standardizes different types of incoming analog signals to a specific milli-volt per bit rate and a specific maximum full scale voltage, (in a typical embodiment, for example, the standardizing values are 1 mv/bit and a full scale limitation of 8.191 volts to the incoming signal; as well as to provide overvoltage protection and signal filtering; (2) A multiplexing circuit 202 for selecting the particular analog input that is to be converted from an analog to digital signal; and (3) the actual A/D conversion circuitry 203 which converts the preconditioning analog signal into a digital signal. A/D converter 203 in the described preferred embodiment is a 14 bit (13 data bits + a sign bit) converter, bearing a 8.191:1 dynamic voltage.

Figure 12:
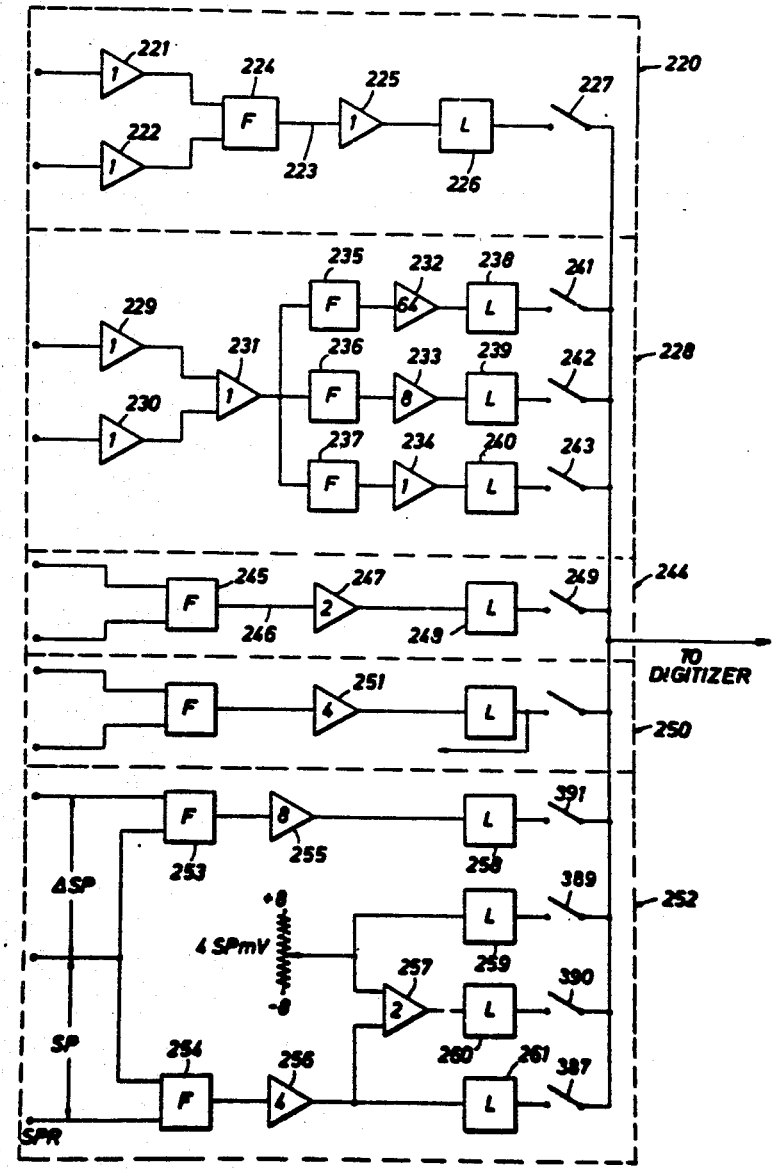
FIG. 12 shows a more detailed circuit diagram of the portions of preconditioning and multiplexing the A/D conversion circuit shown in FIG. 11.

As is shown in FIG. 11, that input on the line 204 to A/D converter 203 is first applied to a sample and hold circuit 205. Although in many instances the sample and hold circuit would not be necessary, it is available for use with those signals which might vary so rapidly or exist for such a short time that the actual converter portion of A/D converter 203 would not be able to respond. Thus, the converter converts the signal value stored in sample and hold circuit 205 to a corresponding 13 bit digital value which is placed in an addressable data register 206 contained in converter 203. In addition to the thirteen bits representative of the value of the analog signal, an additional bit is used to indicate sign; that is, is the signal a plus or a minus signal. Thus, 14 bits of data are available for describing the analog signal in digital terms. This digital binary data is now available for use by the CPU. However, recalling that the common bus provides 16 data lines for 16 bits of data, it should be noted at this point that only 14 bits of data will be provided by the A/D converter and two of the bits will not be used (normally these bits will be represented by two zeros). When the CPU has need for the value contained in the output register 206 of the converter 203, it may obtain this value in one of two ways. In the first method, after first addressing the multiplexer 202 by way of decoder 217 to connect the proper analog signal to converter 203, and then addressing the data register 206, the CPU may have to wait until the A/D converter indicates by means of a done bit that the conversion is complete before reading the data onto the data lines. However, according to a second method the done bit may act as an initiate signal to associated interrupt logic circuitry contained in the general interface. In this situation, the CPU will address the multiplexer 202 by way of decoder 217 and then while the converter is busy digitizing the analog data, the CPU will continue processing other programs. When the conversion from analog to digital is complete and the done bit in the converter is set, the done bit will initiate a bus request logic circuit (similar to FIG. 4) in the general interface which would result in an interrupt to the CPU at the corresponding address which would advise the CPU that the converter had completed the analog to digital conversion and the data was available for use. The CPU then at the appropriate time according to the existing priorities would read in the data from the converter. Thus, there is a bus request logic circuitry similar to that discussed in conjunction with FIG. 4 in the general interface associated with the A/D conversion panel. In addition, it will be recalled from the discussion of the general interface panel that 128 possible addresses reserved for use by logging data interface circuitry 54 were partially decoded by decode logic of FIG. 10 in the general interface. Forty-nine of these addresses are used by A/D converter 57. One of the forty-nine lines, 218, is used to apply a signal to the addressable register contained in converter 203. Thus, the other forty-eight lines, 219, are routed to multiplexer 202 such that the input to multiplexer 202 on lines 207 through 216 from the various modules in precondition circuits 201 may be selected. Once the appropriate address is decoded and the signal has been applied to the appropraite one of the forty-eight input lines to multiplexer 202, one of the lines 207 through 216 is operably connected to line 204 thereby applying an analog signal to A/D converter 203. Thus, it can be seen that multiplexer 202 simply acts as a switching circuit between one of the input modules contained in preconditioning circuit 201 and A/D converter 203. Referring now to FIG. 12, there is shown a schematic block diagram of the circuitry contained in the preconditioning circuitry 201 and the multiplexing circuitry 202 of the circuitry illustrated in FIG. 11. As was mentioned heretofore, the preconditioning portion 201 of the A/D conversion panel is to standardize the analog signals which are eventually supplied to the actual converter 203. These signals are of many and various types and in the well logging system of the preferred embodiment, it has been found that at least the following type of preconditioning should be employed. It is to be understood, of course, that although there are five different types of preconditioning described herein, and that there is only one circuit of each type shown, there may in reality be other types of preconditioning circuitry necessary and certainly there may be many circuits identical to one of those which are described. For example, in FIG. 12, there is shown at 220 a type of preconditioning indicated in FIG. 11 as a "regular channel". It is very likely that there might be many, similar preconditioning circuits of this type. The preconditioning provided by the regular channel circuits 220 would be general purpose and would primarily consist of converting a double-ended analog input signal to a single ended input prior to the input being available for digitizing by the A/D converter. For example, the double-ended input is applied to the two unigain amplifiers 221 and 222. The voltage difference between these two inputs is converted to a voltage difference between a reference level such as ground and a signal line 223. Converting from the double-ended signal to a reference single line signal is really accomplished in the filter circuit 224 where excessive noise is also removed. The single-ended signal is passed through a unigain amplifier 225 where additional isolation is accomplished. The output of amplifier 225 then goes through a limiting circuit 226 prior to being available to multiplexer 202 schematically illustrated as switch 227. The purpose of limiting circuit 226 is to assure that a voltage level in excess of a preselected value will not be applied to the A/D converter.

The signals produced by the downhole investigating apparatus of certain well logs sometimes vary over an exceptionally wide range. The conductivity circuitry 228 provides preconditioning to handle these wide range signals. It can be seen from FIG. 12 that the double ended input signal is applied to unigain amplifiers 229 and 230. The output from these unigain amplifiers is then applied to the input of another unigain amplifier 231 where the voltage difference between the two amplifiers 229 and 230 is referenced between ground and a single-line output. Then to provide for the wide, dynamic range input, the output from the amplifier 231 is used to drive three separate amplifiers 232, 233 and 234 after suitable noise has been filtered by filters 235, 236 and 237. The amplifiers 232, 233 and 234 in the present embodiment have gains of 64, 8 and 1 respectively. Then (as was true in the regular preconditioning circuitry 220) each of these outputs is limited by limiting circuitry 238, 239 and 240 prior to being applied to multiplexer switches 241, 242 and 243 such that an excessive signal will not be applied to the digitizer. Thus, in the present example, when the CPU needs the information arriving at circuit 228, the CPU will provide that the necessary multiplexing signal be sent to the multiplexer so that either a high, middle or low gain signal is digitized. Thus, if the input being received at circuit 228 was of a very low level, the CPU would select amplifier 232 such that a gain of 64 could be applied to the signal prior to it being digitized. Conversely, if the signal were already at a high level, the CPU would select the unigain amplifier 234. It can also be seen, of course, that the amplifiers 232, 233 and 234 are only illustrative of possible types of amplification. For different needs the gain of these amplifiers could range from even higher levels to less than 1. It should be recognized also that if extremely high resolution were desirable, instead of three amplifiers being used even more amplifiers could be used. However, of course, for the wide range input preconditioning to operate effectively, it is necessary that the CPU be aware of the values and make a selection as to what amplification factor is to be applied to the signal. In a later discussion concerning the software which controls this system, the technique by which the appropriate amplifier is selected will be set out.

The third signal preconditioning circuit 244 works in conjunction with the tension measuring device shown at 72 in FIG. 1. This circuitry 244 is very similar to that described with respect to the regular preconditioning circuitry 220. Howeve, in this circuit there are no unigain amplifiers prior to the filtering. Thus, in this circuitry the double-ended input is applied directly to filter circuit 245. Filter circuit 245 then references the double-ended input between a reference level such as ground and a single output line 246. The output from filter 245 is then applied to an amplifier 247 that provides a gain of two to the signal prior to being routed through a limiting circuitry 248 and on to the multiplexer bus by multiplexer switch 249. Again, of course, it should be recognized that the gain of two of amplifier 247 is illustrative only and if the needs are different the gain of the amplifier could change accordingly. For example, in the CCL (casing collar log) preconditioning circuitry 250, it is seen that this circuitry operates identically with that of the tension preconditioning circuitry 244 heretofore described. The only difference between these two circuitries is that amplifier 251 supplies a gain of 4 rather than 2. Finally, there is shown at 252 circuitry related to "Short-Normal Spontaneous Potential" signals. The specific operation of this preconditioning circuitry will be discussed hereinafter in conjunction with the specific discussion of the tool module associated with this preconditioning circuitry. However, it will suffice for now to note that there are three inputs which are applied to two filtering circuits 253 and 254, the outputs of which are applied to two different amplifiers 255 and 256 having two different gains 8 and 4, respectively. Thus, by selected combination of amplifiers 255 and 256 and a third biasing input from a manually adjusted voltage source which may or may not, as desired, be amplified by amplifier 257, there exists a combination of at least four outputs which are available for digitizing after suitable limiting by limiting circuitry 258 through 261. Thus, it can be seen that the preconditioning in the analog to digital converting circuitry may be designated as necessary to make the inputs suitable for application to the GSI. It should also be noted, of course, that it may in some cases be desirable that some of this type of preconditioning be accomplished in the tool modules which will be described hereinafter.

Figure 13:
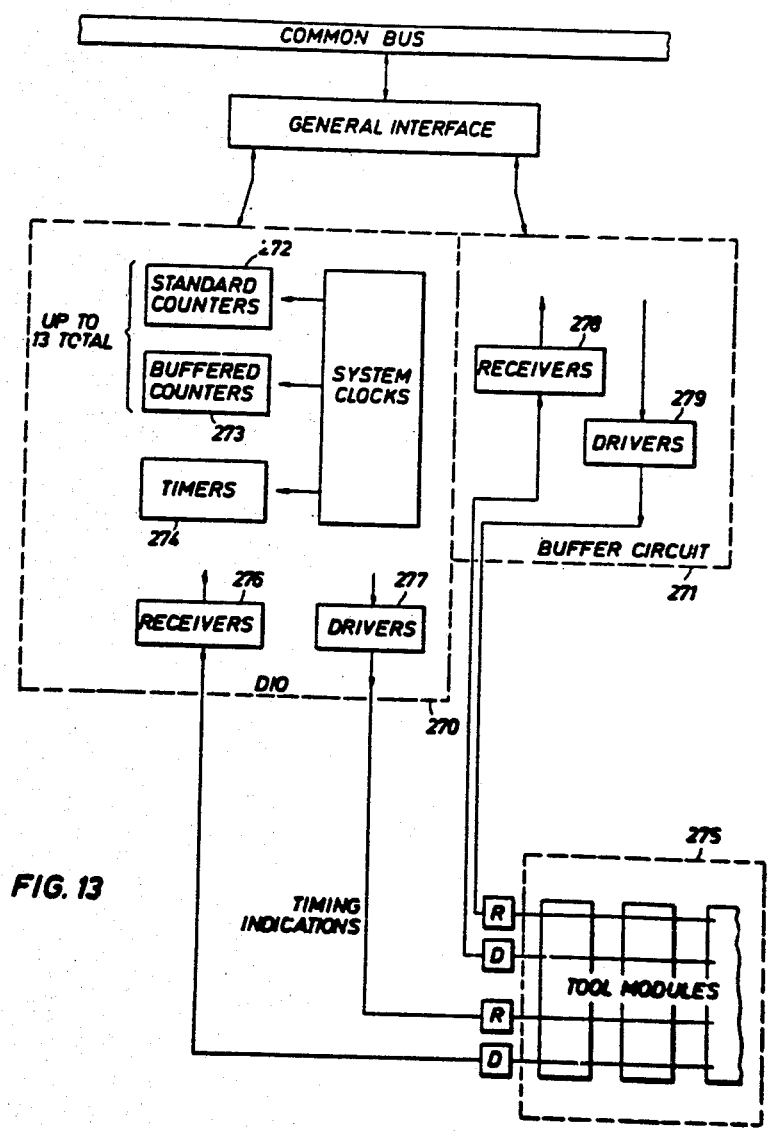
FIG. 13 shows a block diagram of buffer circuits and digital input/output circuits of the General Interface shown in FIG. 1.

Buffering and Digital I/O—As was mentioned above, there are essentially two types of data signals received at the surface from the downhole investigating device. The technique used by the GSI system of this invention for handling analog signals was discussed heretofore. The technique used by the GSI system for handling digital signals will now be discussed. The term "digital signal" as used when distinguishing between analog signals encompasses a wide variety of pulse signals and pulse trains. Therefore, many types of digital signals must also be converted to binary digital signals. Referring now to FIG. 13 there is shown a block diagram of the DIO (Digital Input/Output) circuitry 270 and the buffering circuitry 271 which also illustrates connections with the tool modules and the common bus by way of the general interface. The DIO section 270 of FIG. 13 comprises a group of counters 272, 273 and timers 274 which primarily receive pulse trains and/or control signals from the tool modules 275 by way of receiver 276. These signals from tool modules 275 may be essentially the same signals received from the downhole device or the signal may have been partially processed by a tool module. These counters 272, 273 and timers 274 also provide timing indications by way of driver 277 which may be used downhole or by the tool module. A discussion of the operation of the counters 272, 273 and timer 274 will be provided shortly. The buffer circuitry 271 includes "Receiver 278 and Driver 279" which are for buffering binary digital signals passing in either direction between the tool modules and the common bus by way of the general interface. Further discussion of buffering circuitry 271 will be provided hereinafter.

Figure 14:
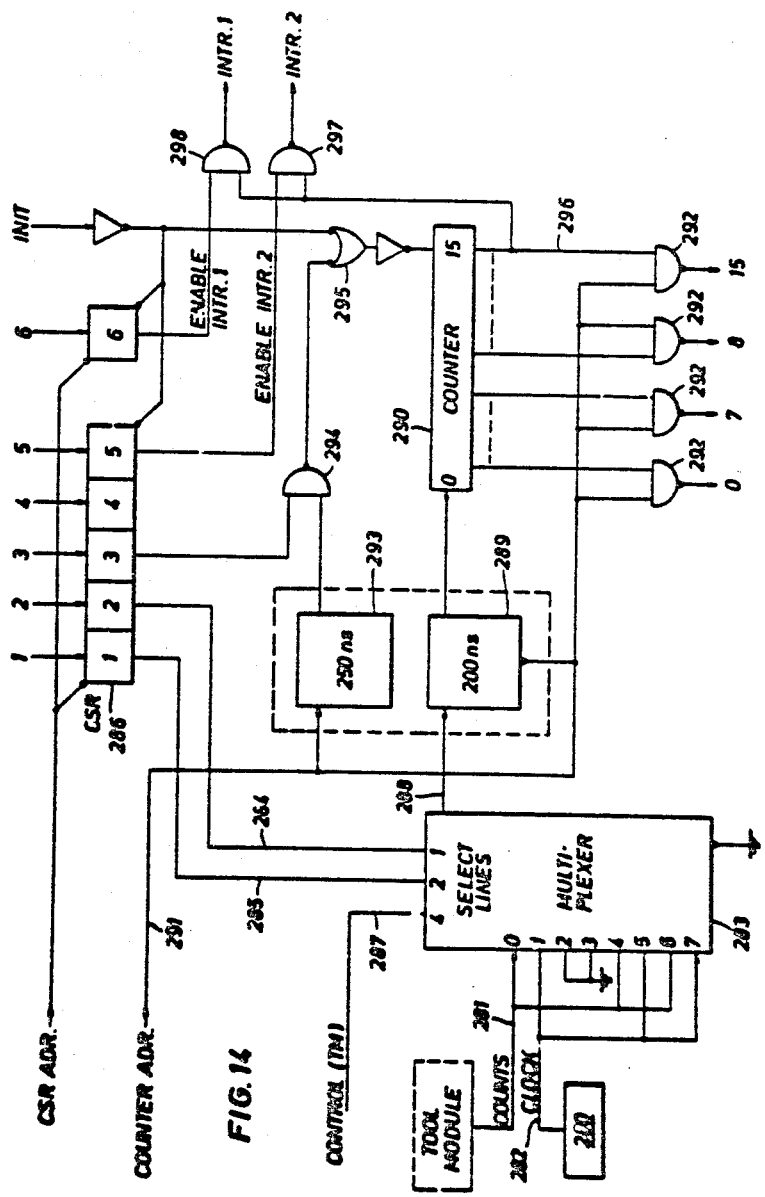
FIG. 14 shows a diagram of a typical standard counter contained in the digital input/output circuitry of FIG. 13.

As shown in FIG. 13, the DIO circuitry includes standard counters 272 and buffered counters 273. The distinction between "standard" and "buffer" counters is the use an additional storage register in the buffered circuits 273 used to isolate the count at a precise instant of time (which precise instance of time may be determined by the CPU, a timer or a tool module), and to store that count received at the precise time until the GSI system can conveniently make use of this data. Thus, the counter may be automatically reset and resume counting other data while still holding the stored data. In the standard counters 272, which has no buffering, the CPU reads the counter directly and then the counter is reset to begin another period. Referring now to FIG. 14, there is shown the logic diagram of a typical standard counter used in this DIO circuitry. The counter may be used to count either pulses containing information and coming from the tool modules which arrive on line 281 or the counter may be used to count clock pulses from appropriate clock sources (fore example, system clock 280 shown in FIG. 13) which arrive on line 282. These two sources of inputs on lines 281 and 282 are applied to a multiplexer selection circuit 283. The selection of the type of input to the counter is determined by the CPU by way of the select lines 284 and 285. The input to these select lines is derived from a command and status register 286. As was explained, such command and status registers are addressable by the CPU. More particularly, the command and status registers located in the DIO panel are addressed and controlled by the CPU by way of the general interface. That is, the address of the command and status register will be one of the 128 addresses decoded in the general interface as was explained heretofore in conjunction with the general interface circuitry shown in FIG. 10. Therefore, the first two bits of the CSR register 286 will be loaded in accordance with the instructions from the CPU, and the multiplexer will typically respond to signals on lines 284 and 285 in the following manner. If a "1" signal is delivered to the multiplexer on line 284 from bit 2, the clock input on line 282 would be the selected pulses to be counted. If, on the other hand, the input on line 284 is a "0", the selected pulses to be counted would arrive on line 281 from the tool modules. Also, if the input to the multiplexer on line 285 from bit 1 of CSR register 286 were a "0" the enabling-/disabling control signal from the tool module on line 287 would be blocked such that it would not have any effect on the multiplexer output. However, if the signal on line 285 from bit 1 were a "1", the enable/disable signal from the tool module would be able to control the output of the multiplexer 283. The output on line 288 of multiplexer 283 is applied to a pulse shaping one-shot circuit 289 which in turn drives the 16 bit binary counter 290. When the CPU desires the contents of counter 290, the appropriate address of the counter will be sent out and interpreted by the decoder logic in the general interface circuit. Once the counter address is decoded, a strobe signal will be sent by way of line 291 to AND gates 292. Thus, the contents of counter 290 is placed on the common bus. It should also be noted that the strobing signal on line 291 is applied to the reset input of the one-shot pulse shaping circuit 289 such that no further input pulses on line 288 reach counter 290 during the interval that the contents of counter 290 are being strobed onto the common bus.

The strobing signal on line 291 is also applied to delay circuit 293. The output of delay circuit 293 when combined by AND gate 294 with a "1" signal from bit 3 of CSR 286 provides a reset signal to counter 290 by way of OR gate 295. Thus, if the third bit of CSR 286 is a one, counter 290 will be reset to "0" such that subsequent pulses received by the counter will again accumulate starting from "0". However, if the third bit of command and status register 286 were a "0" the reset signal would not arrive at counter 290 and subsequent pulses applied to counter 290 would be added to the existing count in counter 290. It should also be noted at this point that the output from the 15th bit of counter 290 on line 296 in addition to being applied to one of the AND gates 292 is also applied to one of the two inputs to each of two additional AND gates 297 and 298. The other of these two inputs are applied from bits 5 and 6 (bit 4 being a spare and available for some other use) of CSR 286 respectively. The purpose of the AND gate 297 and 298 is to furnish signals which can be used for interrupting the processor when the counter 290 is about to overflow. Bits 5 and 6 of CSR 296 are simply for the purpose of allowing the CPU to enable AND gates 297 and 298 so that these possible interrupt signals may result.

Figure 15:
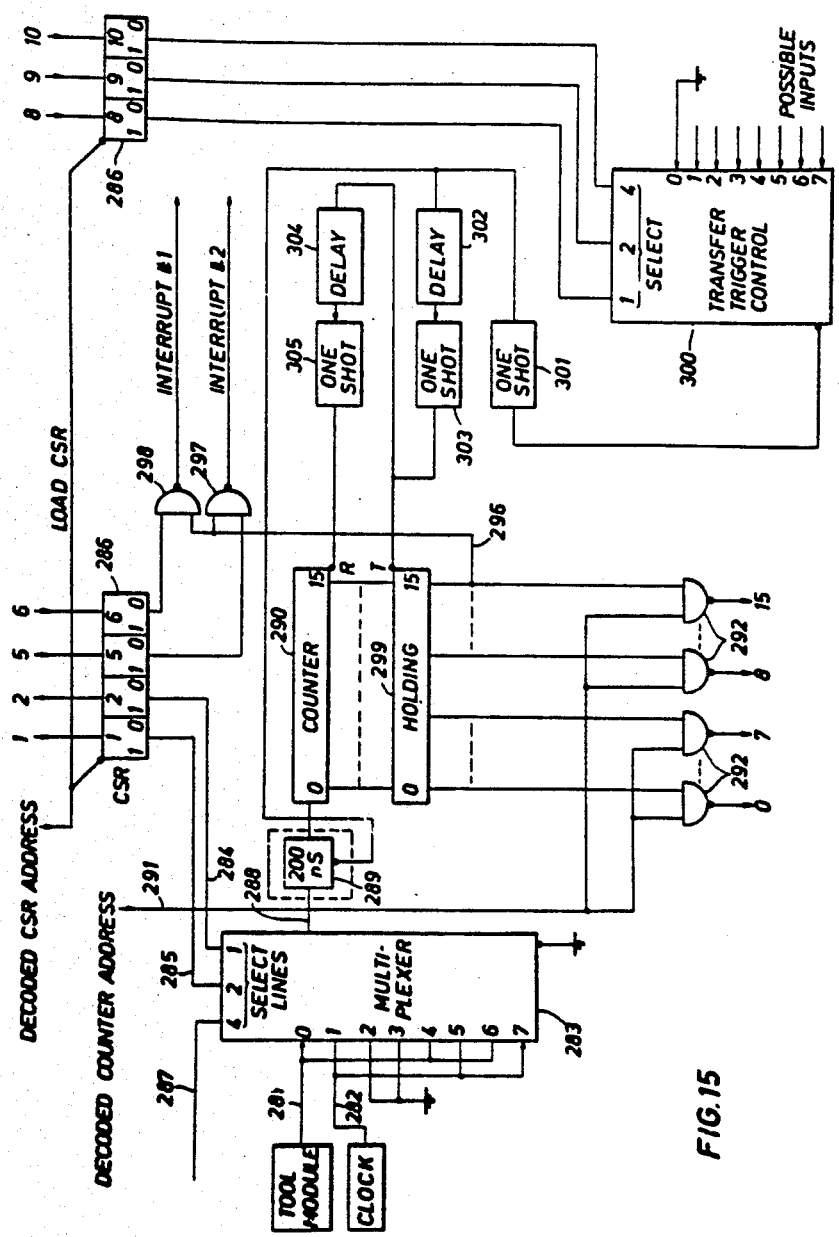
FIG. 15 contains a typical buffered counter contained in the digital input/output circuitry of FIG. 13.

Referring now to FIG. 15, there is shown circuitry for the buffered counters. As will become apparent, the operation of the buffered counters is very similar to that of the just described standard counters. Consequently, components of the buffered counter logic circuitry have retained the same identification numbers. The primary difference, as will be explained shortly, is the addition of a holding register 299. By selecting one of the accurate clock sources 280 or the pulse input, there buffered counters are particularly suited to give an accurate indication of the time elapsed between two specific events. As will become more apparent with the following discussion, this is readily accomplished by having one of the specific events gate the clock pulses to counter 290 and having the other specific event transfer the accumulated pulses to holding register 299. Additional bits 8, 9 and 10 in the CSR register 286 control the selection of transfer trigger control circuitry 300. The operation of choosing the source of pulses that the counter is to count, and whether or not the tool module will have enabling or disabling control of the pulses, and the technique by which the pulses are placed into counter 290 is identical with the standard counter circuitry. However, in this circuitry the CPU reads the data stored in the temporary holding register 299 rather than from the counter 290 as in the previously described standard counter circuitry. Consequently, there must be some means for transferring data from the counter circuitry into the temporary holding circuitry register 299. In this preferred embodiment, the transfer signal occurs as a result of an output from the transfer trigger control circuitry 300. In the present embodiment, this transfer trigger pulse may be derived from one of the many timers or from one of the tool modules. The output of bits 8, 9 and 10 or CSR 286 applied to multiplexer select input function of the transfer trigger control 300 determines which of these many and varied sources will be used as the transfer trigger signal. As was true for the lower bits of CSR register 286 discussed earlier, bits 8, 9 and 10 of CSR 286 are also set by the CPU. Thus, when the appropriate combination of signals is applied to selection circuit 300 from bits 8, 9 and 10 of CSR 286, the desired input will be selected for placing a signal at the output of circuitry 300. This signal will be applied to the one-shot circuitry 301. The output of one-shot circuitry 301 guarantees that a pulse of sufficient duration will be applied to the reset input of circuit 289. The output of one-shot 301 is also applied to delay circuit 302 which allows the input to counter 290 to settle down before the transfer takes place. After the delay provided by delay circuitry 302, one-shot 303 provides the necessary shaped signal to cause the transfer of data from counter 290 into holding register 299. It should also be noticed that in addition to the output of circuitry 303 being applied to holding register 299, this output is also applied to another delay circuit 304 which results in an output from one-shot wave-shaping circuit 305 after the delay. The output of one-shot circuitry 305 is then applied to the reset input of counter 290 such that the counter is reset to "0" condition. The CPU can now obtain the data n the holding register 299 by addressing that register. This address is decoded in the general interface circuitry and results in the proper one of the 128 possible outputs being applied to line 291. The presence of a signal on line 291 results in the data in holding register 299 being strobed on to the common bus by way of AND gates 292. It should also be noticed that an overflow condition of the holding register 299 is indicated when the 15th bit is applied to the two AND gates 297 and 298. The output of these two AND gates 297 and 298 provides an interrupt as was provided in FIG. 14 which described the standard counter circuitry.

Figure 16:
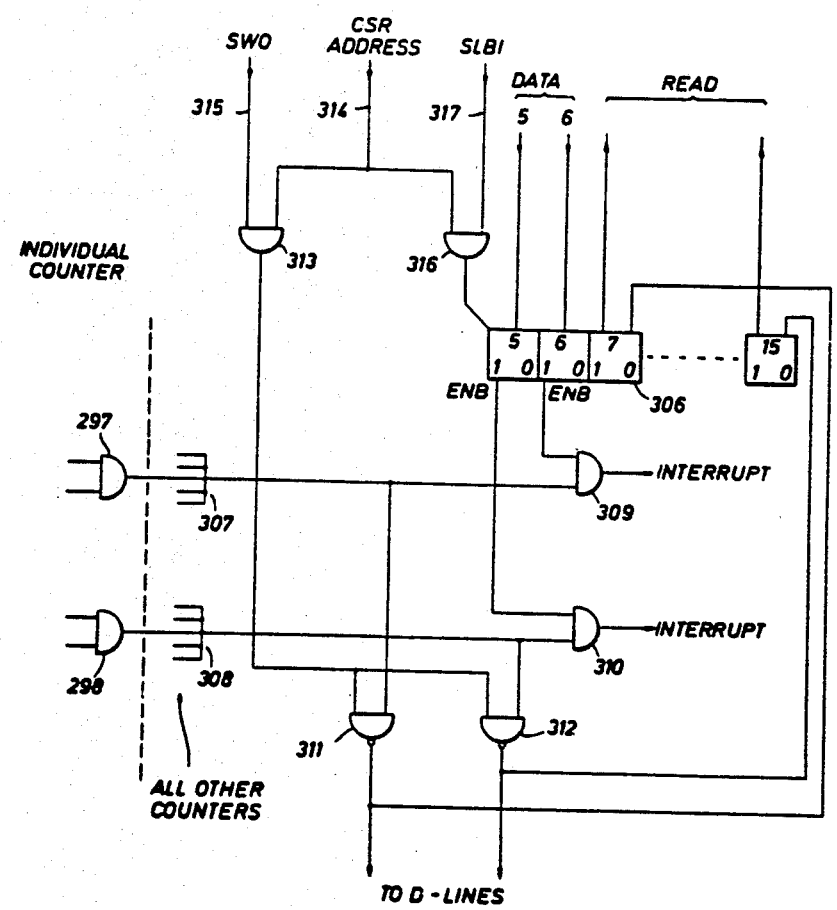
FIG. 16 shows how the outputs of several counter circuits are combined to decrease the number of interrupts necessary for servicing the counters.

Since it is expected that most programs which control the CPU would be designated to read all of the counters on a depth or time basis well within their capacity at the expected input pulse rates, it is not likely that counter 290 in the counter circuitry would experience an overflow condition. Consequently, it is not likely that a "1" signal on bit 15 of counter 290 would occur. Since a "1" signal on bit 15 is the cause of an interrupt signal being sent out from AND gates 297 and 298, such interrupts will rarely occur at normal logging speeds. However, if the logging speed is increased sufficiently, overflow of the counter would become progressively more likely. In such a case, of course, it is desirable that we have an interrupt capability. Now since these overflow interrupts would be the exception, and in order to keep interrupt hardware in the general interface at a reasonable number, the present system is designed such that all of the counters (both standard and buffered) share two system interrupts. Referring now to FIG 16, there is shown suitable circuitry for combining the overflow indications from all of the various counters (both standard and buffered) such that only two interrupt circuits are necessary. Included in this combining circuitry is a command and status register 306 which controls application of an interrupt request to the general interface which eventually, of course, is transmitted to the CPU. It should be noted that CSR 306 is a different command and status register from the CSR register 286 of FIG. 14 and 15 discussed with respect to the standard and buffered counters. Thus, the two interrupts available from AND gates 297 and 298 of the various counter circuits are combined at junctions 307 and 308. These signals are then applied to one of the two inputs of AND gates 309 and 310. The output of these two AND gates drive the bus request circuitry in the general interface which results in the interrupt being sent to the CPU. The other input of AND gates 309 and 310 are supplied by bits 5 and 6 of CSR register 306. Thus, it is possible that if neither bits 5 nor 6 of CSR 306 are loaded, there will be no outputs from AND gates 309 and 310. On the other hand, of course, either one or both of the two bits could be loaded such that there is either one or both outputs from AND gates 309 and 310. It should also be noted that bits 7 and 15 of CSR 305 may be read by the CPU to determine whether or not an overflow exists from one of the counter circuits even if the interrupt signal is blocked by AND gates 309 and 310 from actually causing an interrupt condition. This is accomplished by applying the interrupt signal which is also applied to AND gates 309 and 310 to AND gates 311 and 312 respectively. The other inputs to AND gates 311 and 312 are supplied by AND gate 313 which will produce an output signal only when the address of CSR 306 has been decoded as represented by a signal on line 314 and also the CPU desires to read the condition of CSR 306 as represented by the SWO signal on line 315. As is also shown in FIG. 16, when the CPU desires to load bits 5 and 6 of register 306, this register is addressed such that a signal is applied to AND gate 316 by address line 314. In addition, the CPU must also supply a data in (or SLBI) signal to AND gate 316 by way of connecting line 317. Thus, it can be seen from the foregoing that there are two available interrupt circuits for all of the counters. The purpose of providing two interrupts rather than a single interrupt is because if more than one counter is combined to produce an interrupt, it is possible to tell which counter is causing the interrupt. However, it may be the situation that if a particular counter overflows, it would be very important that the CPU be made aware of this fact. Therefore, the operation of this combining circuit if such a condition were the case would be as follows. Bit 6 of CSR register 286 in the critical counter (refer to FIGS. 14 and 15) would be loaded with a "1" such that AND gate 298 is enabled. Bit 5 could either be loaded with a "1" or a "0" such that AND gate 297 is enabled or not enabled as desired. However, in all of the other counters, both standard and bufferd, bit 6 of CSR 286 would not be enabled whereas bit 5 would be enabled. Therefore, referring again to FIG. 16, it can be seen that only the critical counter would be able to supply a signal to AND gate 309 to cause an interrupt output, whereas all of the other counters would be connected to AND gate 310 to cause an interrupt output. Thus, it can be seen that if an interrupt occurs on the counter connected to AND gate 309, the CPU will know precisely that the critical counter has overflowed. If on the other hand, an interrupt occurs through AND gate 310 from one of the non-critical counters, the CPU is only aware that one of the counters overflowed but is not aware which counter overflowed.

Figure 17A:
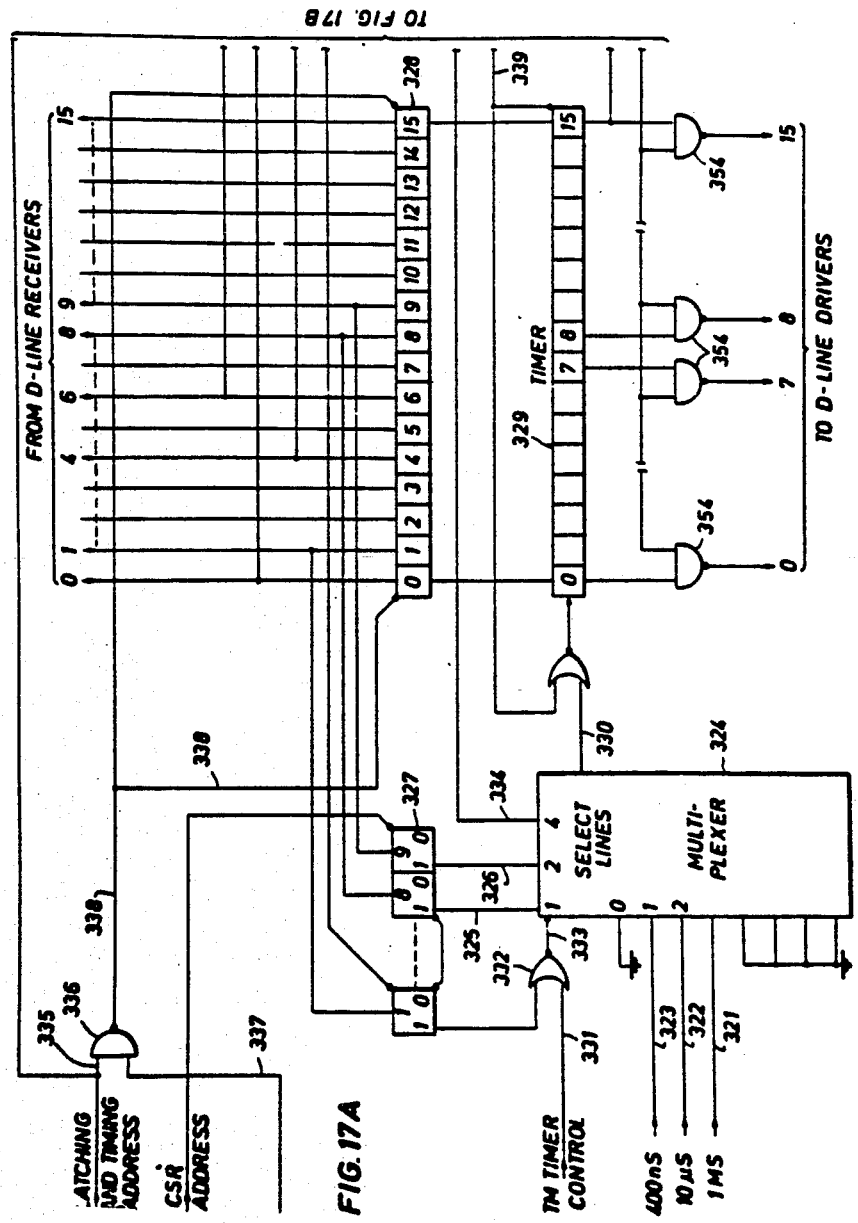
FIG. 17 shows typical circuitry of the timers contained in the digital input/output panel of FIG. 13.

Now referring to FIG. 17, A and B there is shown digital logic circuitry for the timing circuit 274 illustrated in FIG. 13. The purpose of these timing circuits is typically for providing a precise time interval between the occurrence of some asynchronous event and the subsequent initiating of another event. Such accurate timing is accomplished by counting the pulses of an accurate time source. For example, as shown in the illustration of FIG. 17, A and B there are three timing sources coming in on lines 321, 322 and 323. These timing sources could represent, for example, pulse rates of 400 nano-seconds, 10 micro-seconds and 1 millisecond. Depending upon the timing required, one of these clocks will be chosen by multiplexer 324. The selection of the clock source by multiplexer 324 is accomplished by the inputs on lines 325 and 326. Lines 325 and 326 are controlled by the output of two selected bits from CSR register 327. In the example shown, the selected bits are the 8th and 9th bits. It should be mentioned, at this point, that each of the timing circuits include an addressable CSR register 327 and addressable combination latching and timing registers 328 and 329. Register 328 and 329 have common addresses. The technique for addressing these registers is the same as previously discussed. For example, the address of CSR register 327 or the address of combination registers 328 and 329 will be placed on the address lines by the CPU (or any other peripheral device that has obtained mastership). The address placed on the address lines will then be denoted by the circuitry shown in FIG. 10 such that one of the 128 outputs of the circuit will be applied to the circuitry of FIG. 17 A and B to either strobe the combination registers 382 and 329 or the CSR register 327. The clock source selected by the proper combination of inuts on lines 325 and 326 may be enabled or disabled from reaching the output line 330 by either a tool module control "1" signal arriving on line 331 or by the presence of a "1" in bit 1 of CSR register 327. Either of these two "1" signals may be used to enable an input to multiplexer 324 as they are both passed through OR gate 332 onto line 333. The output of multiplexer 324 on line 330 may also be inhibited by a "1" signal applied to multiplexer 324 on line 334. The enabling signal on line 333 controls the input of the clock pulses and the input on line 334 directly controls the output of the multiplexer on line 330. As will be explained later, the inhibit signal on line 334 may occur as a result of one or more of three situations. From the foregoing, it can be seen, therefore, that pulses on line 330 will accumulate in the time register 329. However, the accumulation of timing pulse would not be meaningful in itself since the timing needed is on accurate indication of the lapse of a precise time interval after a specified occurrence. This is accomplished therefore by preloading the timing register 329 with a preselected number, so that the pulse accumulated from the clock pulses on line 330 will be added to the preloaded number. Thus, when the timing register accumulates up to the total value of a preselected number, an output will be sent to the CPU advising of this fact. This is accomplished in the present invention by loading latching register 328 with the desired preselected number. Loading of the latching register is accomplished by the CPU sending out the address of the combination latching and timing register 328 and 329 along with instructions that the data is to be sent from the master (CPU) to the peripheral device. Thus, when the address is decoded by the circuitry illustrated in FIG. 10, (located in the general interface panel) a "1" will appear on line 335 and be applied to AND gate 336. The instructions indicating that data from the master circuit (CPU in this case) is to be received by the slave will result in a "1" being applied on line 337. Thus, it can be seen that when these "1" signals are applied to AND gate 336, a strobing signal will be sent out on line 338 such that latching register 328 will be loaded with the data present on the common bus data lines. The data in latching register 328 is then transferred by means of a transfer signal to timing register 329. The transfer signal on line 339 may result from two possible sources as will be explained hereinafter. Therefore timing register 329 is loaded with the desired digital number. Thus, when the enabling signal on line 333 is applied to multiplexer 324, the selected clock source (applied by either line 321, 322 or 323) will be gated through multiplexer 324 by way of line 330 to the timer register 329. This, of course, assumes that at the present there is no inhibit signal on line 334 being applied to multiplexer 324. Therefore, the pulses from the selected clock source would be added to the already preloaded number in timer register 329. The timing register 329 will continue to accumulate these clock pulses until a "1" finally occurs in bit 15 of the timing register 329. As can be seen, a signal on bit 15 of timing register 329 results in a signal being applied to flip-flop 340. To clarify what actually happens, refer to FIGS. 18A through 18E which illustrate the timing register 329 in various conditions. For example, the condition of the timing register 329 shown at FIG. 18A illustrates that the timer has all "0's" in all 16 bits. Now assume that the CPU should be informed when three milliseconds have elapsed after a tool module has sent a control signal in on line 331 representative of a specific event. Then, in the FIG. 18B, it can be seen where the latching register has loaded the timer register with "0's" in bits 1 and 15 and "1's" in bits 0 and 2 through 14. Now when the specific event occurs, a signal is applied to AND gate 332 by way of connecting line 331. This signal from AND gate 332 allows millisecond clock pulses to be applied by way of multiplexer 324 to register 329. Therefore, when the first millisecond pulse is applied to the timer register 329, the condition of the register as illustrated in FIG. 18C changes to a "0" in bits 0 and 15 and a "1" in bits 1 through 14. As illustrated in FIG. 18D, after a second millisecond pulse is received by timer 329, all "1's" now appear in the register except for bit 15 which is still a "0". Finally, as shown in FIG. 18E, when a third millisecond pulse is received at register 329, all the bits, 0 through 14, change to "0" and bit 15 changes to a "1". Thus, it can be seen that three millisecond have elapsed from the time the signal enable was applied to line 331 and the time that bit 15 changed from "0" condition. When bit 15 changes to a "1", the "1" signal is applied to flip-flop 340 which results in a "1" signal being sent out at the Q output on line 341. The overflow signal on line 341 may then be used to place a signal on the timer overflow pulse line 342 if bit 4 of CSR 327 has been loaded with a "1". It may also be used as a signal to trigger a bus request and subsequent CPU interrupt signal by way of AND gate 343. The bus request and interrupt can only occur if bit 6 of CSR register 327 is loaded thereby supplying by way of line 344 the second necessary signal to the two inputs of AND gate 343. It should also be noted that line 341 is not directly connected to AND gate 343 but instead loads bit 7 of CSR 327. When bit 7 is loaded with a "1", it is directly applied to the second input of AND gate 343. When the interrupt has occurred in the CPU, a signal will be sent back from the CPU and will arrive on connecting line 345 where it will be used to clear bit 7 of the "1" signal loaded by line 341. Recalling now that timer register 329 was preloaded with data from latching register 328 as a result of a transfer signal applied on line 339. The transfer signal on line 339 may be a result of two situations, the first being that with the occurrence of an overflow indication on bit 15 of timing register 329 and after a suitable delay by way of delay circuitry 346, a transfer signal will result on line 339 by way of OR gate 347. The other input to OR gate 347 is connected to the 0 bit of CSR register 327. This, it can be seen that each time an overflow condition occurs from timer register 329, timing register 329 is again loaded by data from latching register 328 and also anytime the CPU desires to transfer the data in latching register 328 to timing register 329, it can do so by simply loading the 0 bit of CSR register 327 with a "1". It should also be noted that an overflow condition from timer register 329 results in an inhibit signal being applied to multiplexer 324 by way of line 334. This signal on line 334 may occur anytime one of the three inputs to the 3-input OR gate 348 is in a "1" condition. Therefore, in addition to the overflow indication which occurs on input line 349, the inhibit signal also will occur when bit 0 of CSR register 327 is loaded with a "1" (this happens at the same time that the CPU requests a transfer from the latching register to the timing register). Finally, the inhibit signal occurs anytime a "1" signal appears on input line 350. A "1" condition occurs on line 350 when the CPU sends the combination timing and latching address represented by a "1" on line 351 and instructions that data in timing register 329 is to be placed on the data lines represented by a "1" on line 352 (SWO signal). These two "1's" are then applied to AND gate 353 which provides a "1" signal on line 350. As can be seen, an output on line 350, in addition to inhibiting the output of multiplexer 324, will also act as a strobe signal to AND gates 354 such that the data in timing register 329 is placed on the common bus data lines.

Referring again to FIG. 13, it is seen that in addition to the timers 274 and counters 272 and 273 comprising D10 circuitry, there is also shown the buffering circuitry 271 which is comprised of receiver 278 and driver 279. The purpose of these receiver and driver circuits is to simply act as additional buffering circuitry between the general interface and the tool modules. These circuits operate to transmit 16 or fewer bits of data between the common bus (by way of the general interface) and the 256 possible addressable data registers reserved for the tool modules. The address of the data registers is provided from the decoding circuit of FIG. 10 on 8 parallel lines to the desired tool module which must complete the decoding. It should be recalled at this point, that in the general interface circuitry of FIG. 10, part of the address of the tool modules was decoded. Thus, only final decoding of the 256 possible addresses need to be decoded by the tool modules. As will be discussed in more detail hereinafter concerning the tool modules, it should be noted that interrupts to the CPU may be generated by the individual tool modules. If the tool module desires to generate an interrupt, the request will pass through a receiver 278 in this buffering circuit prior to being applied to interrupt circuitry in the general interface. Once the CPU has acknowledged the interrupt, this fact may then be returned to the tool module by way of the general interface and a driver 279 in this buffering panel.

Tool Modules—As has been mentioned, each downhole logging device interfaces with a tool module specifically adapted for that tool. The tool modules then, as shown in FIG. 1 and more specifically in FIG. 2, interface with the buffering circuitry 55, DIO 58 or A/D converter 57 for appropriate signal processing. The individual tool modules themselves, however, often contain additional circuitry for supplying the signal processing necessary to adapt the downhole input and output requirements to the GSI system. Since the circuitry of each tool module may vary significantly, a generalized discussion of the tool modules will be presented. This generalized discussion will then be followed by a more detailed discussion of typical, although very simplified, end-to-end circuitry (downhole measuring device to common bus) suitable for use in producing desired measurements of subsurface characteristics. These end-to-end circuits represent a good sampling of the types of different measurements that may be required of a logging tool.

Communication between the tool module and the GSI occurs by way of the DIO panel, the A/D converter panel or the buffering panel which panels were discussed heretofore. For example, if a train of pulses from a downhole investigating apparatus are to be converted to digital binary signals suitable for processing by the CPU, the pulsating signal may simply be connected to one of the counters contained within the DIO. Therefore, for this type of signal processing the tool module needs only to provide connecting wiring between the logging cable and the DIO panel. Depending on the downhole tool and the information needed by the CPU, the counter could either be a standard or buffered counter. Both types would appear identical to the tool module. It should also be recalled from this discussion of the two types of counter contained in the DIO panel that gating control of the pulsating signal into the counter could be exercised by the tool module at the discretion of the software. Therefore, if such gating is desirable for a particular well logging operation, the tool module would provide connecting wiring for the necessary gating signal to the counter to exercise such control along with the connecting wiring for the data signal. The above-mentioned example of using a counter is for illustration purposes only as there are many other methods of using such counters. In other example, the tool module might combine several downhole pulse sources and transmit some combination (such as the sum or difference between the two sources) of the two pulse sources to the DIO for counting. In addition, the tool module could multiply or divide the pulses received from a downhole tool by a suitable value and only transmit the resulting remaining number of pulses to the counter. In other circumstances, the tool module could accomplish necessary demmultiplexing if two or more multiplexed signals were set from the downhole tool to the surface by a single conductor. From these examples, it can be seen that the tool module can be used to significantly affect the pulse signal arriving at the DIO for counting.

Use of the timers contained in the DIO and discussed heretofore in conjunction with FIG. 17, by the tool modules would typically result in a signal representative of an overflow condition of the selected timer. This signal could be applied to the tool module for downhole or surface use as desired. Also, in a way similar to that discussed with respect to counters, the tool module, at the discretion of the software, has the capability of enabling the input of pulses from the desired clock source into the timer. Thus, in a typical operation, the appropriate tool module would start a timer by enabling pulses from a clock source to be applied to the timer. When the timer overflowed (i.e., bit 15 of timing register 329 shown in FIG. 17 changes from a "0" to a "1") a signal representative of such an overflow could be sent to the CPU or possibly back to the tool module. It should also be recalled that the timer could be started by a command directly from the CPU, and it is not necessary that the tool start the timer.

In addition to communicating with DIO panel 58, the tool modules also communicate with A/D converter panel 57 heretofore discussed. It is certainly possible, of course, that the tool module will provide some sort of signal processing such as filtering or electrical isolation between the downhole investigating device and the GSI system. However, it is also likely that analog signals received from the downhole investigating device will be applied directly to the preconditioning portion of the A/D converter. The A/D converter 57 of FIG. 1 will then under the instructions of the CPU select the appropriate time the desired analog signal input from among the many various analog inputs by way of the multiplexer. The selected analog signal is then digitised for subsequent application to the common bus lines when requested by the CPU.

Also recalling that in addition to the DIO panel and A/D converter, the system also includes a buffer circuit 55 containing receivers and drivers for direct digital communication between the tool modules and the common bus. Such communications are direct in the sense that specific digital binary signals may be passed all the way from a tool module to the CPU, or vice versa, without a change of form. These signals may be, however, buffered and referenced to the CPU voltage level. However, this is distinct from the situation wherein counters and timers are used to operate on trains of pulses to convert such pulse trains to parallel digital words for computer acquisition.

Finally, in most logging situations, it is necessary that power of some sort, AC or DC, etc. be transmitted downhole to the downhole investigating apparatus to drive said apparatus. Thus, the tool module also provides circuitry for conditioning the power from a particular selection of power sources such that said power is suitable for use with a particular downhole device. As will be explained in more detail with regard to the specific types of tool modules, the tool modules alone or in conjunction with the CPU may have the capability of controlling the current and/or voltage which is supplied to the downhole tool devices.

Figure 19:
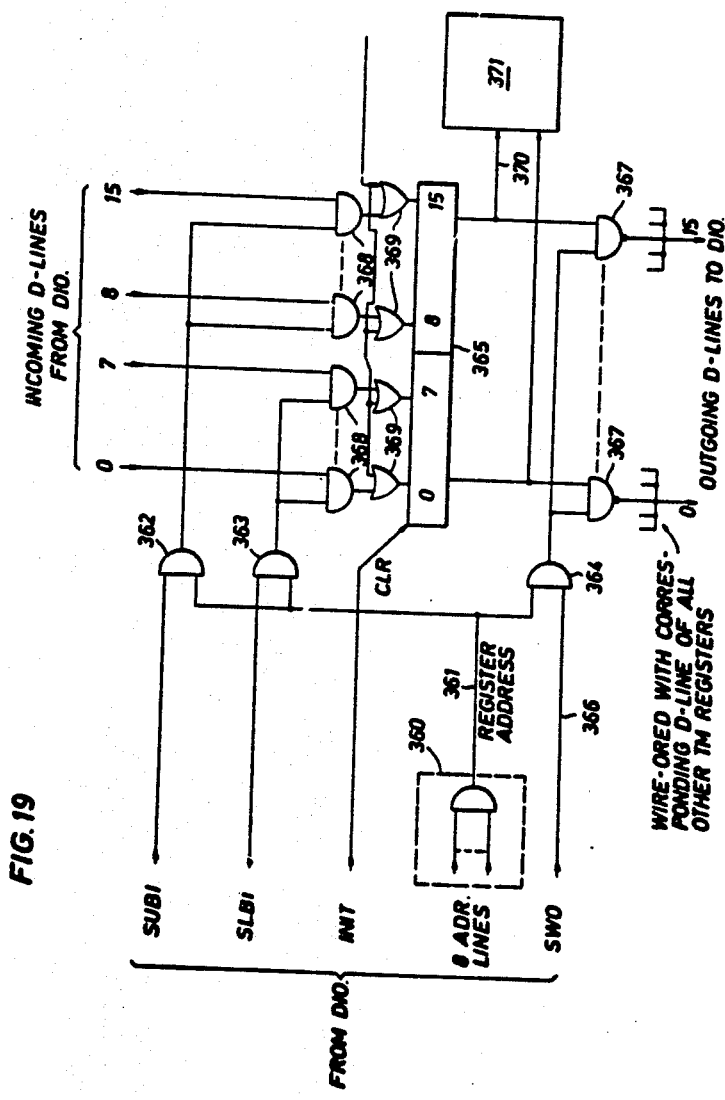
FIG. 19 shows a typical circuit diagram of transferring digital data into and out of the tool modules contained in the tool GSI Interface of FIG. 1.

To the CPU, each addressable register in one of the tool modules appears virtually the same as a core memory location and, therefore, data can be correspondingly acquired, modified and/or loaded as readily as could a core memory location. As was explained heretofore in a discussion concerning the CPU and the common bus of the system described in this preferred embodiment, the common bus data lines are time shared and bi-directional. However, it should be appreciated that the general interface separates these data lines such that instead of a simple set of bi-directional data lines, two sets of uni-directional data lines are provided between the general interface and the tool modules. Therefore, each tool module may require 16 digital data input lines and 16 digital data output lines. Referring now to FIG. 19, there is illustrated a "maximum capability tool module register" which will be used to explain transfer of data between the common bus and a tool module. (Actually, receivers and drivers contained in the buffering circuitry will exist in each data line connecting the common bus and the tool modules. However, the purpose of these receivers and drivers has already been discussed and will not be discussed further). When a particular data register in a tool module is to be addressed by the CPU, the appropriate address will appear on 8 binary address line applied to decoder 360. Recalling the discussion concering the general interface address, it should be remembered that the complete address placed on the address lines of the common bus by the CPU required 16 address lines. The general interface accomplished part of the decoding and determined that the address on the address lines was one of the 256 possible addresses of the tool modules. Therefore, each tool module only has to decode 8 address lines rather than the full 16. Thus, once the tool module has decoded its address a signal will appear on line 361. This positive signal will be applied to AND gates 362, 363 and 364. AND gates 362, 363 and 364 will also be supplied the appropriate signal as determined by the general interface designating whether data already contained in register 365 will be placed on the data lines for use by the CPU or another peripheral device (requires an SWO signal) or whether data contained on the data lines will be loaded into the upper byte, lower byte or both bytes of register 365. If, for example, the data already contained in register 365 is needed by the CPU, in addition to a positive signal appearing on line 361 as a result of decoding the address of register 365, a positive SWO (Slave Word Out) signal will also appear on line 366 which is applied to the second input of AND gate 364. Therefore, with two positive inputs to AND gate 364, a strobe signal from AND gate 364 will be applied to the 16 AND gates 367 such that the data contained in register 365 wil eventually be applied to the common bus data lines. As mentioned before, prior to the data from AND gates 367 being applied to the common bus, these signals may first be buffered by way of the buffering circuitry in the general interface panel. On the other hand, if the CPU desired to load data into the register 365, this would be acomplished by a strobe signal from either one or both AND gates 362 and 363 being applied to AND gates 368. For example, if the general interface had decoded the signals on the C0, C1 and A0 lines of the common bus as indicating that data was to be loaded only into the upper eight bits (upper byte) of the register 365, then an SUBI (Slave Upper Byte In) signal would be applied to AND gate 362. Thus, because of the address signal from decoder 360 and the SUBI signal, AND gate 362 would provide a strobing signal such that data would be strobed from the common bus data lines through AND gates 368 and OR gates 369 and only into the 8 upper bits of register 365. Similarly, if the general interface had decoded the signals on the C0, C1 and A0 lines as indicating that data was to be loaded only into the lower 8 bits (lower byte), then a SLBI (Slave Lower Byte In) signal would appear at an input to AND gate 363 and be combined with the addressing signal from decoder 360 such that a strobing signal would only load in the 8 lower bits of data register 365. Finally, if the CPU desired to load 16 bits of data in all 16 bits of register 365, then both the SUBI and SLBI signals would be received at AND gates 362 and 363 respectively, along with the address signal from decoder 360 so that all 16 bits would be loaded in register 365 by way of AND gates 368 and OR gates 369. It is, of course, unlikely that the CPU would simply store certain data in register 365 and a short time later remove the data from register 365. Therefore, the register 365 must have some other purpose. For example, if the CPU is desiring data presently contained in register 365, it is likely that register 365 will have been loaded not by way of AND gates 368, but instead as a result of inputs from OR gates 369 by way of which data has been routed from the downhole tool module. On the other hand, if the CPU loads data into register 365 instead of being reapplied to the common bus at some subsequent time, it is more likely that the contents of register 365 will be used for effecting the operation of the downhole tool. This may be accomplished by either controlling some circuitry contained in the tool module or controlling the downhole tool directly. For example, as shown in FIG. 19, the data from register 365 in addition to being available at AND gates 367 is also available for use by utilizing circuit 371. The utilising circuit 371 could, of course, by any circuit needing particular instructions or information. For example, the utilizing device 371 could be the downhole investigating device and the data in register 365 applied thereto would be some sort of initiating circuit to turn the device on. Or, as in the case of the sonic tool module to be discussed hereinafter, the information in register 365 could be the trigger signal for the sonic generator.

Downhole Tool to GSI Connecting Circuitry—Now turning again to FIGS. 1 and 2, there is shown group 53 of tool modules. It will be recalled from the foregoing discussion that there may be a member of different types of data signals from the various exploring devices contained in downhole logging tool 50. In the embodiment shown, each of these various signals is supplied to an appropriate and different tool module contained in group 53. Thus, as examples, the logging tool 50 could intake one or more downhole exploring devices which produce measurements such as (1) spontaneous potential (SP); (2) resistivity; (3) conductivity; (4) pulses from a casing collar locater (CCL) transducer which will produce a pulse each time the well logging tool passes a casing collar; (5) events (or counts) per unit time from a single detection downhole nuclear radiation exploring device; (6) events (or counts) per unit time from a multi-detector (three) nuclear radiation exploring device; (7) time interval between two events—the transmitter firing time pulsed $T_o$ and received formations signals from af downhole sonic or acoustic logging tool whose transmitter firing is controlled by a timing oscillator contained in the downhole tool (8) time interval between two events—the transmitter firing time pulse $T_o$ and additional received reflected signals from a downhole sonic or acoustic logging tool whose transmitter firing is controlled by a timing source on the surface; and (9) resistivity from a so-called LATEROLOG which maintains a constant injected current by way of surface equipment under control of the CPU. It should be noted at this point that many of the measuring devices may be used either in cased or uncased wellbores, whereas some are used exclusively for cased (CCL, for example) wellbores and others are used exclusively for uncased wellbore (resistivity, for example). However, for purposes of discussion, all of the investigating devices are discussed without reference to whether the wellbore is cased or uncased.

Therefore, there are shown in FIGS. 20 through 28 illustrative diagrams, partially schematic and partially block, of the circuits involved with producing the above-mentioned data. Each of those diagrams illustrate the data signal path from the point it is produced at the measuring device until it is available to the CPU at the common bus. It should be clearly understood that although each of the FIGS. 20 through 28 show only one type of measurement passing through a tool module on its way from a downhole device to the common bus, in actual practice, a single tool module may contain circuitry for one or more of the illustrated end-to-end circuits as well as other end-to-end circuits not illustrated. It will be appreciated from the previous discussion concerning the system of this invention, that once the data is available in binary digital form at the common bus, it can then be stored, computed, displayed or manipulated by the system in almost any manner desired. Therefore, since the end use of the data may vary, the end-to-end circuitry of FIGS. 20 through 28 only illustrate the circuitry from this downhole investigating device to the common bus.

Figure 2:
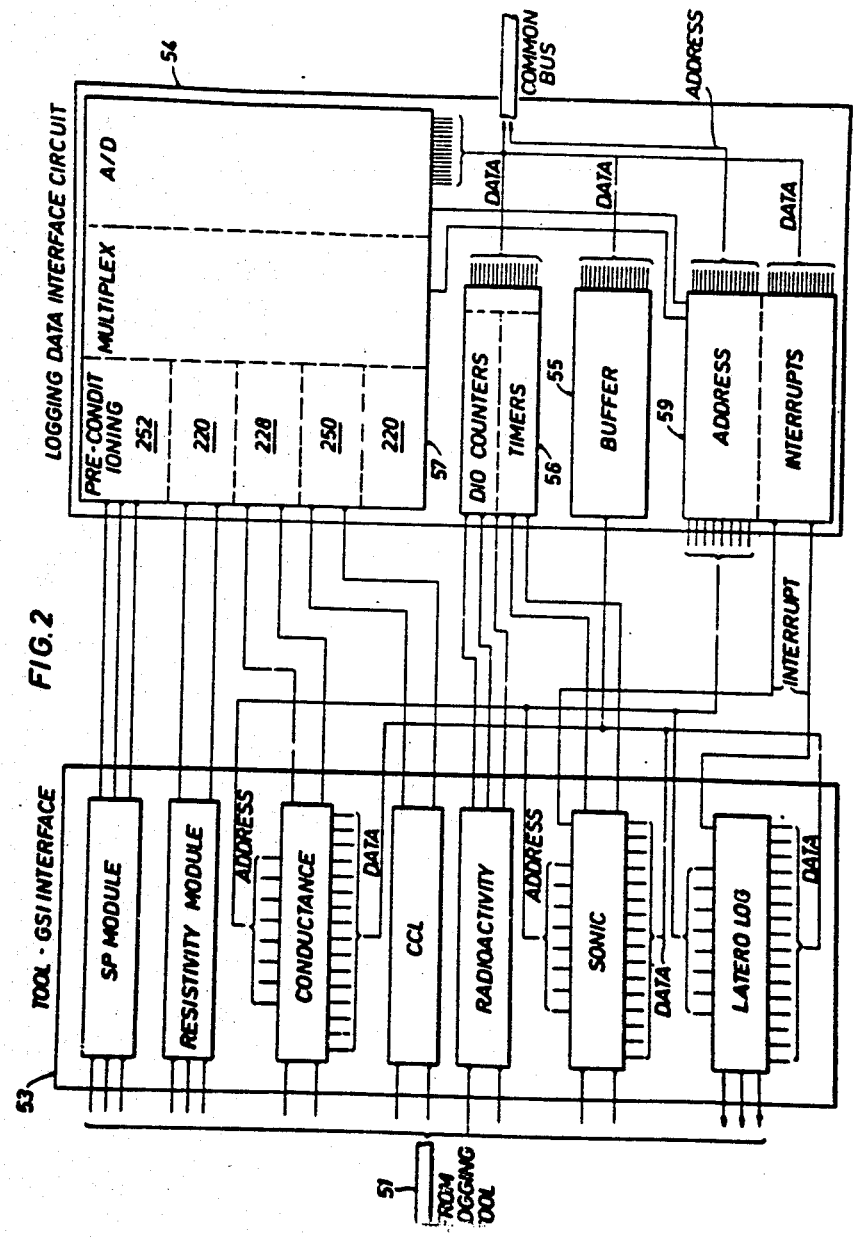
FIG. 2 shows in more detail the Tool-GSI Interface and General Interface of FIG. 1.
Figure 20:
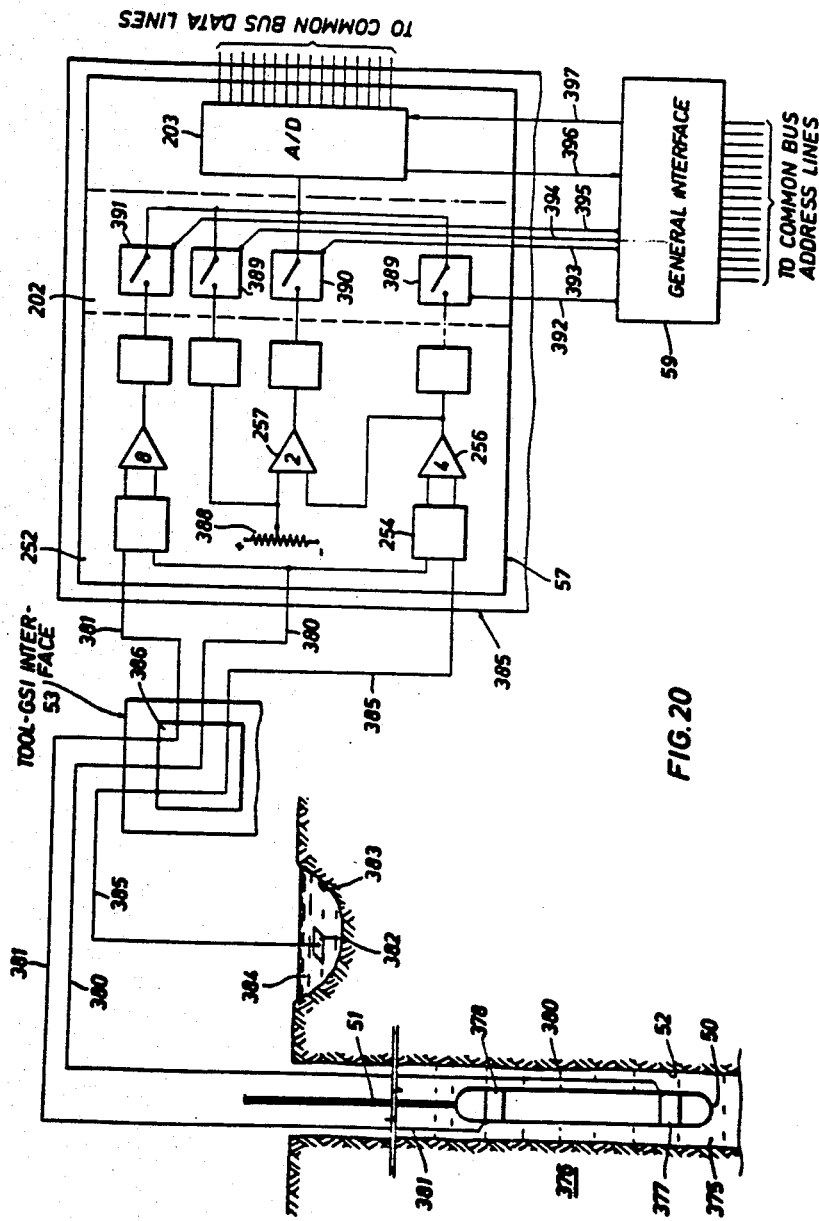

Referring now to FIG. 20 in conjunction with FIGS. 1 and 2, there is shown end-to-end circuitry for obtaining spontaneous potential (SP) measurements. It should be noted that when the same apparatus is illustrated in more than one of the drawings, the same reference numbers are used to avoid confusion. A thorough discussion of SP logging may be found in a publication entitled, "Log Interpretation Principles", published by Schlumberger Limited, 277 Park Avenue, New York, N.Y. 10017. In addition, there are many U.S. patents such as U.S. Pat. No. 3,638,105 and 3,638,106 on subject matter relative to SP loading. For a thorough understanding of the subject of SP logging, these reference should be consulted. However, for convenience, a very brief discussion of SP logging is included herein.

Spontaneous potential (SP) is the potential produced naturally be electrochemical phenomena in the downhole formations. This electrochemical phenomena causes electromotive forces to be produced at the junction between the drilling mud filtrate and the formation water in the pores of the permeable beds. Electromotive forces are also produced across the adjacent shales. In the typical SP logging method, the potential is measured between a surface reference electrode and an electrode in the column of conductive mud as this latter electrode is pulled up past different formations. The reference electrode is preferably at a stable potential such that the potential difference measured between the two electrodes at different depth levels will be accurately representative of changes in the SP value at different depth levels. The character of the SP log produced by such measurements depends a great deal upon the mud and formations encountered and is used to detect permeable beds and obtain values of formation water resistivity. A particular variation of SP logging is SPC logging (spontaneous potential compensated). SPC logs require the use of two downhole electrodes and result in a very sensitive log which provides better determination of downhole spontaneous potential. As shown in FIG. 20, there is a borehole 52 filled with a suitable conductive drilling mud 375 traversing earth formations 376. A well logging tool 50 having SP electrodes 377 and 378 is supported in borehole 52 on the end of a multiconductor cable 51. A pair of conductors 380 and 381 connect SP electrodes 377 and 378 respectively to suitable electronic circuitry at the surface of the earth. In reality, these conductors are part of cable 51 but are shown separate therefrom for purposes of clarity of the electrical diagram. A surface reference electrode 382 is located at the surface of the earth in a pit 383 filled with a conductive fluid 384 such that the electrode 382 will make good electrical contact with the earth. Conductors 380 and 381 from the downhole electrode 377 and 378 and conductor 385 from the surface electrode 382 are sent to the tool GSI interface 53 located at the surface. Tool GSI interface 53 routes conductors 380, 381 and 385 to a specific tool module 386 contained therein. Tool module 386 in this particular circuit simply provides connective wiring to A/D conversion panel 57 which is part of logging data interface circuitry 54. From FIG. 11, it will be recalled that A/D converting panel 57 is divided into a preconditioner 201, a multiplexer 202 and an A/D converter 203.

FIG. 12 illustrates typical different types of preconditioning circuits that are available. Therefore, in accordance with FIGS. 11 and 12, the connecting wires 380, 381 and 385 from tool module 386 are applied to a circuit in preconditioner 201 of the type illustrated at 252 in FIG. 12. This circuit provides four possible outputs to the A/D converter 203 that may be selected by multiplexer 202. These four output channels to A/D converter 203 which are allocated to SP processing, eliminate the need for any manual switching for changing between either an SP or SPC type log while still maintaining good sensitivity. In either case, the potential from the surface or reference electrode 382 is subtracted from the potential of the downhole electrode 377 by combining-and-filter circuit 254. The difference of these two potentials is then amplified by four by amplifier 256. This data then may be digitized without further processing by selecting multiplexer switch 387. If the output from amplifier 256 is digitised directly, the manual correction voltage provided by the millivolt adjust circuit 388 and which is typically subtracted from the SPpotential will also be digitized directly by selection of multiplexer switch 389. Thus, the desired subtraction of the output from adjust circuit 388 from SP output amplifier 256 must be accomplished by the computer after both analog signals have been digitized. Alternatively, subtraction of the analog manual correction signal produced by adjust circuit 388 from the analog SP signal produced by amplifier 256 can be accomplished by combining amplifier 257 if multiplexer switch 390 is selected. Of course, if multiplexer switch 390 is selected only one digitizing operation is necessary. If SPC data is desired, it is very important that the manual correction voltage from adjust circuit 388 not be introduced until after digitizing and filtering, or the exact point where such manual corrections are introduced will be obscured. Therefore, for SPC data the CPU must digitize three signals. ASP data from downhole electrode 378 by way of multiplexer switch 391, manual correction voltage by way of multiplexer switch 389 and SP data from downhole electrode 377 by way of multiplexer switch 387. The desired channel or channels are selected for digitizing under control of the CPU by way of multiplexer 202. The address of the desired multiplexer channel is decoded by general interface 59 and a signal is sent to the appropriate multiplexer switch by way of signal wires 392, 393, 394 and 395. After the appropriate channel has been selected by the CPU, and routed to the A/D converter 203, the analog signals will be digitized. After A/D converter 203 has completed digitizing the signal, a CPU interrupt will be initiated by the A/D converter 203 by a digitizing complete signal sent to general interface 59 by way of connecting wire 396. At the appropriate time in accordance with existing priorities, the CPU will by way of sending a 18 bit address to general interface 59 address the holding register contained in A/D converter 203 with a signal on connecting line 397 and cause the digitized data to be stamped onto the common bus data lines and into a suitable storage register (core memory 62, for example). Once the digitized SP or SPC data is in a suitable memory or storage location, it may then be permanently stored, computed or displayed as desired and as has already been discussed heretofore.

Figure 21:
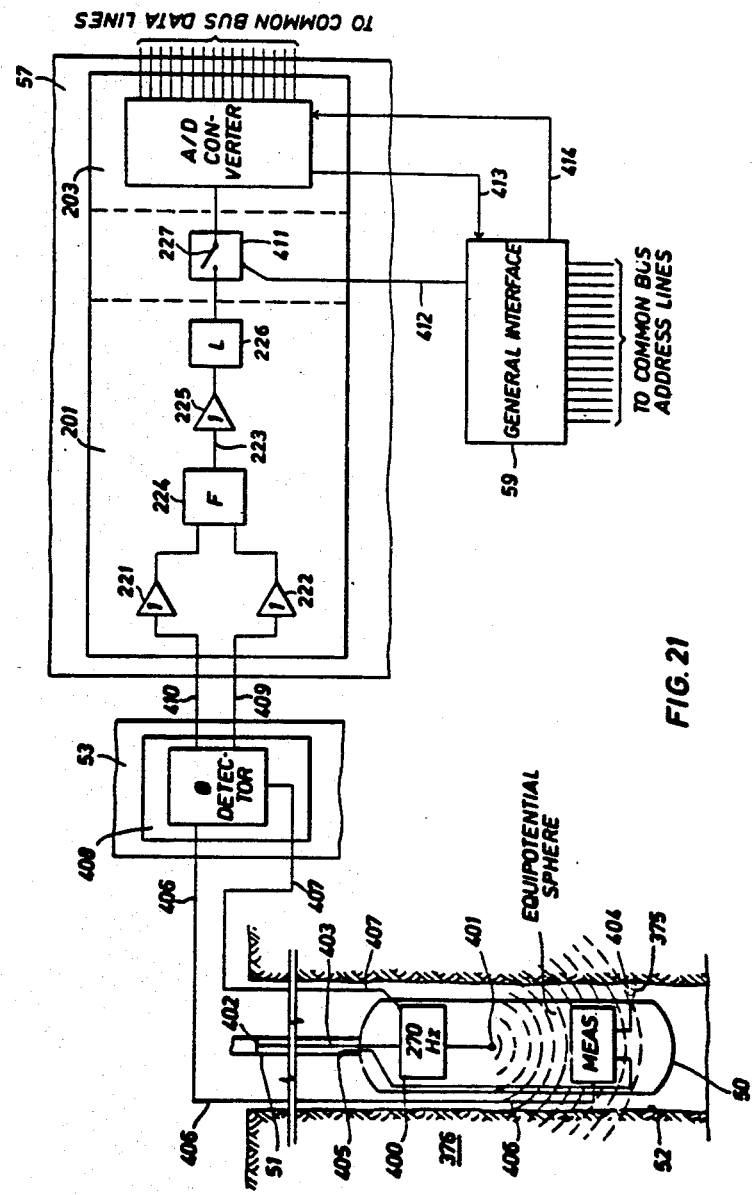

Referring now to FIG. 21, there is shown end-to-end circuits for obtaining resistivity measurements. For a thorough understanding of resistivity logs, the publication, "Logging Interpretation Principles", heretofore mentioned and applicable U.S. patents such as U.S. Pat. No. 3,014,175 should be consulted. Briefly, however, resistivity logs are obtained according to one method by passing a constant current from a first current emitting electrode through the formations surrounding the wellbore to a second (current collecting) electrode. The current emitting electrode is typically located on the downhole logging tool and the second electrode is theoretically located an infinite distance away. (Actually, the current collecting electrode is the cable armor of the multiconductor cable supporting the logging tool.)

In a honogeneous isotropic formation of infinite extent, the equipotential surfaces surrounding the current emitting electrode are spheres. Therefore, the voltage between a third (potential) electrode situated on one of these spheres and located on the logging tool at a fixed distance, and a fourth electrode at infinity is proportional to the resistivity of the homogeneous formation. Now, if the logging tool is moved through the wellbore and past the adjacent formations, it can be seen that the voltage difference between the third and fourth electrode will vary proportional to changes in the formation resistivity. The determination of resistivity variations through a wellbore is of particular importance in well logging. As shown in FIG. 21, and as similar to circuitry illustrated in FIG. 20, there is a borehole 52 filled with a suitable conductive drilling mud 375 transverse earth formations 376. Well logging tool 50 contains a 270 $H_z$ generator 400 for providing a constant (RMS)current. The constant current from 270 $H_z$ generator 400 is applied to the current emitting electrode 401 located on well tool 50. The current collector or return electrode 402 is the armor of multiconductor cable 51, which is far removed from current emitting electrode 401. Thus, the cable armor is connected by way of connecting line 403 to generator 400 to complete the electrical circuit. A potential electrode 404 is also located on well tool 50 at a spaced distance (such as 16 inches, for example) from current emitting electrode 401. The voltage difference between electrode 404 and a second potential electrod 405 located on multiconductor cable 51 also at a distance well removed from current emitting electrode 401 and potential electrode 404 is measured, and this measurement is transmitted to the surface by way of conductor 406. Conductor 407 connected to 270 $H_z$ generator 400 also provides a frequency synchronizing signal from the generator to the surface. Conductors 406 and 407 are, of course, actually contained in multiconductor cable 51. At the surface, the two conductors 406 and 407 are routed by way of tool-GSI interface 53 to tool module 408 where a phase-sensitive detector extracts as a varying DC signal the potential difference between the two electrodes 404 and 405. This varying DC signal is then applied by way of connecting lines 409 and 410 to a preconditioning circuitry which is similar to circuitry 220 illustrated in FIG. 12 in the A/D conversion panel 57.

Recalling the earlier discussion concerning the operation of circuit 220 of FIG. 12, it will be appreciated that the double-ended input from tool module 408 which provides the analog resistivity signal will be filtered, referenced to the same level as the GSI and electrically isolated from the tool module 408 and the downhole apparatus by preconditioning circuit 220. The resulting conditioned analog data signal may then be digitized by A/D converter 203 if multiplexer switch 411 is selected. Digitizing of the signal is accomplished in a similar manner to that heretofore mentioned. That is, the address of the desired multiplexer channel is placed on the 18 bit address line of the common bus, is decoded by general interface 59 and a signal to connect preconditioning circuit 220 to A/D converter 203 is applied to multiplexer switch 411 by way of connecting line 412. After A/D converter 203 has completed digitizing the signal, a CPU interrupt will be initiated by A/D converter 203 by a signal sent to general interface 59 by way of connecting wire 413. At the appropriate time in accordance with existing priorities, the CPU will by way of the general interface address the holding register in A/D converter 203 via connecting line 414 and cause the digitized data to be strobed onto the common bus data lines and into a suitable storage location when the data may then be used by the CPU, as desired.

Figure 22:
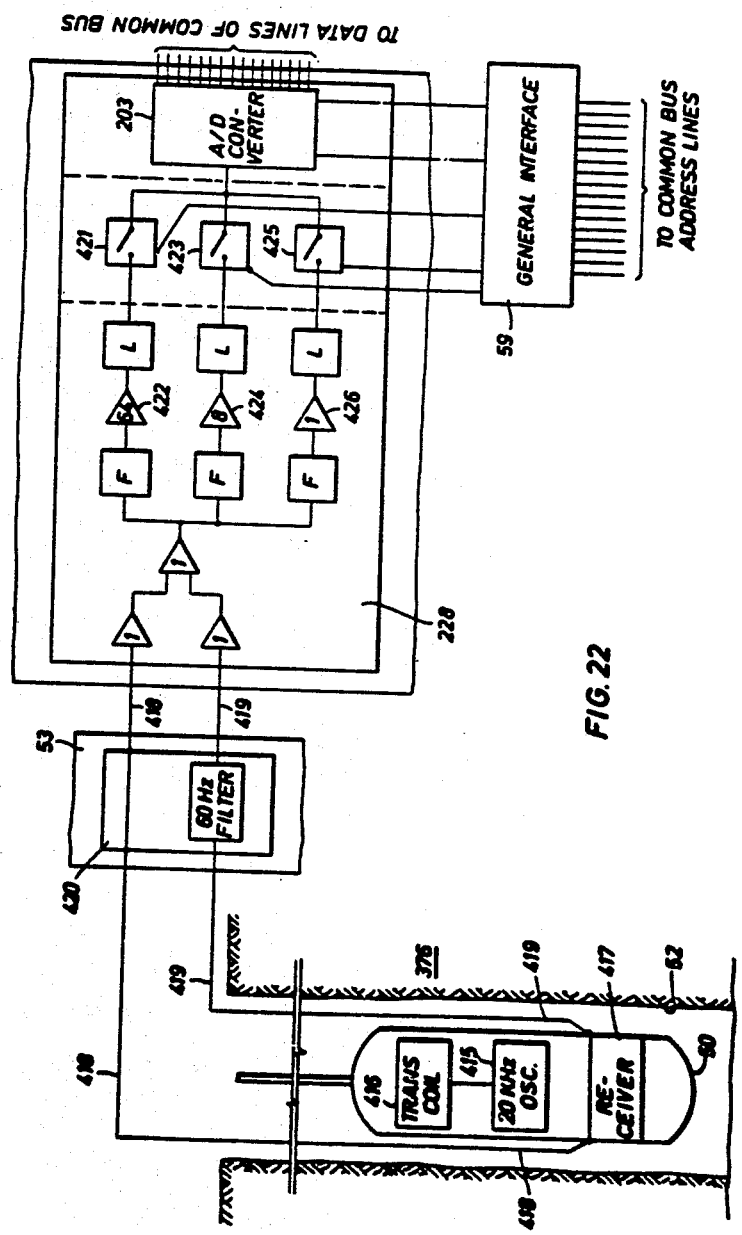

In FIG. 22 there is shown end-to-end circuitry for obtaining conductivity measurements which then may be reciprocated and used as resistivity data. Such conductivity measurements are typically produced by induction logging. For detailed information concerning induction logging, the publication, "Basic Theory of Induction Logging", by J. H. Moran and K. S. Kuns, published in the December 1967 issue of *Geophysics*. Also, U.S. Pat. Nos. 3,067,383 and 3,226,633 should be consulted. Briefly, however, the induction log was developed to measure formation resistivity in boreholes containing oil-base muds. Electrode devices such as those heretofore discussed with respect to FIG. 21 do not work in these non-conductive muds, and attempts to use wall-scratching electrodes has proven unsatisfactory.

Practical induction logging investigating devices include a system of several coaxial transmitter and receiver coils. However the principle can be understood and is illustrated in FIG. 22 by considering an investigating device with only one transmitter coil and one receiver coil. Within logging tool 50 located in wellbore 52, high frequency alternating current of constant intensity is provided by 20 kHz generator 415 and sent through transmitter coil 416. The alternating magnetic field induces secondary currents in the formation 376. These currents flow in circular ground loop paths coaxial with the transmitter coil. These ground loop currents in turn, create magnetic fields which induce signals in a receiver 417. The receiver signals are essentially proportional to the conductivity of the formations and after a slowly varying DC signal which is proportional to the formation conductivity is extracted from the 20 kHz received signal, this DC signal is transmitted to the surface by way of conductors 418 and 419. At the surface, the two conductors 418 and 419 are routed by way of tool-GSI interface 53 to tool module 420. Tool module 420 basically provides connecting wiring to a preconditioning circuit. However, in most cases tool module 420 will also provide filtering of 60 cycle noise that may have been induced onto conductors 418 and 419. The filtered varying DC signal representative of conductivity in the formation is then applied to conditioning circuitry of the type shown at 228 of FIG. 12. This circuitry 228 operates similarly to that circuitry 220 heretofore described, except that the single ended output instead of being routed to a single unigain amplifier is routed to three different amplifiers. These three amplifiers have gains of 64, 8 and 1 respectively. Therefore, the analog signal digitized by A/D converter 203 and representative of the conductivity of the formation may be selected to have a gain of 64, 8 or 1. The particular amount of gain applied to the analog conductivity signal is, of course, determined by which multiplexer switch is selected. For example, if multiplexer switch 421 is selected, the conductivity signal will be amplified by amplifier 422 to a value 64 times its original value. Likewise, if multiplexer switch 423 is selected, amplifier 424 will amplify this signal by a value of 8, and if multiplexer switch 425 is selected, the conductivity signal will only be amplified by a gain of 1 by way of amplifier 426. The selection of the multiplexer switch is controlled by a general interface 59 in precisely the same manner as was described with respect to FIGS. 20 and 21. In addition, once a multiplexer channel has been selected, and the signal has been digitized by A/D converter 203, the digitized signal is applied to the data lines of the common bus by the use of the interrupt signal and an address signal in a manner heretofore described. However, it should be appreciated that the purpose of having a selection of how much gain is to be applied to the analog conductivity signal, is so that a high degree of resolution may be provided in the data. As will become clear in a later discussion with respect to the software programs which control this system, the CPU will select the amount of gain to be applied to the conductivity measurement on the basis of the value of the previous conductivity measurement. That is, if the previous measurement was very large and we assume that a minimum amount of gain or in the present example, a gain of 1 was used, it is likely that the same amount of gain will be necessary for the present reading as these conductivity measurements normally change at a very slow rate. Therefore, the CPU would select the channel having a gain of 1 for digitizing. The digitized value is then compared to a predetermined level, and if the digitized value is less than this predetermined level, the conductivity channel having a gain of 8 will be digitized on the subsequent reading. Similarly, if on the subsequent reading the digital value was less than a second preselected level, the conductivity channel having a gain of 64 would be digitized. Conversely, if the digital value is greater than a preselected value then the CPU will select a conductivity channel having less gain. Thus, it can be seen that by proper selection of the conductivity channel to be digitized that data with high resolution may be obtained.

Figure 23:
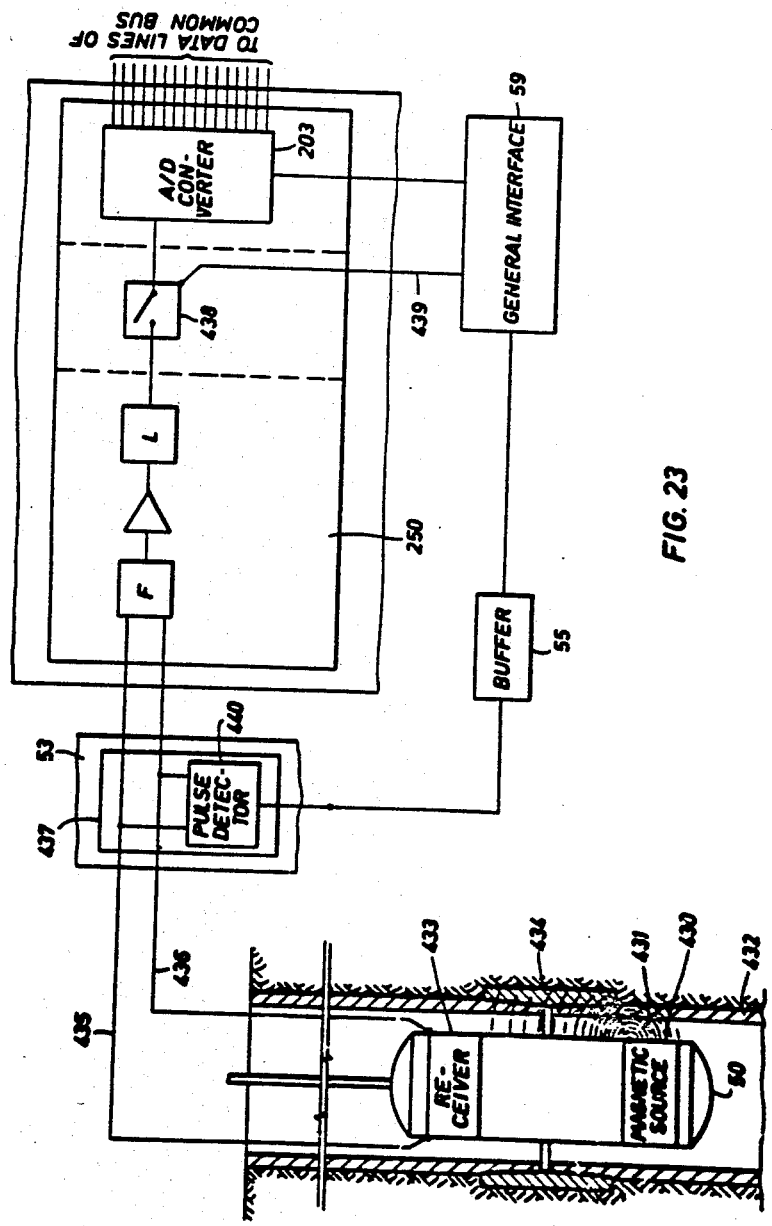

Now referring to FIG. 23, there is shown an end-to-end schematic of circuitry for providing an indication of the joint in a wellbore casing. This circuitry typically called a CCL (casing collar locater) comprises a transmitter 430, for creating a magnetic field. Transmitter 430 is located on logging tool 50 in such a manner that the magnetic flux lines 431 pass through the well casing 432. Located adjacent transmitter 430 receiving coil 433 senses changes in the magnetic flux lines 431. Therefore, as the logging tool 50 moves past a casing joint or casing collar 434, the variation in the amount of metal causes changes in the magnetic flux lines 431. A signal representative of these changes in the magnetic flux is then transmitted to the surface by way of conductors 435 and 436. Conductors 435 and 436 transmit the signal to tool module 437 located in tool-GSI interface 53. Tool module 437 may simply provide connecting wiring to the preconditioning circuitry 250. The operation of circuitry 250 simply provides filtering, isolation and possibly amplification to the signal prior to being available at the multiplexer for application to the A/D converter 203. Therefore, further discussion of circuitry 250 will not be provided. Thus, it can be seen that by properly selecting switch 438, the signal from conditioning circuit 250 will be digitized to A/D converter 203. Selection of the multiplexer switch 438 is accomplished in the same manner heretofore described by the CPU addressing general interface 59 which in turn provides a signal on conductor 439 to connect conditioning circuit 250 to A/D converter 203. However, it should be noted that to effectively provide a CCL signal the CPU must be aware of when logging tool 50 moves past a casing collar 434 or conversely the CPU must sample the data provided by multiplexer channel 438 at sufficient intervals to guarantee that the signal produced on the receiver coil by the logging tool 50 passing a casing collar will be digitized. As will be appreciated by those skilled in the art, the typical casing collar signal normally exists over a length of approximately 6 inches. Therefore, if digitizing of the casing collar signal is to be guaranteed, then a data sample must be collected at no less than 6-inch intervals. This technique, however, would be too frequent and would not normally prove satisfactory. Therefore, in the circuitry of FIG. 23 there is also included in tool module 457 a pulse detector 440. Pulse detector 440 senses the occurrence of a CCL pulse and provides a signal to the general interface panel 59 which results in an interrupt to the CPU. This interrupt advises the CPU that the casing collar signal has occurred and that the data is available for sampling by A/D converter 203. Thus, by using this technique, it is not necessary that multiplexer channel 438 be sampled at very close intervals since the CPU will be advised when the CCL signal has occurred by means of the interrupt. Thus, when advised, the CPU can branch away from the task it is presently performing and collect the data through the use of A/D converter 203.

In addition to SP and resistivity, it has been found that valuable information concerning the formations surrounding a wellbore may be derived from nuclear activity of the formation. This information may simply be the natural background radiation of the formation, or the information may be obtained by irradiating the formation with a nuclear source and then measuring the resulting nuclear phenomena resulting from such irradiation. Nuclear logs made from such measurements are particularly suitable for delineation of porous formations and determination of their porosity. Nuclear measurements respond primarily to the amount of hydrogen present in the formation. Thus, in clean formations whose pores are filled with water or oil, the neutron log reflects the amount of liquid-filled porosity. When the hydrogen concentration of the material surrounding the neutron source is large, most of the neutrons are slowed down and captured within a short distance of the source. On the contrary, if the hydrogen concentration is small, the neutrons travel further from the source before being captured. Accordingly, long spacing capture gamma the counting rate of a Geiger-Meuller detector or a scintillation detector increases for decreased hydrogen concentration. Referring now to FIG. 24, there is shown circuitry of the type used in nuclear logging. Well tool 50 includes a radiation source 441 which periodically irradiates formations 376 surrounding wellbore 52. The resulting radiation in the formation is then measured by a detector 442 located in well tool 50 at a selected time interval after the formation was irradiated. Detector 442 may comprise a Geiger-Meuller detector or a scintillation detector. Pulses representative of the received radiation is then transmitted to the surface by way of conductor 443. These pulses are then routed by means of connecting wiring in tool module 444 to the digital input/output panel 58 shown in FIGS. 1 and 2. These pulses are then counted by counter 445 contained in DIO 58. The period during which the counting takes place by counter 445 is controlled by a signal on line 446 from CSR 447, the signal having a duration of the desired time period that radiation from detector 442 is to be counted. Thus, to obtain the radiation count, the CPU will first address CSR register 447 by way of general interface 59 and set register CSR such that a pulse is applied to counter 445 and the counter 445 begins its count. After the appropriate period of time has elapsed as determined by the CPU, CPU will again address the CSR and remove the pulse which is being applied to counter 445. Subsequent to removing the pulse, CPU will, when ready, then address a holding register in counter 445 by way of general interface 59. It is often desirable that the nuclear count rate be measured at various periods while the periodic nuclear irradiating source is in the off cycle. If such various measurements are to be made, it is necessary that the logging tool contain more than one detector. Therefore, referring to FIG. 25 there is shown a logging tool 50 including a source 441 and three nuclear detectors 442, 448 and 449. The pulse output of these three detectors is then applied to multiplexer 450 where the pulses are multiplexed together and then transmitted to the surface by way of single conductor 443. Single conductor 443 connects multiplexer 450 to tool module 451. Contained within tool module 451 is a demultiplexer 452. Demultiplexer 452 separates the signals from the respective detectors and applies the separated signals by way of conductors 453, 454 and 455 to counters 456, 457 and 458 contained in DIO panel 58. The operation and addressing of counters 456 through 458 is identical with the operation and addressing of counter 445 discussed in conjunction with FIG. 24. Therefore, it can be seen that by this technique the output of three downhole detectors is available to the CPU.

Still another technique for obtaining information concerning subsurface formations is by way of a "sonic log". The sonic log represents measurements of the interval transit time, $\Delta t$, for an acoustic wave (compressional sound wave) to travel a specific distance (typically one foot) through the formations along a path parallel to a wellbore. The interval transit time for a given formation depends upon its lithology and porosity. Its dependence upon porosity when the lithology is known makes a sonic log a very useful tool for determining porosity. For additional information concerning sonic logging the publication, "Log Interpretation Principles", heretofore mentioned along with U.S. Pat. Nos. 3,231,041 and 3,257,639 should be consulted.

Figure 26:
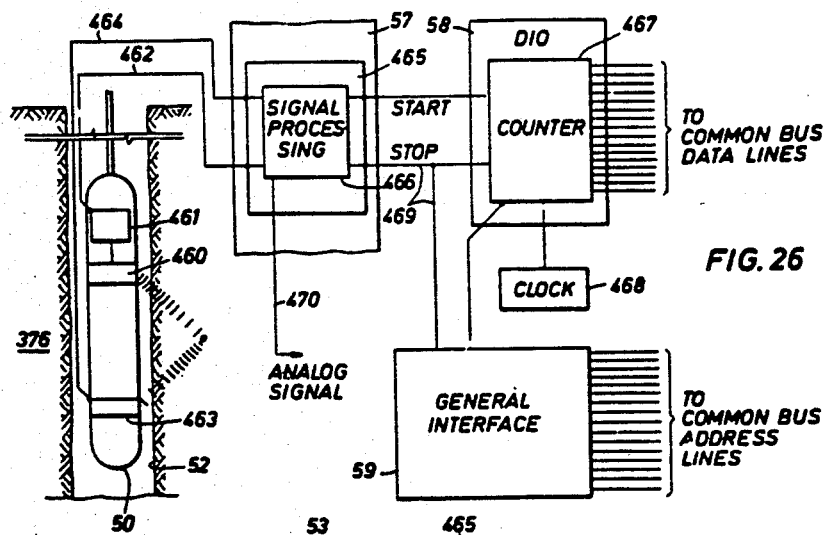
Figure 27:
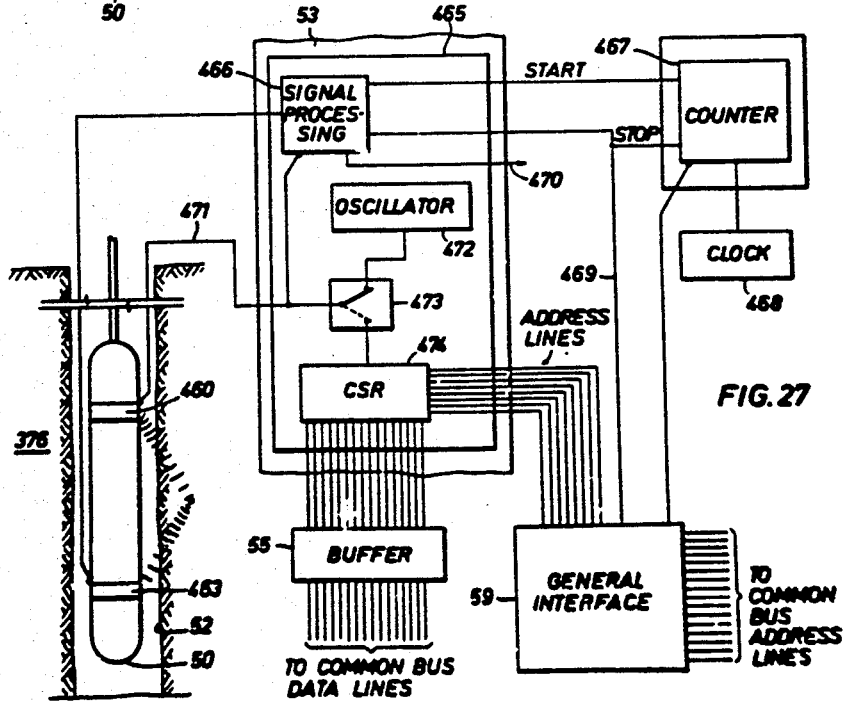

Referring to FIG. 26, there is shown a well tool 50 in wellbore 52. Well tool 50 includes a sonic generator 460 controlled by a timing oscillator 461. Periodic pulses from oscillator 461 result in sonic generator 460 directing a burst of sonic energy out into the formation 376. In addition to pulsing sonic generator 460, a synchronizing signal is also provided from oscillator 461 to the surface by way of conductor 462. At least part of the sonic energy transmitted into formation 376 will be refracted from the formation and detected at receiver 463. The refracted signal is then transmitted to the surface by way of conductor 464. The synchronizing signal on conductor 462 and the detected signal on conductor 464 are applied by way of tool-GSI interface 53 to tool module 465 where the data is processed by signal processor 466. The synchronizing signal from conductor 462 results in a pulse being applied to a counter 467 in DIO 58 which starts counter 467 counting clock pulses from clock source 468. Signal processor 466 will subsequently detect, by way of conductor 464, that receiver 463 has received the first arriving acoustic signal refracted from the formation. Detecting this indication of the first arriving signal will result in signal processor 466 providing a pulse signal on conductor 469 to stop counter 467 from counting anymore clock pulses from source 468. The pulse signal on conductor 469 is also applied to general interface 59 to initiate a CPU interrupt. Therefore, it can be seen that the accumulated number of clock pulses in counter 467 is representative of $\Delta t$, that is, the time interval between when sonic generator 460 directs acoustic energy into the formation and when the first arriving indication of the refracted energy was detected at receiver 463. Sometime after this accumulation of clock pulses by counter 467, and as a result of the interrupt initiate signal applied to general interface 59, the CPU will address counter 467 by way of general interface 59 and strobe the data onto the common bus data lines where it can then be processed as desired. It has been recognized that valuable additional information about subsurface formations may be determined by recording and analysing the complete refracted waveforms. Therefore, it is not unusual for the complete waveform to be recorded as well as determining the time interval between the transmitter firing and initiate pulse in the first arriving refracted wave. Consequently, the analog signal is available on conductor 470 for recording or other uses if desired.

Sometimes it is desirable to control the acoustic transmitter firing from the surface. Therefore, referring to FIG. 27, there is apparatus similar to that illustrated in FIG. 26, except that the firing of sonic generator 460 is not controlled by oscillator 461 in the well tool 50, but is instead controlled by a firing pulse transmitted from the surface to generator 460 by way of conductor 471. The firing pulse generator at the surface could simply be from a timing oscillator 472, and connected to conductor 471 by way of switch 473. Alternatively, if switch 473 is in the dashed position, the firing pulse could be completely controlled by the CPU by way of CSR 474 which sends out a pulse to conductor 471. Thus, when the CPU determines that generator 460 is to be fired, the CPU can address CSR 474 by way of general interface 59 and load the register so that a pulse is applied through switch 473 to conductor 471. Conductor 471 transmits the firing pulse to generator 460 within the wellbore causing the transmitter to fire. In addition to the firing pulse being transmitted downhole, the pulse is also applied to the signal processor 466 of tool module 465 as a synchronizing signal. This synchronizing signal also results in a pulse being applied to a counter in DIO 58 to start counter 467 counting clock pulses. Then, as with the system described in conjunction with FIG. 26, the counter will stop counting when the first arriving refracted wave is detected by receiver 463. The $\Delta t$ measurement and the analog signal on conductor 470 is then available for use in the same manner as described with respect to FIG. 26.

Figure 28:
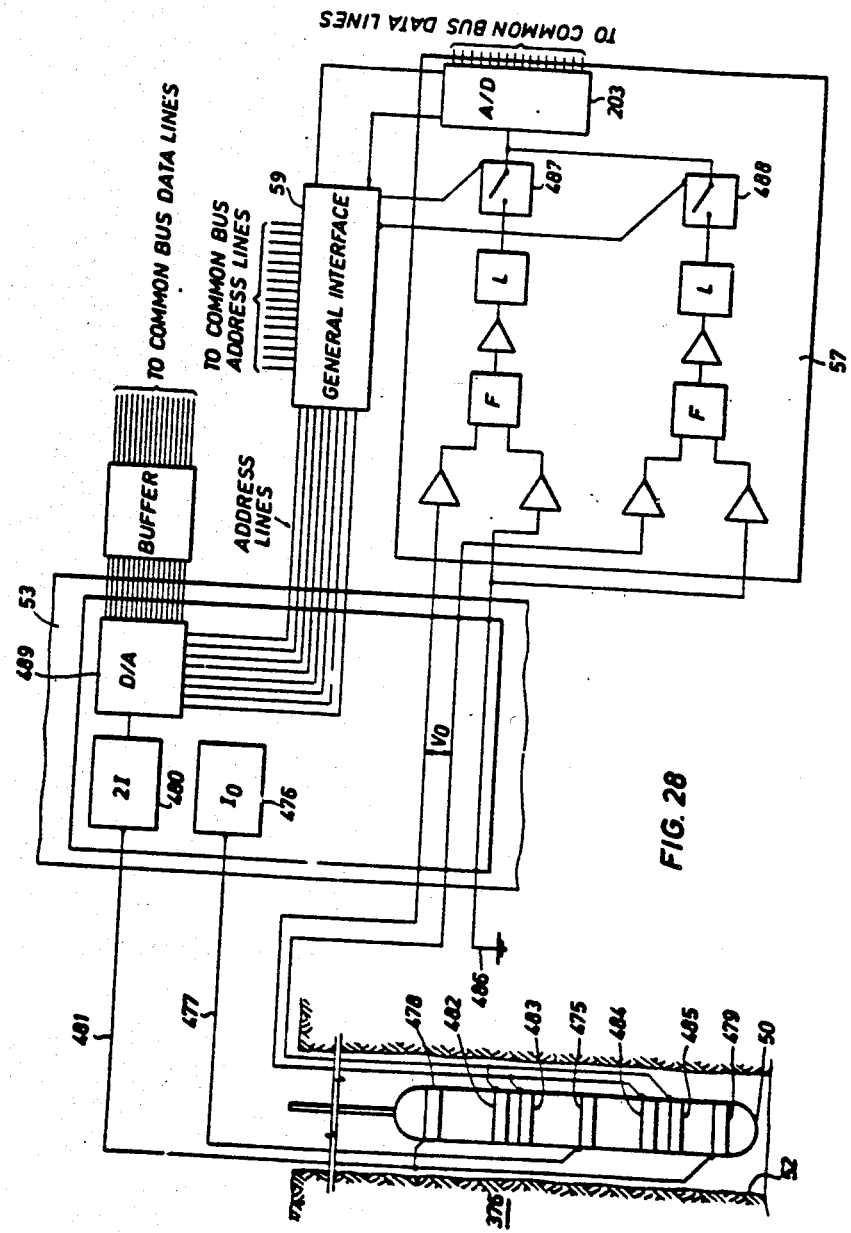

Circuitry for obtaining resistivity logs has already been discussed in conjunction with FIG. 21. However, such measurements are often affected to an unacceptable level by various external causes. The Laterolog method of resistivity measurements minimizes such external effects by forcing the measuring current to flow radially, as a thin sheet of current, into the formations being logged. The Laterolog is therefore much superior to conventional resistivity techniques for determining the resistivity of formations of moderate-to-small bed thickness. Referring now to FIG. 28, there is shown circuitry for obtaining a Laterolog. Logging tool 50 includes a center electrode 475 by way of which a constant current $I_o$ is introduced into the formations 376. Electrode 475 receives its constant current from a constant current generator 476 at the surface by way of conductor 477. An adjustable bucking current I is sent through each of the two electrodes 478 and 479. This bucking current I is generated at the surface by current generator 480 which generates bucking current 21 and sends current 21 downhole by way of conductor 481 where one half of the current is applied to electrode 478 and the other half is applied to electrode 479. The intensity of bucking current I is continuously adjusted so that the potential of two adjacent and close electrodes 482 and 483 is the same. (It should also be noted that electrode 484 is parallel to electrode 483 and electrode 485 is parallel to electrode 482. This means, of course, that the potential of electrodes 484 and 485 is also equal.) Now, since the potential difference between electrode 482 and electrode 483 is maintained at zero, this means that none of the constant current $I_o$ from electrode 475 is flowing into the formations between electrodes 482 and 483 or into the formations between electrodes 484 and 485. Therefore, the current from electrode 475 must penetrate horizontally into the formations as a sheet of current. Thus, the potential of any one of the electrodes 482, 483, 484 or 485 measured with respect to an electrode 486 at the surface will vary directly with formation resistivity. In operation, the CPU will cause the channel connected to electrodes 483 and 484 to be connected to A/D converter 203 by way of multiplexer switch 487. After this signal has been digitised and stored in core memory by the CPU, the CPU will cause the channel connected to electrodes 482 and 486 to be connected to A/D converter 203 by way of multiplexer switch 488. This data will also be stored in core memory. This data from the two channels is then available for whatever use is desired including controlling the current from current generator 480. For example, at a suitable time the CPU will compare the value of the data from the two different channels. If the difference between the two values is zero, then the bucking current is correct and there is no need of any adjustment. However, if there is a difference between the two data values, the CPU will address D/A converter 489 by way of general interface 59. The CPU will then load a correction value into the D/A converter 489 which will either increase or decrease as necessary the current flowing from current generator 480. This process is periodically repeated, of course, and thereby consistently maintains the proper bucking current.

SYSTEM OPERATION

As mentioned earlier in conjunction with FIG. 1, it is an important feature of the present invention that the CPU in conjunction with other peripheral devices be capable of continuously running a well logging operation under program control and at the same time also be able to acquire data from logging tool 50 at specified depth increments. To accomplish this, a task or program being processed by the CPU will be depth interrupted at times corresponding to movement of the logging tool from one depth level to another depth level which is at a specified increment away. Since the rate of movement of the logging tool through the wellbore may vary greatly, the speed or time between such incremental movement is random and/or asynchronous and cannot be predicted. In addition to such depth interrupts the system must also be capable of responding to any of the other system interrupts which may occur. (Refer to FIG. 3 and the corresponding discussion for further information of the many interrupts desirable for implementation in the system of this invention.) That is, it must be remembered that many of the various devices connected to the common bus are all operating simultaneously and at their own respective speeds. Therefore, the computer must be time-shared to keep all of the peripherals running at the required pace. However, since the computer can in reality do only one thing at a time, it must be switching rapidly in response to interrupts back and forth between the various tasks that make the system work. It is only because of the very high internal speed of the computer that all parts of the system appear to be handled simultaneously. Therefore, not only is it extremely important that data measurements from the logging tool not be lost simply because a task or program is in progress, but, it is also important that the system respond to these other interrupts for switching between the various devices. Furthermore, it is extremely important that if a task is interrupted, enough data from the interrupted task be saved so that the interrupted task can eventually be completed. If a computer or CPU is to respond to such asynchronous events, it is necessary that the computer use "real-time" programming. Programming for a real-time system is a complex problem in itself, but due to the high complexity and the different priorities of the many possible asynchronous events, satisfactory real-time programming for a well logging system is especially complex.

To understand how such asynchronous operations take place, an example of a typical depth interrupt will be discussed hereinafter. However, it should also be appreciated that the CSI system is not directed exclusively to the actual well logging or real-time situation. For example, the system can also be used to play back recorded data. In addition, the computer may be used for calibrating the logging tool since the computer has the ability to make all the required calibration measurements and may be programmed to perform all of them in an appropriate order. For example, at certain times it is necessary for the operator to take special actions such as attaching a calibration jig for a radiation tool or placing a calibration ring on a caliper. In such cases, an instructive message is printed by the teleprinter and the computer pauses until the operator signals that he has performed the appropriate action. Thus, in a sense, an "operations manual" may be built into the computer software such that the operator need only know the general principles of interacting with the software. The memory capabilities of the computer may also be used to serve some valuable bookkeeping functions. It can gather, format, display, and record information relative to the particular job, customer, hardware serial numbers, and well site. For brevity, this set of data is referred to as the Well-Site Data. It further includes such parameters as bottom hole temperature and the resistivity and density of the mud. Recording this data will be of value in subsequent processing of the recorded data. The computer controlled system may also be used to provide new capabilities for guarding against operator errors. For example, the system may be set up such that the computer must enable tool power before current can be passed to the downhole equipment. However, before enabling tool power, the computer will first check to see that the proper set of tool modules are interfaced with the system. For another example, the operator is forced to double check any modification he makes to data already stored in the computer memory.

Figure 29:
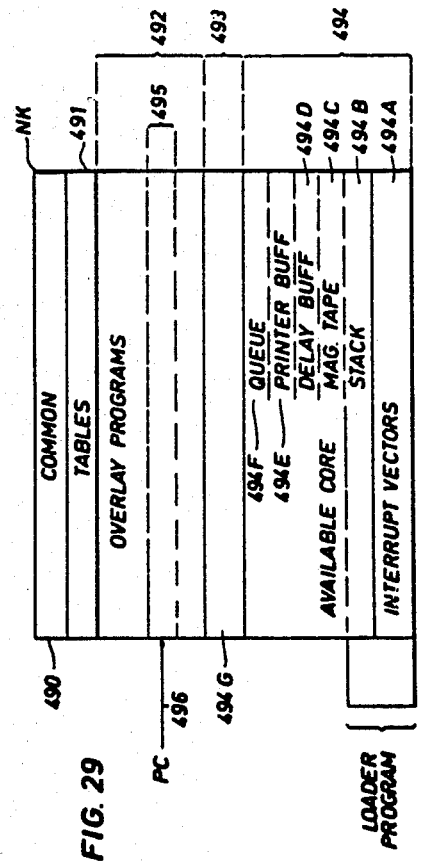
FIG. 29 illustrates the location of various types of data stored in the core memory of the system of FIG. 1.

The functions discussed above are performed in what is called an off-line mode as opposed to the on-line situation that exists during the actual logging run. The main distinction between these two types of operations concerns the relationship between the computer and its peripherals. That is, it is a question of which is controlling which. If the computer is essentially driven by responding to the external equipment, as it is when actually logging, the system is on-line. In such an on-line situation, the computer must respond to interrupts from the peripheral devices to keep all the equipment running. On the other hand, in the off-line situation the computer has the initiative and it operates the peripherals when and how it wants to. That is, the computer tells the operator and the peripheral what to do and not vice versa. Before a programmable digital computer (using either standard or real-time programming) can perform functions under program control, the program or programs must be stored in a suitable and accessible memory device such as, for example, core memory 62 illustrated in FIG. 1. Turning briefly to FIG. 29, there is shown a representation of core memory 62. This core memory has NK addressable memory locations. If N is 8, for example, there will be an 8,000 word storage capacity. In the present invention, specific blocks of storage locations are allocated for various types of other storage in addition to program storage. These various other uses of core locations will become clear in light of the following discussion. There is a considerable amount of information that may be common between the various phases or runs of a logging operation, (e.g., calibration corrections, selected parameters, etc.). The Well-Site Data, for example, may even be common from one service to another. The area 490 called Common of core memory 62 is used for this purpose and occupies the highest addresses in the memory and contains all information which is not related exclusively to the service being run. This includes the Well-Site Data and information relating to the status of various pieces of peripheral equipment. The area 490 of memory is also used for communication with the Absolute Loader program, to be described hereinafter. The Tables area 491 is adjacent to Common section 490 near the top of the memory and is used for storing information common to the different phases for one service combination. The remainder of the memory locations are dynamic and may be reloaded for each phase. Thus, there are essentially three levels of memory. The contents of Common 490 are in general not changed except when being explicitly updated. The contents of the Tables area 491 are completely reloaded from the program tape whenever the operation switches from one combination of tool module and downhole equipment to another. While the phases for a partial combination service are running, the basic structure of the Tables remains intact. However, each phase of an operation will generally alter the contents of certain locations within the Tables 491 in order to be suitable for use with the other phases of the combination.

The Tables 491 associated with a given combination also serve another function which may be distinguished the occupied queue of the highest priority and to then run the first job entered into that queue. After the CPU has finished that job, it locates and runs the second task, if any, that was entered into that queue. This continues until that queue level is empty. The Queue Handler will then direct the CPU in a similar manner to locate and run any tasks in the lower level queues. Therefore, it can be seen that eventually the CPU will get around to running the Half Inch Monitor program and any other jobs waiting in queue no matter what their queue level. It must be emphasised that this queue priority is wholly separate from the hardware bus request priorities and is not to be confused with them. Consequently, if, for example, while running the Half Inch Monitor program, some other interrupt were to occur which resulted in a task being placed in a higher priority level queue than the queue level of the Half Inch Monitor program, this new task would run prior to completion of the Half Inch Monitor program. Therefore, it can be seen that the queue is simply a list of tasks waiting according to priority designation to be run. However, as mentioned, the Half Inch Monitor task will eventually be completed, and in the present embodiment when this Half Inch Monitor program runs, it simply queues a "Half Inch Action List" program. The Half Inch Action List includes a list of programs that must be processed every half inch. Typically such a program would comprise instructions for acquiring certain data (analog or digital) every one half inch, but could, of course, also include any other programs to be executed. In addition, at every six inch interval the Half Inch Monitor program also queues a "Six Inch Acquisiton" program and a "Six Inch Processing" program. Thus, when an acquisition program is running, it will acquire all of the data as directed in the program instructions for that particular interval, i.e., one half inch or six inches.

For example, assume that sixty 0.1 inch interrupts (equivalent to 6 inches) have taken place since any of the acquired data was last processed and that five 0.1 inch interrupts (equivalent to 0.5 inches) have occurred since data was last acquired. Also, assume that it is desirable for some of the data from the downhole exploring devices be sampled at 0.5 inches, and the rest of the data be sampled at six inch increments. Therefore, since sixty 0.1 inch interrupts have occurred, the Half Inch Monitor program will be queued by the 0.1 inch Depth Interrupt Handler program. This is because, of course, the Half Inch Monitor program is queued at every 0.5 inch increment (i.e., at every five 0.1 inch interrupts) as five divides into sixty evenly. Consequently, the Half Inch Monitor program will queue the Half Inch Action List program which in this situation will at least include a Half-Inch Acquisition List. In addition, since a six inch increment has been traversed by the well logging tool (sixty 0.1 inch=six inches) the Half Inch Monitor program will also queue the Six Inch Acquisition program and the Six Inch Processing program. Therefore, when these jobs are eventually processed by the CPU, all of the data sources are sampled as a result of the two acquisition programs and all of the acquired data will be processed as a result of the processing program. This is accomplished in the following manner. Turning now to FIG. 1 and FIG. 2, the CPU under control of an acquisition program will address a particular data register connected to the common bus 60, such as for example a data register in DIO 58. The CPU will then transfer this data sample to a selected location in core memory 62 where it will be available for processing, displaying on the presentation device 63 or storing by magnetic tape mounted on transport 68. The CPU will then be directed by the acquisition program to obtain data from a second register and then a third, etc. until all of the appropriate data has been acquired. For example, assuming that several of the desired data samples originates from an analog exploring device, the CPU will send to General Interface 59 by way of common bus 60, the multiplexer address of the analog channel which is to be sampled and digitized. When the A/D converter 57 has completed its digitizing operation, a CPU interrupt will be sent out advising that the data has been digitized and is ready for acquisition. The CPU will then transfer data from the output register of the A/D converter 57 either directly to core memory 62 or to one of the registers 83 in the CPU or to any other storage location as desired. This process may be repeated over and over again until the data on all of the desired multiplezer channels in A/D converter 57 have been digitized and acquired.

It is again emphasized that all registers and peripheral units of the system have addresses just the same as the core memory 62. Thus, for example, referring again to FIG. 29, if the core memory is 0 to NK, then the output register containing the contents of A/D converter 57 may have an address NK+1, the output register of the counter in DIO 58 containing the digital data from the sonic tool module may have an address NK+2 and the two DIO registers containing data from the laterolog module may have addresses of NK+3 and NK+4, respectively. Therefore, the CPU 61 under program control can acquire data from any of these registers simply by addressing them, such that all of the data may be sequentially acquired and placed in either sspecified locations of core memory 62 or designated ones of the registers 83 in CPU 61. Then, after all of the data has been acquired, the data processing programs will be run so that the data is available for output on magnetic tape, a display device or the like.

To better understand what happens when an interrupt occurs it might be best to consider a specific example. First, however, it should be again explained that there are a plurality of queue priorities. Turning now to FIGS. 30 through 36, it will be appreciated that each queue priority has a specified block of core assigned to it, as is represented in FIG. 30C for example. The first location in each queue priority level block operates somewhat similar to a CSR; that is, it gives the status of the queue by designating whether that particular queue is vacant or occupied and whether it is busy or not busy. As will become clear later in respect to a discussion of the Queue Handler program, each queue priority level is checked to determine if it is vacant or busy. Therefore, when the Queue Handler program is called, it looks for the highest priority queue level which is occupied by looking at each of these first locations just described. Each queue priority also has a queue pointer associated with it as represented by the arrows designated QP5, QP4, QP3 and QP2 also illustrated in FIG. 30C. These queue pointers are actually numbers stored in particular core locations which are incremented by the number being moved from core 62 to the CPU 61, incremented by one, and returned.

In addition to the queue in core 62 there is also, as discussed earlier, a stack which is also contained in a particular section of core. It will be recalled from the discussion of FIG. 1, that one of the registers 83 is designated SP which stands for "stack pointer". The number from the commonality between phases. Tables 491 also contain information that is specific to the particular tool in the combination. The Tables 491 are then referred to by the generalized programs in the System Software during an operation in order to determine the exact details required for their operation. For example, in order to allocate delay buffers for depth shifting to be discussed hereinafter, it is necessary to know for each tool its length and position in the tool-string, and for each measurement on a particular tool its position with respect to the tool, Table 491 also contains other information which is specific to its particular measurement. For analog data this includes the multiplex channel number; and for radiation data, the counter number. The tables are also used to hold tool or measurement-specific information that is generated by the System Software during a run.

One part of the dynamic memory below the tables is called "Overlay" 492. For each phase, the entire Overlay portion 492 of memory is rewritten or overlaid by new Control programs from the program tape. This Overlay portion 492 not only contains the software that is specific to the phase and the tools in the tool-string, but also contains the minimal Operating System instructions which are common to all phases.

An area of memory 493 located below the Overlay portion 492 is used for buffers and temporary data storage, as will be discussed hereinafter. The remainder of core, section 494, will be referred to hereinafter as "Available Core". The lowest section 494A available core is reserved for interrupt vectors, which are special locations related to the handling of interrupts. The next section 494B up from 494A comprises a special temporary storage area referred to as the Stack, followed by the magnetic tape buffers 494C, data delay buffers 494D and printer buffers 494E and the "queue location" 494F. The unused portion, 494G, of available core, if any, is not assigned and may be used as desired.

Now assume that the CPU is in the process of running a program when the depth interrupt occurs, and that the task being run has its executable program instructions in the block of core location designated 495. This block 495 of core locations is a small portion of the overall section 492 reserved for Overlay programs. From FIG. 1, it should be recalled that included in the CPU are a group of general or volatile registers 83. One of these general registers is used as a program counter register, and it is designated PC. A program is always loaded in contiguous core locations, and as mentioned above, in the present embodiment the many and various programs are loaded in section 492 of core reserved for Overlay programs. Thus, when a particular program is running, the program counter register PC is incremented by "1" (or the number of words or bytes per instruction) for each instruction to be executed.

Therefore, the number in the PC register corresponds to the particular address in block 495 of FIG. 29 of the instruction which is being executed at any given time. Thus, as an example, the PC register number could correspond to the PC vector 496 shown on the left-hand side of FIG. 29. Furthermore, assume that at this time ten 0.01-inch depth pulses from measuring wheel 74 of FIG. 1 have been accumulated by the depth accumulator 78 of FIG. 1 to a total value of 0.1 inch. When this occurs, a signal representative of this occurrence is applied to depth interrupt circuit 80. Depth interrupt circuit 80 is a circuit similar to that illustrated in FIG. 4. This circuit causes a bus control request to be sent to the CPU. If the hardware priority level of this bus control request is higher than the hardware priority level of the CPU or of any other peripheral device requesting bus control the priority arbitrator 82 will pass bus control to the depth interrupt circuitry. When this happens, the depth interrupt circuitry will send an interrupt signal to the CPU and place a vector address on the data lines of the common bus by sending a strobe signal to a vector address circuit of the type shown in FIG. 7. Upon receiving the interrupt, the number in the program counter PC register corresponding to vector 496 shown in FIG. 29 is stored in particular locations 494B reserved in core called stack. This stored information provides in effect a return address for the CPU so that the program can later be continued in the proper sequence. In addition to this, the contents of the program status register PS which contains the information concerning the status of the job which was interrupted is also stored in stack so that the interrupted program can be continued at the same status as when interrupted. More specifically, the dta which is contained in this program status register indicates such information as the priority of the interrupted job, if the result of the last arithmetic operation was zero or other than zero, if it was negative, if it resulted in a carry from the mosst significant bit, and if the operation resulted in an arithmetic overflow. Another one of the several registers 83 (designated SP or "stack pointer") is utilized to keep track of the data in the stack. After the data in the PC and PS registers have been stored, and the SP register properly incremented the CPU will be directed by the vector address placed on the data lines by the depth interrupt circuitry to one of the many core locations designated interrupt vectors in section 494A illustrated in FIG. 29. From the information stored at the location designated by the vector address, the PS and the PC register will be loaded with the program status and the first core location of an interrupt servicing program hereinafter called the "Depth Interrupt Handler" program. The Depth Interrupt Handler program will, of course, also be stored in the overlay program portion 492 of core. This program will first determine whether or not a predetermined depth increment has been traversed by the well logging tool. That is, if we assume that the predetermined increment of interest is one-half inch, the program will determine whether or not five 0.1 inch interrupts have occurred since data was last acquired. If five such interrupts have not occurred, the system will return to processing the program being run when the interrupt occurred. On the other hand, if five 0.1 inch interrupts have occurred, the Depth Interrupt Handler program will place the address of the "Half Inch Monitor" program in the first available location of core storage reserved for all jobs having that particular priority level. Core locations in the Available Core section 492 F reserved for holding these program addresses will hereinafter be referred to as the "queue" and a particular priority level may be referred to as queue level. It should be clear at this point that only the address of the Half Inch Monitor program is placed in the queue. The actual program is and remains in the overlay portion 492 of core memory. Therefore, after the Depth Interrupt Handler program has placed the address of the Half Inch Monitor program into the firsst available space of the proper queue level, it will direct the CPU to jump to a so-called Queue Handler program also stored in overlay portion 492 of core memory. The Queue Handler program instructs the CPU to look for that this SP register contains represents a core location in stack. Because of this, the system will always known into which core location the last data put into the stack after interruption of the task has been placed.

Now taking an example of how the system of the present invention operates to handle depth interrupts, FIGS. 30A, 30B and 30C through FIGS. 36A, 36B and 36C will be considered in conjunction. Turning first to FIG. 30B which shows the tasks waiting in queue priority levels two through five, the vertical dashed line 500 indicates the point where the system is currently operating. The combination of FIGS. 30A, 30B and 30C can be considered as a snapshot of the system operation at a given point in time. Thus, in FIG. 30B assume that task number one which has a queue priority level of two is interrupted by a 0.1 inch interrupt as shown therein. Furthermore, assume that two more tasks designated number two and number three are in the queue waiting to be processed. Thus, looking at FIG. 30C and correlating this with FIG. 30B, it can be seen that queue priorities five, four and three will be vacant and not busy. It can also be seen that queue priority two will be occupied and busy since task number one was being run when the 0.1 depth interrupt occurred. Since task number one was in progress, the priority two queue pointer register (QP2) will contain a number corresponding to the core address of task number one, i.e., QP2 will be pointing to task number one. The queue pointer register for levels 5 through 3 represented by solid arrows QP5 through QP3 do not, of course, point to any task address as these queues are empty.

Looking at FIG. 30A, there is shown a diagrammatic representation of the stack just prior to the instant of the 0.1 inch depth interrupt. The stack pointer SP is simply an address number of a core location $S_n$ contained in the SP register in the group of registers 83, and is illustrated in FIG. 30A as arrow SP. In the particular case shown in FIG. 30A, the stack pointer SP is pointing at the core location designated S. As will be described in further detail later, whenever a 0.1 inch depth interrupt occurs, the contents of the program status and program counter registers for the task interrupted (i.e., Task No. 1) are stored in the first two available stack loctions in core 62. Thus, after the 0.1 inch depth interrupt signal has resulted in the CPU branching to the 0.1 inch Depth Interrupt Handler program the system will store the contents of the PS and PC registers for Task No. 1. The pointer SP now illustrated as a dashed line and designated SP' will be pointing to a new stack location S1. It should be noted here that with the PDP-11 computer, the PS and PC registers are automatically stored in stack under the control of an instruction processor contained in CPU 61. If we now assume that the 0.1 inch depth interrupt discussed with respect to FIGS. 30A, 30B and 30C was the 59th interrupt, the Half Inch Monitor program is not queued by the Depth Interrupt Handler program, and the contents of stack storage locations S-O and S-1 are quickly placed back into the PS and PC registers, and the stack pointer SP returns to location S such that Task No. 1 continues running.

Figure 31A:
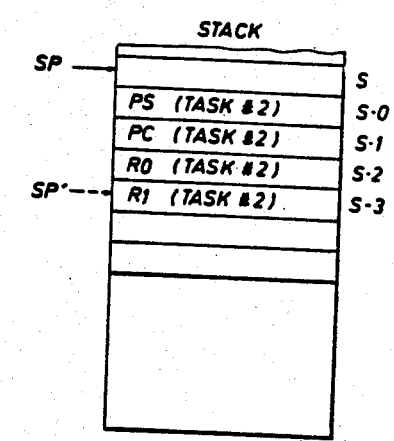
Figure 31B:
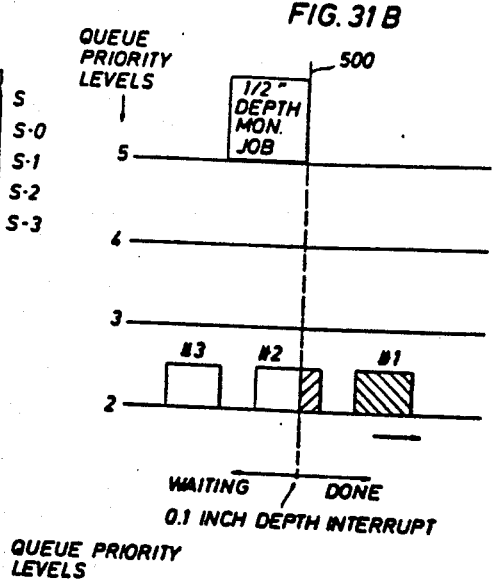
Figure 31C:
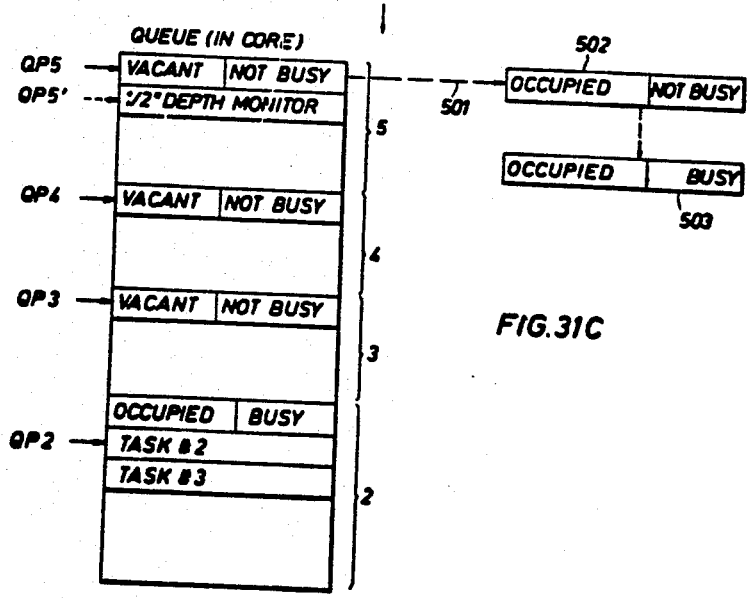

Turning now to FIGS. 31A, 31B and 31C, assume that Task No. 1 has been completed which results in the Queue Handler program being called. The Queue Handler program will determine that only priority level two contains a waiting task, and that the earliest entered task in the priority level two queue is the task previously identified as Task No. 2. Therefore, the CPU will start processing Task No. 2. Now assume that the 60th 0.1 inch depth interrupt occurs during the running of Task No. 2. As was the case in FIG. 30B, everything to the right of the dash line 500 in FIG. 31B indicates tasks that have been completed or portions of tasks that have been completed, and everything to the left of the dash line indicates waiting tasks. Therefore, at this point in time, Task No. 1 has been completed and a portion of Task No. 2 has been completed when the 60th 0.1 inch depth interrupt occurs. The stack pointer SP, it will be recalled, returned to location S after the Depth Interrupt Handler program processed the 59th interrupt. Thus, at the time depicted by dashed line 500 in FIG 31B representing the 60th interrupt, the stack pointer SP shown as a solid line pointer in FIG. 31A is pointing to location S, and the queue pointerss QP5, QP4 and QP3 shown as solid lines in FIG. 31C are still indicating that their respective queues are empty. The condition of the queue level two is similar to that depicted in FIG. 30C except that pointer QP2 now points to Task No. 2 rather than Task No. 1 thereby indicating that Task No. 2 is presently being executed. As with the 59th interrupt, the 60th 0.1 inch depth interrupt causes the PS and PC registers (not filled with data from Task No. 2) to be loaded into stack locations S0 and S1. As discussed heretofore, whenever a 0.1 inch depth interrupt occurs at a half inch depth increment, a Half Inch Monitor task is placed in a queue at priority level 5. This is indicated in FIG. 31C. Just prior to placing this Half Inch Monitor task in queue priority level 5, the contents of registers R0 and R1 which may contain data from Task No. 2 will be placed in the stack at S2 and S3 as is shown in FIG. 31A. This is necessary since these general processor registers will be used by the CPU in running the Half Inch Monitor program. Thus, immediately after the 60th interrupt has occurred, the stack pointer will now be pointing to the location S3 as represented by the dash pointer designated SP'. Turning to FIG. 31C, it can be seen that the address of the Half Inch Monitor task has been placed in the queue at priority level 5, as a result of the 60th interrupt and that the QP5 pointer has moved to the next location (represented by dashed line QP5). When this happens, the queue priority 5 occupied-vacant flag will be set so that it indicates that queue priority 5 is occupied. This is represented by dashed connection 501 to core location 502 which is in actuality the same core location that the solid QP5 pointer is pointing to. Then, when the CPU is ready to execute the Half Inch Monitor program the Busy-Not Busy flag will be set to Busy as indicated at 503. The QP4, QP3, QP2 pointers will not be changed at this time. After the Depth Interrupt Handler program has placed the Half Inch Monitor program into the priority level five queue, the Queue Handler program will be called. The Queue Handler program will determine that there is a task in the priority five level (which is the highest priority level). Therefore, the CPU will start executing the Half Inch Monitor program which is the only task in the level five queue.

It will be recalled that snapshot FIG. 31C shows the Half Inch Monitor task in queue priority 5 awaiting execution. Now, in FIGS. 32A, 32B and 32C, the Half Inch Monitor task is underway and Task No. 2 at queue priority level 2 is still, of course, in interrupted status. The purpose of the Half Inch Monitor program is to queue data related programs at the correct depth intervals; therefore, in response to the 60th interrupt this Half Inch Monitor program queues three tasks. These three tasks include a Half Inch Action List task and a Six-Inch Acquisition task in queue priority level 4 and a Six-Inch Processing task in queue priority level 2 as is illustrated in FIGS. 32B and 32C. It should be recalled here that the Half Inch Action List task is queued every half inch or every five 0.1 inch depth interrupts while the Six-Inch Acquisition task and the Six-Inch Processing task are queued every six inches or every 60 0.1 inch depth interrupts.

In the present embodiment, whenever a queue priority level 5 job is being handled, only general registers PS, PC, R0 and R1 will be used by the CPU. Therefore, it is only necessary that these four registers be placed in the stack. Thus, the stack pointer of FIG. 32A is at the same core address as the dash stacck pointer SP' was in FIG. 31A.

Turning now to FIG. 32C, the solid pointer QP5 now points to a location containing the address of the Half Inch Monitor program and the priority level five status flag also indicates that queue priority level 5 is now occupied and busy. The status flags or indicators and the queue pointer for priority levels 2 and 3 remain the same. However, the occupied-vacant status flag of priority level 4 will have changed from vacant to occupied. FIG. 32C also illustrates by way of dashed pointer QP5 and status registers 504 and 505 what the condition of the queue will be after the Half Inch Monitor task is completed.

Figure 33A:
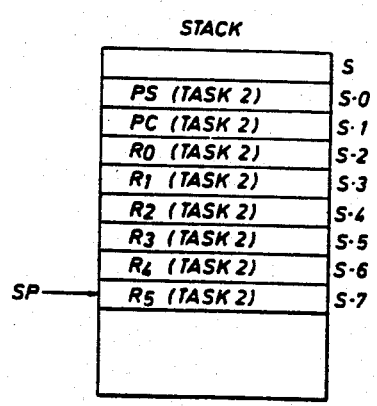
Figure 33B:
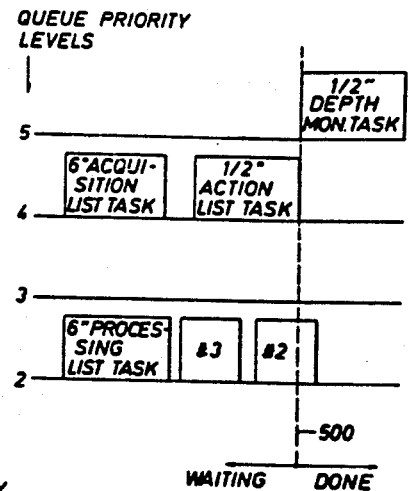
Figure 33C:
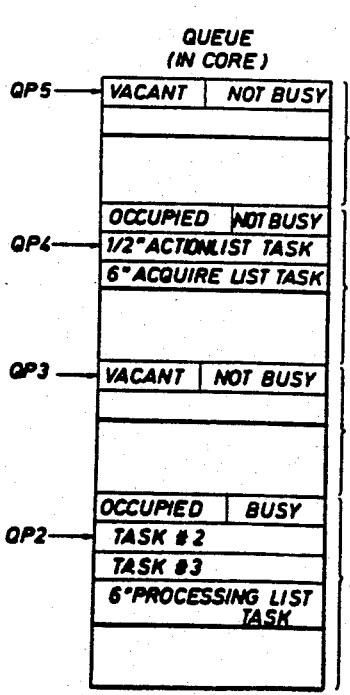

Now turning to FIGS. 33A, 33B and 33C, which are later snapshots, it is assumed that the Half Inch Monitor program in queue priority level 5 has been completed and that the Queue Handler program has determined that the Half Inch Action List program is the highest priority task waiting to be completed. Therefore, in FIGS. 33A, 33B and 33C, the Half Inch Action List program is just ready to start. It will be recalled from the last snapshot (32A) that the stack pointer was pointing at stack location S3 which contains the contents of register R1 from Task No. 2. As will be described in detail later, programs having a priority queue level lower than 5 may require use of all of the remaining general registers (R2-R5) which are placed in the stack at core locations S4-S7 by the queue handler program as will be discussed in detail hereinafter. Thus, at the time indicated by dashed line 500 in FIG. 33B, the stack pointer of FIG. 33A will be pointing at the location S7. This means that all of the volatile or general registers which Task No. 2 may have been using have now been saved. Now since the Half Inch Depth Monitor task is completed and the Half Inch Action List task is just about to start, queue level 5 will be vacant as represented by the pointer QP5 and the "vacant-Not Busy" flags. QP4 will be pointing at the Half Inch Action List task next to be executed, andd the occupied and Not busy flags for queue priority level 4 will be set.

While the Half Inch Action List program is being processed, the represented snapshots will be as shown in FIGS. 34A-34C. That is, the SP as shown in FIG. 34A will still be pointing at location S7, and the Half Inch Acquisition program as shown in FIG. 34B will be partially processed. As shown in FIG. 34C, QP5 will not be pointing to any waiting program and the status flags will indicate vacant and not busy. The queue pointer QP4 for queue level 4 will be pointing at the Half Inch Action List program since this program is being processed, and the status flags for queue level 4 will have changed from the Occupied-Not busy condition to the Occupied-Busy condition. Queue levels 3 and 2 will still be unchanged.

If it is now assumed that the Half Inch Action List program is completed, and that the Queue Handler program subsequently called the Six-Inch Acquisition program which is now just about completed, the represented snapshots would be as shown in FIGS. 35A-35C. The stack will initially be as shown by the dashed arrow in FIG. 35A, but after the Six-Inch Acquisition program is completed, the SP will be successively incremented from the S7 position represented by the solid arrow to the S position represented by the dashed line arrow SP' one core storage location at a time to restore the contents of these volatile registers to the numbers they contained when the interrupt occurred. This will take place since the data in these registers S0-S7 was data applicable to Task No. 2 which is a priority level 2 task. This task will, therefore, be completed before Task No. 3 and the Six-Inch Processing task are completed. In FIG. 35B, the Half Inch Action List program is indicated as complete and the Six-Inch Acquisition program is indicated as just about complete. In FIG. 35C it can be seen that the condition of queue levels 5, 3 and 2 is the same as in FIG. 34C; however, queue pointer QP4 has moved from the Half Inch Action List Program (which was completed) to the Six-Inch Acquisition program which is almost complete. After the Six-Inch Acquisition program is completed, the queue pointer QP4 will return to the initial position as shown by the dashed line pointer QP4, and the status flags will change from Occupied-Busy to Vacant-Not busy as shown at 506. When the Six-Inch Acquisition is completed, processing of Task No. 2 which was interrupted by the 0.1 inch depth interrupt will resume after the Queue Handler program has determined that all queue levels are empty except for queue level two. After Task No. 1 is complete, the other tasks (Task 3 and the Six-Inch Processing task) waiting in queue level 2 can be processed.

Figure 36A:
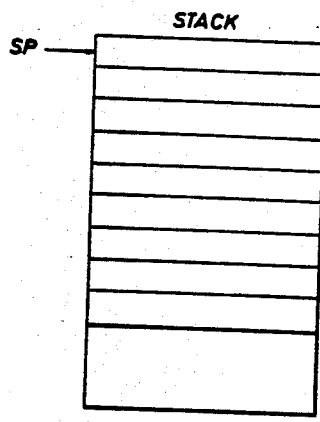
Figure 36B:
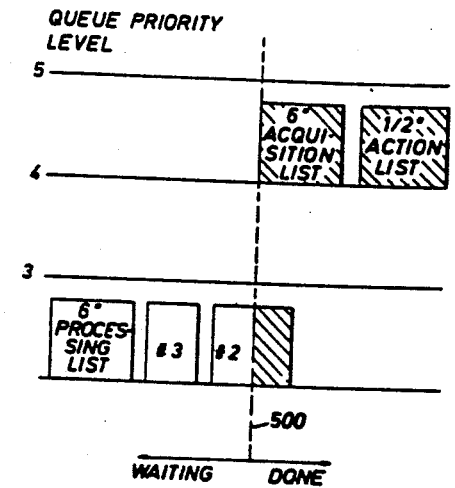
Figure 36C:
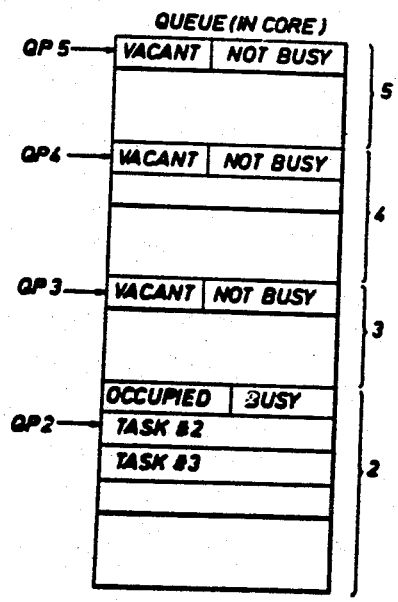

Assuming now that the processing of Task No. 2 has been resumed, it can be seen from snapshots shown in FIG. 36B and from FIG. 36C that there are no longer any jobs waiting in any of the queue levels except queue level 2. Furthermore, FIG. 36A shows that the contents stored in the stack have been returned to the appropriate volatile registers and that the stack is empty.

Therefore, task number 2 will eventually be completed and the queue handler program will be called. The queue handler program will then determine that the highest priority task awaiting execution is Task No. 3 in queue priority level two. After this task is complete, the queue handler will again be called and determined that queue priority level two is still the highest queue level awaiting action and will process the Six-Inch Processing task which, as will be explained later, processes all of the data acquired in response to this 60th 0.1 inch depth interrupt. After the Six-Inch Processing task is completed, the program units for another interrupt to queue new tasks.

In the previous discussion, only the 0.1 inch depth interrupt has been described. It should be pointed out at this time that many types of program interrupts may be used and their mode of operation will be similar to the described depth interrupts.

SYSTEM PROGRAMMING

Introduction

It will, of course, be appreciated that a suitable computer for the described truck mounted system must, by necessity, be a small compact unit with relatively limited core capacity. Consequently, because of the limited core capacity, a complete extensive well-logging program, as might be necessary to perform all of the necessary tasks simply cannot be stored at one time in core memory 62 of the computer of FIG. 1 much less all of the various programs necessary to run all of the possible logging services. Accorinigly, the programs used to control the system of the present invention for a particular logging service are divided into distinct phases which are respectively loaded at different times during a complete logging operation. Furthermore, even certain phases of the program may be too lengthy to be stored efficiently in ocre 62 of the computer at one time. In such instances, the computer will direct the magnetic tape transport system 68 to transfer into core memory 62 from the program tape only those portions of the phase necessary at any given time during the operation. To acccomplish this, the CPU (PDP-11 computer) also includes a hardwired "Bootstrap Loader" which takes the form of a read-only memory (hereinafter designated as ROM) which, when initiated, causes a so-called software "Absolute-Loader" program to be read from the program tape into the specified locations of core memory 62. The "Absolute-Loader" program then loads data, tables, and particular operation programs necessary to carry out the specific phase of the logging operation into specified locations of core memory 62. Further information concerning the operation of the "Bootstrap Loader" and the software "Absolute Loader" program will be included hereinafter.

Most of the software on the Program Tape is referred to as Systems Software. Systems Software is generalized software that may be used with any service. In other words, the System Software knows nothing that is unique to specific tools. There is another category of software referred to as Service-dependent Software. Service-dependent Software includes two basic types of software: (a) Tool Software, which includes all information that is unique to that tool; and (b) combination-dependent software, which is related to combinations and includes the informtion required for generating the CRT display presentation.

There is a minimal subset of the generalized System Software for handling the keyboard and printer devices and for supervising mag-tape operations. It also includes programs for interpreting keyboard input, scheduling tasks, and formatting the printer output (including number coversions). Most of the programs in the generalized System Software, including, of course, the minimal subset, are very general and depend on information stored in various tables in the computer memory for the exact details of their operation. More details on System Software organization will follow, however, it might be appropriate at this point to explain how tasks and operations are divided. As was mentioned earlier, the total amount of software required to adequately tend to all the activities discussed in the preceding sections is far more than can be held in the computer memory at any one time. This is true even for the software associated with just one particular service combination. Consequently, it is necessary to divide the activities into sets of manageable proportions. Each such set is referred to as a Phase of the total logging operations for a given tool combination.

The system Software is, theerefore, divided into four Phases. The first Phase for a service is the Setup Phase. This is the Phase in which the bookkeeping functions are carried out. The Well-Site-Data may be placed in memory, Recorder presentation selected and Data tapes be labelled at this point.

The second Phase is the Calibration Phase. In this Phase the computer automatically sequences through all the required steps for calibration of the tools and prints informative summaries on the teleprinter. The Setup phase and the Calibration Phase both interrogate the engineer for needed inputs and thereby allow the engineer to tailor the program for the specific well site and the equipment being used.

The third Phase is the actual Logging Phase, in which the tool is run in the hole and is involved in the acquisition, processing, recording and display of the logging data. In this phase the initiative for action lies almost solely with the operator or the external equipment, and differs from the Setup and Calibration Phase in which the computer was generally taking the initiative and instructing the engineer as to what action was to be performed. However, even in this phase, the computer may be set up to send messages to the engineer and to respond on its own to certain emergency type situations.

The final Phase is the Playback Phase in which the data tape is read back and a new recording may be produced. This phase is not always necessary, and the engineer may choose to delay the playback until he finishes running all of the services required for the trip to the well. The playback phase also offers convenience and safety features; that is, if the first recording is not correct or was set up wrong, the raw data is all stored on the data tape and, therefore, may be retrieved and correctly played back at a later date.

For each Phase there is a large set of System Software programs referred to as the Phase Control Program. The Phase Control Program not only contains the minimum subset of programs, but also contains generalized System Software for the Phase and specialized Tool Software for the Phase.

Thus, to provide a program for a given well logging service, the generalized system programs are combined with the Service-dependent programs. The advantages of this approach are for economy in the programming effort and flexibility of operation.

The minium subset of programs necessary to provide the control for orderly execution of the operation in the desired sequence include:

(1) The Absolute-Loader program which is read into core first from a magnetic tape in response to a firmware or ROM (read-only memory). This Absolute-Loader program provides the basic mechanism for transferring the other programs from the magnetic tape to core memory;

(2) The Initialization program which initializes all input-output devices, real time interrupts, and address vectors; and communicates with the engineer by means of the teletype printer 35 and keyboard input 40 to establish Well-Site-Data such as the data of the service being run, the identification of the well, etc;

(3) The Queue Handler program which schedules work to be performed by the computer. It manages, for example, the five level job queue, each of which has a distinct priority level. The queue handler insures that the computer is always working on the first job entered in the highest priority non-empty queue. The jobs in the queue are entered as a result of real time events, operator requests, and requests by other programs;

(4) The Overspeed Detector program, which monitors the system and alerts the engineer that data is accumulating too fast and the the logging speed should be slowed down. If data continues to accumulate, the computer may not be able to handle it and the output might become meaningless. As an example, the Overspeed Detector program may be set to monitor the amount of time the queue handler is not used. That is, it monitors the time that there are no jobs in the queue. When this time gets to be too short, the engineer is alerted that the computer is becoming overburdened and that the logging speed should be slowed;

(5) The Magnet Tape Driver program, for controlling the magnetic tape transports 68 and 69 to effect transfers of data in and out of the core memory buffers;

(6) The Presentation Device Driver program performs the necessary communications to transmit formatted data to the visual presentation device 63;

(7) The interrupt servicing programs which, as discussed above, operate in "real time" in response to asynchronous events. A most important interrupt servicing program for this invention is the Depth Interrupt Handler program which monitors 0.1 inch interrupts from the depth system. This program schedules the Acquisition and Data Processing programs to be discussed hereinafter; and (8) The Modem Driver program which provides the necessary instructions for providing the data in the necessary format for transmission by the modem device 70.

(9) Still other programs include programs which perform actions as requested by the engineer. One such program is the Modify program which may be called on to display the contents of a designated table in core by means of the teleprinter 71 and then accept a modification of the table from the engineer by means of the keyboard 81.

In addition to the minimum subset of programs mentioned above, there are also, of course, other generalized programs different ones of which are used only during specific phases of a logging operation. These include, for example, such programs as:

(1) System Test program, which tests the complete system to ascertain that it is properly set up and in working order for the logging operation. If the system is not properly set up or is malfunctioning, this program will cause the teleprinter to print out the necessary remedial action;

(2) Calibrate program, which calibrates the system and informs the engineer as to the necessary calibration constants;

(3) Six-Inch Acquisition program, which acquires data values from the appropriate locations. The Acquisition program is scheduled by means of the queue handler in response to a preselected number of depth interrupts having accumulated; and (4) In addition, there are the Service-dependent programs which vary according to the particular logging operation to be run. These programs would include, for example, the various Data Processing programs and the Half-Inch Action List.

Other programs included in the system which are readily understood by those skilled in the art and need not be discussed include: the floating point package, math routines, conversion routines, deconvolution, skin effect corrections and formula interpretations.

In addition to the generalized System Software which is common to all types of logging activities and the specialized Service-dependent software, it is of importance to understand how these individual programs are actually physically loaded into core memory from the program tape. As was mentioned briefly heretofore, a software Absolute-Loader program loads the necessary system software into the appropriate core location. The technique for accomplishing this will now be described.

Program Loading

The Absolute-Loader program knows the structure of the Program Tape. Therefore, it can load any program into the proper core location from the tape either under program control or on command by the operator. Although the Absolute-Loader program is read into core prior to any of the phases or Service-dependent programs, it normally will not be in the computer memory while the Service-dependent programs have control of the computer. This is because the Absolute-Loader is loaded by the ROM-Bootstrap-Loader into the lowest addresses (section 494, illustrated in FIG. 29) of the computer memory. Thus, the interrupt vectors, stack and buffers will ultimately overlay the Loader program when the Service-dependent programs take over.

Since the Absolute-Loader program had the responsibility for loading all of the rest of software, the question might arise as to how does the Absolute-Loader program itself initially get loaded. As mentioned heretofore, there is a very short and very specialized program stored in a ROM-Bootstrap-Loader. The Bootstrap-Loader is only capable of reading the Absolute-Loader from the Program Tape into the lower part of the computer memory. In order to load the Absolute-Loader program, it is only necessary to mount a Program Tape and execute the ROM-Bootstrap-Loader program. The Bootstrap-Loader will always be available for execution since the read-only memory (ROM) cannot be erased. From the operator's standpoint, causing execution of the Bootstrap program only involves operation of a few switches on the computer console to direct the CPU to the Bootstrap program. It should be made clear at this point, however, that normally switching in the ROM-Bootstrap-Loader is not the only way the Absolute-Loader program may be loaded. For example, as will become clear later, it may be desired to reload the Absolute-Loader program after completing one phase of the logging operations so that the next pulse can be properly stored in core memory. Therefore, one of the last instructions of the completed phase would be to direct the computer to locate the Absolute-Loader program's position on the Program Tape, such that the Absolute-Loader may be read into the lower addresses of core by the Bootstrap Loader which will be program initiated. Such loading would, of course, overlay any interrupt vectors, stack or buffer left from the completed phase.

The Absolute-Loader program can tell whether it was loaded under program control or by operator-initiated execution of the ROM Bootstrap program. The latter situation is referred to as a manual start. The distinction is important because certain assumptions may be made about the validity of information in the computer memory when the Absolute-Loader was brought in under program control. In the case of a manual start, extra precautions are required to prevent possible use of incorrect information in the computer memory.

Since the arrangement of programs on the Program Tape to be loaded has an effect on the functional performance of the system, it might be appropriate at this point to discuss the program tape arrangement.

Program Tape

Figures 37A, 37B:
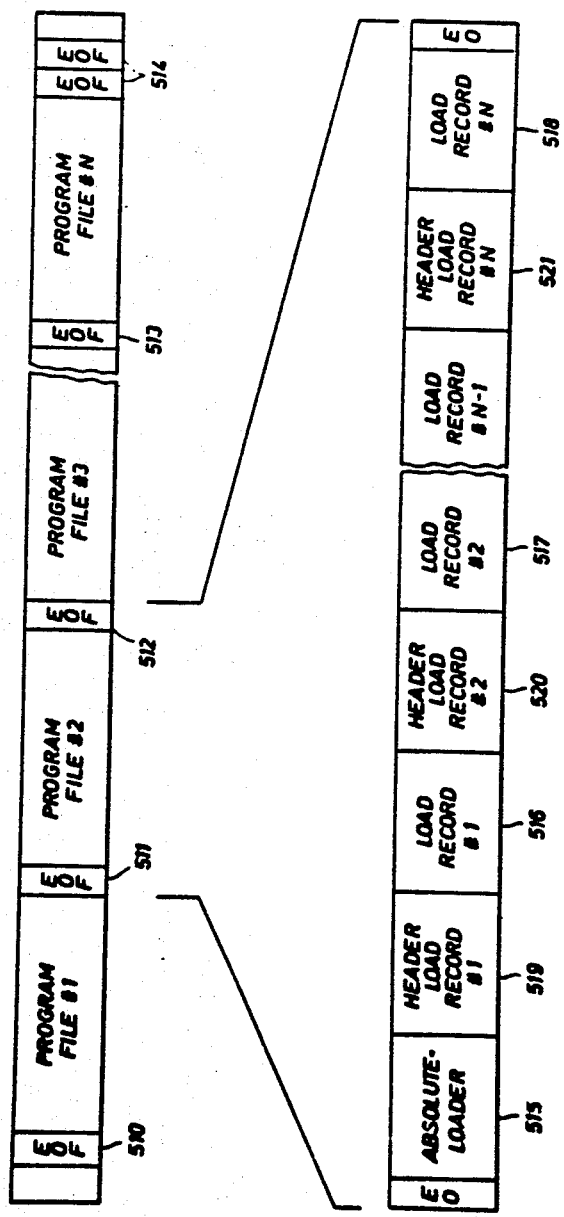
FIGS. 37A and 37B shows a diagrammatical layout of the programs contained on a typical program tape used with the system of FIG. 1.

The Program Tape is divided into a collection of Program Files. FIGS. 37A and 37B illustrate the arrangement of the Program Tape. As shown in FIG. 37A, Program Files are separated on the Program Tape by magnetic file marks or EOF's 510 through 513 written on the tape and detectable by the mag-tape controller hardware. There are no EOF's within a Program File. The last Program File on the tape is followed by two consecutive EOF marks 514. Each Program File is independent and self-contained. It contains all of the software required for some specific purpose. In most cases a Program File will correspond to a particular tool service combination. Thus, typically, the Program File must contain all the Tables associated with the tools in that combination and the program for all phases of the logging operations with that combination.

Referring now to FIG. 37B, it can be seen that the first record in each Program File is a copy of the Absolute-Loader program as shown at 515. This record is the same in every Program File. Thus, the ROM-Bootstrap-Loader assumes that the first record following an EOF on the Program Tape is a copy of the Absolute-Loader. Thereafter, for a particular Service-Combination Program File, the file contains a load record for each Phase and for the Tables such as illustrated at 516, 517 and 518. Each such load record is preceded by a short header record 519, 520 and 521 which contains control information for the Absolute-Loader. This control information includes identifiction for the particular load record plan plus the high and low limits for the memory area into which the load record is to be read.

The Absolute-Loader is capable of locating any file on the Program Tape, and within each file the Absolute-Loader can find and load any load record. Once the Program Tape has been positioned to a particular program file, all movement of the Program Tape will be within that file until software for a different Service-Combination is required. Before control of the computer is given to a loaded program, the Absolute-Loader repositions the Program Tape so that the first record that can be read in the EOF preceding the Program File. Thus, whenever the ROM-Bootstrap is called, the Absolute-Loader will be read into memory from the current Program File. As will become clear hereinafter, the Absolute-Loader must reposition the tape before giving up control to a loaded program because the area of memory that it occupies will be written over by portions of the phase of the logging service being run.

Flight Plan

Figure 38C:
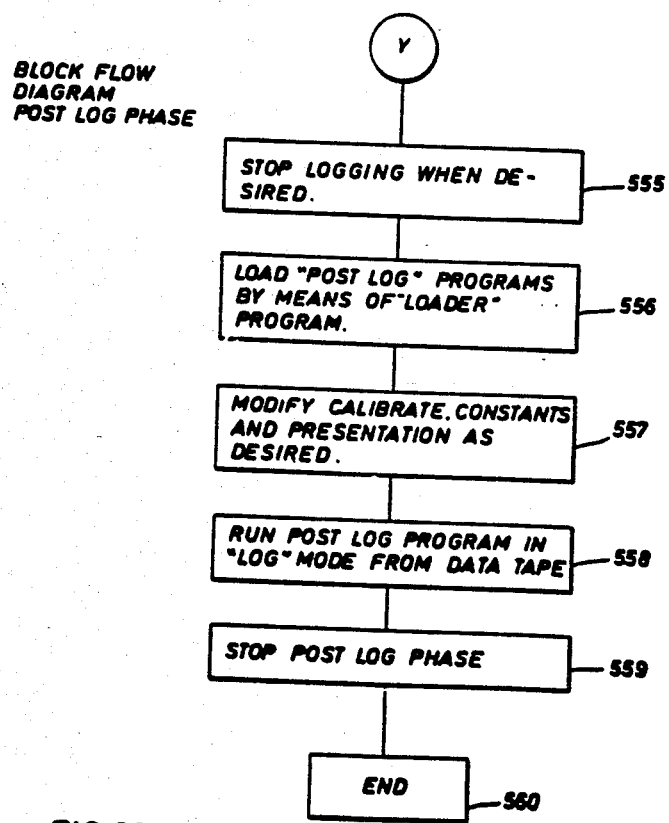

For purposes of better explaining the complex interactions between the many programs, the logging engineer and the hardware, a typical well logging operation such as is illustrated by FIGS. 38A–38C is set out in the following paragraphs. In the following description of the software, references will be made to this "flight plan" and the heretofore-discussed hardware to aid in discussion of the software.

As discussed above, the system software is divided into four distinct portions or phases: "Setup", "Calibration", "Logging" and "Playback".

Starting now with the Setup phase, upon arrival at the Well Site, the engineer will set up the system as shown at block 520 in FIG. 38A. He will then place the system in an "on" condition as shown in block 521. That is, power will be turned on to allow the system to warm up. The program tape is placed on transport 68 for reading the necessary programs into the computer. In addition, a second storing medium such as a second tape mounted on transport 69, is also made available for receiving the data for later storage purposes. In the block diagram of FIG. 38A, these actions are shown in block 522. In any program, it is necessary to have a starting point; and it is also necessary for the medium (the program tape) containing the program to be read into the proper location. Therefore, the engineer will set an initial address on a panel of the computer panel such that the processor will be directed to a particular location for its first instruction.

In the apparatus of the described embodiment, this particular address is set by means of toggle switches and is the address of the ROM-Bootstrap-Loader which contains the basic loading instructions. Referring now to FIG. 39, once the Bootstrap-Loader address has been set by toggle switches, the system may be manually started as is indicated at start point 523. The first instruction of the Bootstrap-Loader is to start the tape transport as shown in block 524 and read the Absolute-Loader program into a specific area of the computer memory as shown in block 525. Therefore, after the Bootstrap-Loader directs the Absolute-Loader program to be read into memory, the Bootstrap-Loader turns over control of the processor to the Absolute-Loader program as is shown in block 526. It shoud be noted that many other instructions could be executed by the Bootstrap-Loader prior to relinquishing control is desired. Turning over control of the processor to the Absolute-Loader program is accomplished by simply addressing the Absolute-Loader entry point 527. As shown in block 528, the first processor action taken after the Absolute-Loader program has been entered is that the program will notify the engineer by means of the teleprinter output 71 that the Absolute-Loader program has been loaded into memory 62 by way of the Bootstrap-Loader. The Absolute-Loader program then waits for further instruction from the engineer by means of the keyboard input 81 as is shown in block 529.

The engineer will then type in a command to load the necessary tables and programs for a specific phase. For example, the engineer may type in a command such as "Load Systest" for testing the system. Then, as shown in block 530, the Absolute-Loader program will read the magnetic tape on transport 68 until it finds the Systest program. At that point, the Systest program will be read into specified core locations; and, when completely loaded, the program tape will be returned to the EOF preceding the "Absolute-Loader" program and control of the computer will be passed to the loaded Systest program as shown in block 531. Upon recieving control from the Absolute-Loader program, the newly-loaded Systest program will identify itself to the engineer by means of the teleprinter 71 and will await further instructions from the engineer. These steps are shown in block 532 of FIG. 38A. Then, as shown in block 533, the engineer will then run the tests as directed by the Systest program on the surface equipment and the logging tool as necessary to assure proper operation of the tool during the logging operation. After the computer has verified correct operation of all equipment to be used, the program will then cause a printout on the teleprinter 71 to the effect that all systems have been checked out and are ready for operation. At this point, the system will await further instruction from the engineer.

As was mentioned above, due to the necessity of using a small core computer, it is sometimes necessary that the core memory be limited to storing only phases of the operation currently being run. Because of this, many programs once written into core will be either erased or overlaid by additional and later use of those portions of the core where they reside. Therefore, if such overlaid programs are to be used later, they must be returned to core. For example, in the situation just described, the Systest program may have resulted in the portion of core where the Absolute-Loader program was previously stored being written over. Thus, when the Systest program is completed, it is necessary to load another program for further operation, but there are no instructions contained in core for loading such a program. To accomplish loading of a second phase of program after the engineer is instructed that the Systest program is complete, he will, for example, type a command on the keyboard input 81 or possibly throw a console switch for directing control of the computer back to the Bootstrap-Loader. The Bootstrap-Loader will again cause the Absolute-Loader program to be loaded into core.

Once the Absolute-Loader program is reloaded into core, the program once again identifies itself showing that it has been loaded and awaits further instructions. The engineer will then type in another command. He could, of course, type in "Systest" again if for some reason the system was to be retested. Instead, he will, for instance, ordinarily type in "Calibrate", the coded name for the Calibration phase which contains all programs necessary to calibrate a specific combination of tools for a given well logging service. This program will be overlaid on top of the Systest program, but will not necessarily be overlaid on top of the tables. Once the Calibrate program has been entered into core memory, the program will identify itself and wait for further instructions. These steps are shown in block 534 of FIG. 38A. Once the engineer commands the program to continue as shown in block 535, the Calibrate program will process the necessary instructions to complete all types of calibrations such as input stretch coefficients for the cable, tool offset, etc. Upon completion of the Calibration program, the engineer could cause the Systest or some other prelog program to be loaded, if desired, by means of the Bootstrap-Loader and Absolute-Loader programs as shown at 536. Upon completing the loading of such a program, the program will be run as shown in block 537. Upon completing this program, the engineer may then load the logging phase programs as shown in block 538 of FIG. 38B. It should again be remembered, that this newly-called program may be written or recorded into core over an existing program; and that the loading technique is not direct, but must be through the Bootstrap-Loader which reads in and re-executes the Absolute-Loader program which, in turn, will cause the specific Logging phase programs to be loaded.

Once the logging programs have been loaded into core, the program will cause the teleprinter 71 to acknowledge that the program is loaded and to instruct the engineer that he may go into the wellbore. The logging program then awaits further instructions from the engineer. As shown in block 539, the logging tool 50 of FIG. 1 is then lowered into the wellbore. As the tool 50 proceeds down the wellbore 52, the engineer may wish to obtain some preliminary logging information on the conditions of the wellbore as the tool is being lowered. If so, the engineer will type in an appropriate command.

There are three modes of the Logging phase programs; namely, "Display", "View" and "Log". These modes are similar, except that the Display mode is time driven and the other two modes are depth driven. In addition, only the Log mode stores data on magnetic tape. The Display mode and View mode merely output the logging information on the Visual presentation of display device 63.

Assuming that the engineer has typed in the command "Display Down", he monitors the display device 63 to note any unusual conditions of the wellbore 52. Block 540 shows this activity. Upon information obtained as a result of the Display mode, the engineer may determine that certain calibration parameters or gain changes might be desirable. If a calibration parameter is to be changed, the engineer will again type in the command "Calibrate". This calibration may actually be done while the tool 50 is still moving down the wellbore 52. Upon receiving the "Calibrate" command, the Calibrate phase programs will be returned to core as shown in 541. The engineer will then by appropriate command cause the teleprinter 71 to list pertinent calibration parameters particular to the tool 50. At this point, as shown in block 542 of FIG. 38B, the engineer may change those parameters he desires. It should be appreciated at this point, that upon typing the command "Calibrate", the Calibrate program was reloaded into the core memory and was likely stored or written over at least part of the Logging phase program. Therefore, upon completion of the calibration, it is necessary that the Logging phase program again be loaded. Consequently, the Bootstrap-Loader again loads the Absolute-Loader program which in turn reloads the Logging phase programs. Upon reloading of the Logging programs, as seen in block 543, the program announces that it is completely loaded and awaits further instructions from the engineer.

As the tool 50 continues to descend into the wellbore 52, the engineer may decide to use the View mode as shown at 544 rather than to monitor with the Display mode. It should also be remembered that the View mode is similar to Display mode, except that it is depth driven rather than time driven. That is, the data is acquired as a result of a specific wellbore distance being traversed rath than a specific time interval having elapsed. At this point, upon viewing the data being displayed on the presentation device 63, the engineer may decide to modify or change certain gain parameters. This he may do by typing in an appropriate command, such as "Modify", as is shown at 545. Now assuming that the Modify program is part of the Logging phase program it will be stored in core concurrently with the other programs in the Logging phase. Therefore, it will be possible to change the gain parameter without further loading activity.

Once the tool 50 has reached the bottom of the wellbore 52, the engineer is now ready to start the primary logging operation. Therefore, the engineer will stop logging in the View mode as shown in block 546. The engineer will then type in the command "Log", and start raising the tool in the wellbore 52 as shown in blocks 547 and 548. Upon entrance of this command, all tables in the core memory containing calibration data, instructions, etc. will be dumped onto the data tape mounted on tape transport 69 for later recovery in case they are needed. It should also be pointed out that as the tool 50 continues up the wellbore 52, all of the data acquired will not only be displayed on the presentation device 63 as occurred when logging was carried out in the View mode or Display mode, but will also be permanently stored on the data tape mounted on tape transport 69.

It is typical to log the lower portion of the first 300 or 400 feet of a wellbore at least twice. Therefore, assuming a normal operation, upon having logged up the wellbore 52 for about 300 feet, the engineer will, as shown in block 549, type in the command "stop". The engineer will then lower the well logging tool 50 back to the bottom of the wellbore as shown in block 550. The engineer at this point may have also noted that a difference existed between his numerical depth readout and the printed data on the monitor screen of the presentation device 63 which data is, of course, also being stored on the data tape. At this point, the engineer will make necessary stretch corrections as shown in block 551. These stretch corrections will be fed into the computer so that the depth display on the presentation device 63 will be corrected. Once the tool 50 is relowered to the bottom of the wellbore 52, the engineer once again types the command "Log" and starts raising the tool in the wellbore and running the Logging programs as shown in blocks 552 and 553. Data again accumulates on the data tape as the tool 50 progresses up the wellbore 52.

During the logging operation, the engineer again may wish to modify certain parameters. For example, the engineer may have determined that he would like to get an expanded view of some measurement. Therefore, he can get such a view by changing his presentation seals. To do this, the engineer will type a phrase such as "Modify Presentation" on the keyboard 81 and then follow this expression by the particular scale to be modified. This action is shown in block 554. It should be recalled that the Modify command does not erase the logging program. That is, the Modify program is maintained in core coincidence with the other logging programs. Therefore, as an example, the Logging operation may be "stopped" as the scales are changed or modified as desired.

Once the tool 50 is out of the wellbore 52, the engineer will then type in the "STOP" command as shown in block 555. If no playback is desired (that is, if it is not desirable to go to the next mode of operation) the engineer may type in "END" This terminates the logging operation. However, if playback is desired, the engineer will then direct control of the computer back to the Bootstrap-Loader. Then as shown in FIG. 38C, block 556, the Bootstrap-Loader will load the Absolute-Loader program which then loads the Playback phase programs over the Logging phase programs. FIG. 38C illustrates the Post-Log phase of the logging operation. The playback programs will, of course, proceed in the same manner as the logging program since they operate on the data received uring the logging operation. Therefore, the only changes will be in any presentation format changes desired by the engineer. Blocks 557, 558 and 559 in FIG. 38C show this action. The engineer will then type in the commands "END" as shown at 560.

Control Programs

Introduction:

Now that the system software has been generally discussed and a typical logging run has been covered, further specific details of certain ones of the real-time programs necessary to accomplish this will be discussed. As was mentioned earlier, the present invention comprises a well logging system which is controlled by a real-time or on-line computer. The programs for controlling a system such as this are subject to the asynchronous occurrence of events during logging. Therefore, it is impossible to program the computer to operate according to a specific and predetermined set of events. Instead, the system operates in response to real-time interrupts as previously discussed as well as in response to programs which run in a normal flow. It should again be pointed out at this time, however, that the real-time interrupts may have the capability of interrupting substantially all of the programs normally being run. Therefore, it is necessary to have some means of determining the priorities of tasks to be run; that is, which task should be run at which time. To accomplish this, the present invention includes so-called queuing software that evaluates the tasks waiting to be performed and determines which is the highest priority task to be performed first and a descending order of priority for the remaining tasks which are to be performed.

Depth Interrupt Handler:

Referring now to FIG. 40, there is shown an illustrative block flow diagram describing in further detail the 0.1 Depth Interrupt servicing program which is a specific type of interrupt unique to this invention. There will be, of course, programs in the system for handling any of the other interrupts that may occur from internal or external sources which may affect the operation of the program. The types of interrupt presently used in this system were listed in the previous discussion concerning the GSI hardware involved with this invention. However, to better understand the invention, the 0.1 interrupt service program is considered in more detail. It should, however, be recognized that the service program for the other possible interrupts will be similar, but less complex.

Therefore, recalling the previous discussion of hardware interrupts and the software queuing system illustrated in FIGS. 30A, 30B and 30C through 36A, 36B and 36C, it will be assumed that the computer is processing a list of instructions or a task from queue level two as shown in FIG. 30B. As shown in FIG. 30C, the snapshot of the queues shows no tasks in queues three, four or five. Queue two shows three tasks with one of the tasks being processed as is indicated by the queue two pointer pointing at task one in queue two and the "busy" flag being set. In the middle of the processing of task one, a 0.1 inch interrupt is received by the system. To be effective, therefore, control of the computer must be transferred from task no. 1 having a queue level priority two which is presently being run and then directed toward a new listing instruction or task for processing the received 0.1 inch interrupt.

To accomplish this with the computer in the preferred embodiment of the present invention, control of the computer when an interrupt occurs is determined by priority arbitration logic which is part of the computer processor. It should be recognized at this point, however, that other computers may have different hardware means of servicing real-time interrupts. The system described for the PDP-11 is illustrative only; and further information concerning the operation of the PDP-11 may be found in the *PDP-11 Handbook* and the *PDP-11 Peripheral and Interfacing Handbook* previously mentioned.

Regardless of the scheme used for the real-time interrupt process, it is necessary that the task presently being run be put into a "hold" condition so that the processing already accomplished on that program will not be lost and the computer processor can be directed toward the new set of instructions or task to be processed. In the computer of the present embodiment, this is accomplished by means of a vector address. That is, as was explained earlier with regard to the hardware, the real-time interrupt itself contains the necessary instructions to interrupt the computer as well as including the vector address of the first executable instruction of the new task. The result of this is that the task in progress is interrupted and the processor branches to a specific address in core which contains the starting address of the 0.1 depth interrupt servicing program.

In the present example, the 0.1 depth interrupt directs the computer processor to a servicing program called the Depth Interrupt Handler, the flow diagram of which is shown in FIG. 40. Referring again to FIG. 30A, the processor must, of course, store or push onto the stack the contents of register PS which contains the processor priority status and register PC which is the program counter representing the address of the next instruction of the program that is being run at the time that the depth interrupt occurs. That is done so that the program may be restarted at a later time. Therefore, referring now to FIG. 40, upon receiving a 0.1 inch depth interrupt at starting point 570, the computer is directed to the first step of the Depth Interrupt Handler program which as shown at 571 disallows further interrupts. The next step which is as shown in block 572 is to save the present contents of the registers PC and PS (information concerning the interrupted task) so that these registers can be loaded with the new information contained in the address vector and concerning the Depth Interrupt Handler task. The next action, as shown in block 573, is to decrement a five counter by one. After the counter has been decremented, a decision element 574 is encountered which asks the question, "Is the five-counter equal to zero?" If the answer is "no", interrupts are again allowed (block 575) and the stored contents of the PC and PS register are reloaded into PC and PS (block 576) so that the computer may be returned directly to the task which was being run when the interrupt occurred (block 577). This branch would be followed, for example, if the interrupt were the 1st–4th, 6th–9th, . . . or 56th–59th interrupt.

On the other hand, if the answer to the question asked element 574 is "yes" (as would be the situation when the 5th, 10th . . . or 60th interrupts occur), the program will reset the five counter to five (as shown in block 578) and then (as shown in block 579) the contents of processor registers R0 and R1 will be stored on the stack along with the contents of register PS and PC already stored. Thus, as is shown in FIG. 31A, the stack pointer will be incremented to location R1.

Then, as shown in block 580 of FIG. 40, the Depth Interrupt Handler program will place the Half Inch Monitor program in the priority five queue. A snapshot of queue five as it will be when loaded with the Half Inch Monitor program is shown in FIG. 31C. After placing the Half Inch Monitor task in queue five the Depth Interrupt Handler program is directed to the Queue Handler program as is shown in block 581. However, prior to moving to the Queue Handler program, the Depth Interrupt Handler will set up the Occupied-Vacant flag of queue five to indicate that a program has been entered into queue level five as is shown in instruction 582 and 583. Briefly, the purpose of the Queue Handler program is to insure that the task currently being executed by the CPU, except when interrupted, is the oldest task in the highest occupied queue. Therefore, when the Queue Handler program is called, the program will cause tasks in all levels of the queue to be completed which have a higher priority than the queued task or any task having the same priority as the queued task that was waiting in the queue when the interrupt occurred. Therefore, since the interrupted task was at queue level two and the newly-queued task is at queue level five, the queue handler will call the Half Inch Monitor task which is shown in block 580 of FIG. 40.

Figure 41A:
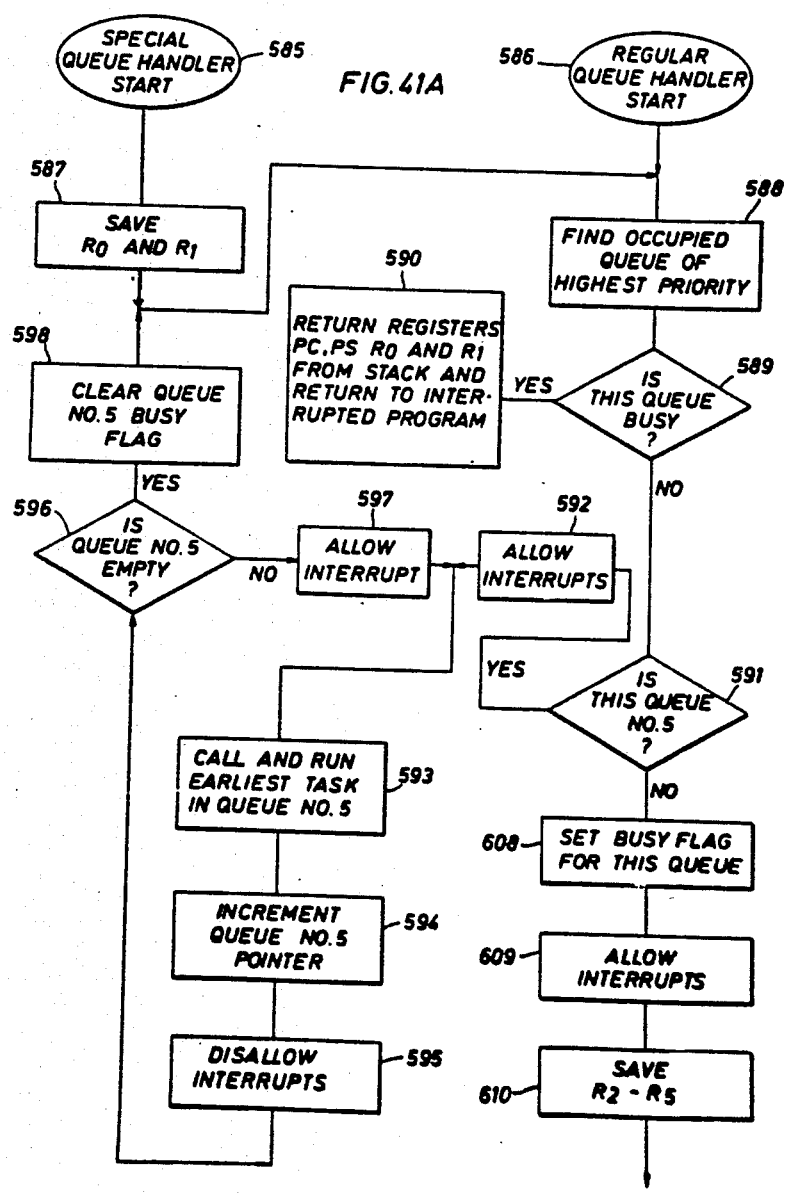

Queue Handler:

Referring now to FIG. 41A, there is shown a flow diagram of the Queue Handler program which assures that the task currently being executed by the CPU (except when in interrupted status) is the oldest task in the highest occupied queue. The complete queuing process comprises two portions. First, a task is placed in a particular queue level and the queue in which the task is placed is marked as being occupied by an occupied flag or indicator. Second, the computer is directed to the Queue Handler program. It should be noted that there are two entry points to the Queue Handler program. The special queue handler entry at 585 is used only when a task is queued by another task already running in one of the queues and the priority of the newly-queued task exceeds that of the task that queued it. The regular queue handler entry at 586 is used by any interrupt servicing program such as the Depth Interrupt Handler. The only difference in these two entries is that the contents of registers R0 and R1 are saved (see block 587) by the special entry branch 585 to simulate the same conditions that occur with an interrupt.

Proceeding with the regular queue handler entry 586, or after saving registers R0 and R1 at instruction 587 for a special entry, the first action by the program is to direct the computer to find the occupied queue of the highest priority as shown in block 588. The program then checks by means of logic block 589 to see if the queue having the highest priority is busy. If the answer is "yes", the computer reloads register PC, PS, R0 and R1 from the appropriate stack locations, so that the registers are returned to the same condition they were in prior to the Queue Handler program being called. Therefore, the computer returns directly to processing the task being run when the Queue Handler program was called as is shown in block 590. If, however, the answer is "no", the program is directed to a second logic element, shown in block 591; and the question is asked, "Is the highest occupied queue number five?" If the answer is "yes", the queue is directed to run all of the tasks in the priority level five queue. This is accomplished in the following manner.

In the previous example, the Half Inch Monitor program was placed in queue five. Therefore, queue five has that task, queues four and three are empty and queue two has task two and three. Also recall that task two was in progress when the interrupt occurred.

FIGS. 30A, 30B and 30C illustrate this situation. Therefore, the answer to the question at block 591 of FIG. 41A is "yes". After allowing interrupts (block 592), the task then directs by means of blocks 593 and 598 that the computer run all of the tasks in queue five. In the present situation, there is only one task in queue five and therefore the flow path is direct through blocks 593, 594 and 595. Then when the question is asked at block 596, "Is queue five empty?", the program fllow is on to block 598.

It is possible, of course, that due to additional events, two tasks or more that had not been started could have existed in queue five. If this had been the situation, these tasks would have been completed one at a time and the queue pointer would have advanced one location for each task. The block 595 is provided to disallow interrupts to avoid the possibility of task scheduling problems. In the case of two tasks in queue five, the computer would make two trips around the path 593–596. Therefore, block 592 will result in interrupts being allowed while tasks in queue five are being run. When the answer to the question asked in block 596 is "yes", the task then proceeds to clear the busy flag for queue five as shown in block 598. The flow is then again through block 588, where the computer is again directed to find the occupied queue having the highest priority.

Figure 42:
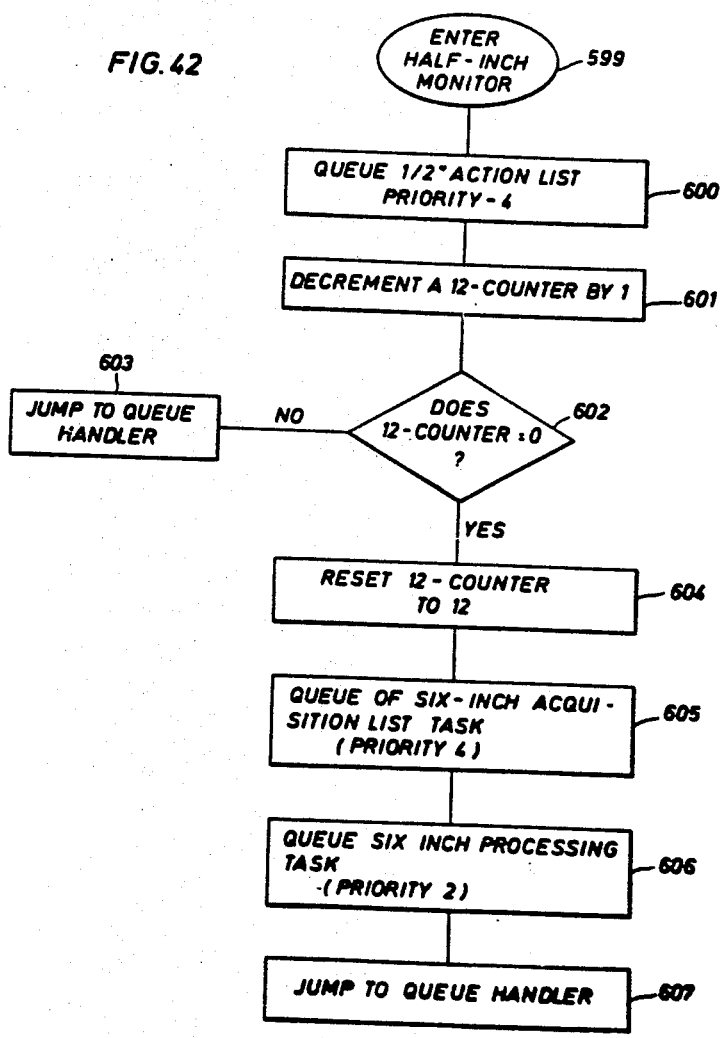
FIG. 42 is a flow diagram of a typical program used by the system of this invention for scheduling other programs used by this system.

Recall now that the Half Inch Monitor task was run as a result of the block 593 of FIG. 41A. FIG. 42 illustrates the flow of the Half Inch Monitor program. The first step of the Half Inch Monitor program after being entered at 599 is to queue the Half Inch Action List task at priority four, as shown in block 600. The technique of queuing this task is the same as it was for the Half Inch Monitor task; the only difference being that this task is queued at queue level four rather than five. The next action after queuing the Half Inch Action List task is to decrement a twelve counter by one, as shown in block 601. This action is followed by a decision element which determines (as shown in block 602) if the twelve counter equals zero. If the answer is "no", the computer is directed again to the Queue Handler as shown by instruction 603 so that the programs or tasks in the different queues may be run in their proper priority. Assuming that the interrupt being serviced at this time is the 60th, the twelve counter will have been progressively decremented to "0" (i.e., $60 \div 5 = 12$). Therefore, the answer will be "yes". If the answer is "yes", the twelve counter is reset to twelve (as shown in block 604) and the program progresses to another element 605 which queues a Six Inch Acquisition task at priority four. This action is then followed as shown in block 606 by queuing a Six Inch Processing task at priority two. Then, as shown in block 607, the computer moves again to the Queue Handler so that all tasks in the queue may be run in their proper priority.

Queuing the Six Inch Acquisition task and the Six Inch Processing task is the same as previously discussed except for the level of the queue in which they are entered. FIGS. 33B and 33C illustrate the status of the queue handler at this point. That is, queue five is now empty since that task is complete; queue four has two tasks neither of which have been started; queue three is empty; and queue two has three tasks. The task labelled two is partially complete, and task three and the Six Inch Processing task have not yet been started. Therefore, block 607 of FIG. 42 directs the computer back to the regular entry point 586 of the Queue Handler shown in FIG. 41A. The computer is then again directed by block 588 to again find the occupied queue of the highest priority. As a result, recalling that queue five is now empty and that the Half Inch Action List and the Six Inch Acquisition task are at priority four, the occupied queue of the highest priority is queue four. Refer again to FIGS. 33B and 33C. The answer to the question asked in block 591, therefore, is "no". The computer is then directed by block 608 to set a busy flag for the occupied queue of the highest priority which, in this example, is queue four. This would be true, of course, whether the queue was four, three or two. As shown in block 609, interrupts are allowed so that even the queue handler may be interrupted from this point on. The computer is then directed by block 610 to save the contents of registers R2 through R5. Therefore, the stack situation is as illustrated in FIG. 33A. The Queue Handler program then as shown at instruction 611 of FIG. 41B calls and runs the task pointed to by the output pointer of the highest occupied queue which, in the present example, is the Half Inch Action List task.

After the Half Inch Action List is complete, the queue advances the output pointer to the next task in queue four and the computer returns to the Queue Handler at instruction 612. The next element of the task, as is shown in block 612, is to again disallow interrupts. The question is then asked by block 613, "Is this queue empty?" If the answer is "no", interrupts are again allowed, as shown in block 614; and the task in the queue pointed to by the output pointer is then called and run as before. In the present example, the job will be the Six Inch Acquisition List task. The queue pointer is then advanced to the next task in the queue if and when one is present and the computer eventually returns again to the Queue Handler at instruction 612. The question is then again asked by block 613, "Is the queue empty?" Assuming the queue has now been emptied, the answer is "yes". At this point, the computer directs, as shown in block 614, that the busy flag of that queue be cleared. The computer is then directed, as is shown in block 615, to determine whether all queues are empty. The answer in the present example is "no". Therefore, the computer is directed by element 616 to find the occupied queue having the highest priority. In the present example, this would be queue two. The program then directs the computer to determine, as shown in block 617, whether or not this newly-found queue having the highest priority is busy. If the answer is "yes", registers PC, PS, R0, R1, R2, R3, R4 and R5 are returned to their original configuration as is shown in block 618. FIGS. 36A, 36B and 36C show a snapshot of the stack and queue at this time.

The computer then returns directly to the task being run when the interrupt occurred, as shown in block 619. In the present example, this was task number two. The remainder of the tasks in queue number two; namely, task number three and the Six-Inch Processing task are then processed in order. If the answer to instruction 617 had instead been "no", a busy flag would be set for this new queue and the program is directed to again allow interrupts. These two actions are shown in block 620 and 614. The program would then call the task pointed to by the pointer for the occupied queue. As shown in the flow diagram, the program would have now returned to block 611. This process would obviously continue until all the queues are empty and the queue handler returns to the program which was being handled when the program was interrupted by the real-time interrupt. It should be recognised that in addition to the 0.1 inch interrupts, there are several other types of interrupts from the external peripheral equipment. It should also be noted that in addition to tasks being placed in the queing routine as a result of interrupts, tasks may also be placed in the queuing routine when directed to do so by still other programs.

Therefore, from the above discussion it can be seen that the system of the present invention is able to orderly schedule the processing of many and various different programs or tasks in accordance with the priority of the task. The programs heretofore discussed comprised those "bookkeeping" programs necessary for such scheduling and orderly processing, whereas the programs to be discussed hereinafter are examples of the type of program that might be included for a typical well logging service.

Half-Inch Action List

The Half-Inch Action List, which was queued at priority four, will typically comprise a list of programs that for some reason must be processed at half inch intervals of the wellbore. For example, measurements at such close intervals are often desirable when logging with so-called "micro-resistivity devices" and certain sonic tools. Referring again to FIG. 26, there is shown conductor 470 which may be used to provide the analog signal representative of the sonic waveform. Such analog signals are preferably recorded by presentation device 63 of FIG. 1 at very close wellbore intervals. Therefore, one of the programs in the Half-Inch Action List could include instructions for connecting the sonic analog signal or conductor 470 of FIG. 26 to presentation device 63 of FIG. 1 at every half inch and then to initiate the next sonic subcycle firing. It should be recognized, however, that the list of programs in the Half-Inch Action List could also include any necessary programs for data acquisition or processing. A suitable technique for handling data acquisition and processing is discussed hereinafter with respect to the Six-Inch Acquisition program and the Six-Inch Processing program. It should be recognised, however, that although these programs are based on six inch intervals, similar techniques could be used at half inch intervals by the Half-Inch Action List.

Six-Inch Acquisition List

It should be recalled that after each six inches of well tool travel, the Six-Inch Acquisition program is queued. As illustrated in FIGS. 43A-43F, the purpose of the Six-Inch Acquisition List task is to acquire the necessary data from the peripheral equipment such as the A/D converter 57, the DIO 58 and the Buffer 55. It should also be recalled that when the program tape was read into core 62 of FIG. 1, it included data tables and a list of tasks or programs. Therefore, the computer has stored information as to what and where data should be acquired. Each of the individual sondes in the well tool 50 will provide a particular type of data representative of a particular formation characteristic. This data, once acquired, is stored in specific core locations for use when needed by the processing program. These processing programs will be discussed hereinafter.

FIGS. 43A-43F illustrate a flow diagram representative of the action taken by the Six-Inch Acquisition task after being entered at point 625. As shown in instruction 626 of FIG. 43A, the first action is to direct the computer to the first listing in the tables of data previously read into the computer core. This action is followed by a decision element 627 which asks the question, "Is the table list complete?" If the answer is "yes", the computer is directed back to the queue handler as shown at instruction 628. If the answer is "no", the program advances to a set of instructions found in the first table which set up the parameters necessary for acquisition of the data associated with the particular table. As shown in block 629, the parameters set up in this action include:

(1) Type of input—The different inputs may be divided into four types: (a) analog data on a single channel similar to the type discussed with respect to FIG. 21; (b) analog data on, for example, three channels similar to the type discussed with respect to FIG. 22; (c) time interval data similar to that provided by FIG. 26; and (d) events-per-unit-time data of the type provided by FIG. 24;

(2) Analog Amplification—If analog data is to be obtained from one of possible multiple analog channels according to circuitry similar to FIG. 22, the appropriate channel for a first pass will depend upon the value of AMP; (i.e. is AMP equal to 1, 2 or 3;

(3) Addresses of the first and last available storage locations for this type of data; and (4) Address of the buffer in-pointer and the buffer out-pointer. The in-pointer represents the actual storage location where the new data is to be stored, and the out-pointer represents the address from which the data is to be taken out of for processing.

As will become clear hereinafter, items (3) and (4) above are important in obtaining proper depth shifting of the data. The next instruction, as shown by block 630, is that the program should branch to that one of the four different paths selected in (1) above. The path shown at item 631 selected depends, of course, upon the type of input. After acquiring the data sample, the computer is then directed back to the present flow of instructions at re-entry point 632. The program will then go to the next item in the tables, as shown at instruction 633, check to see if the table list is complete at instruction 627 and set up for acquiring the next data sample at 629. The four different branches will be considered in sequential order.

Figure 43B:
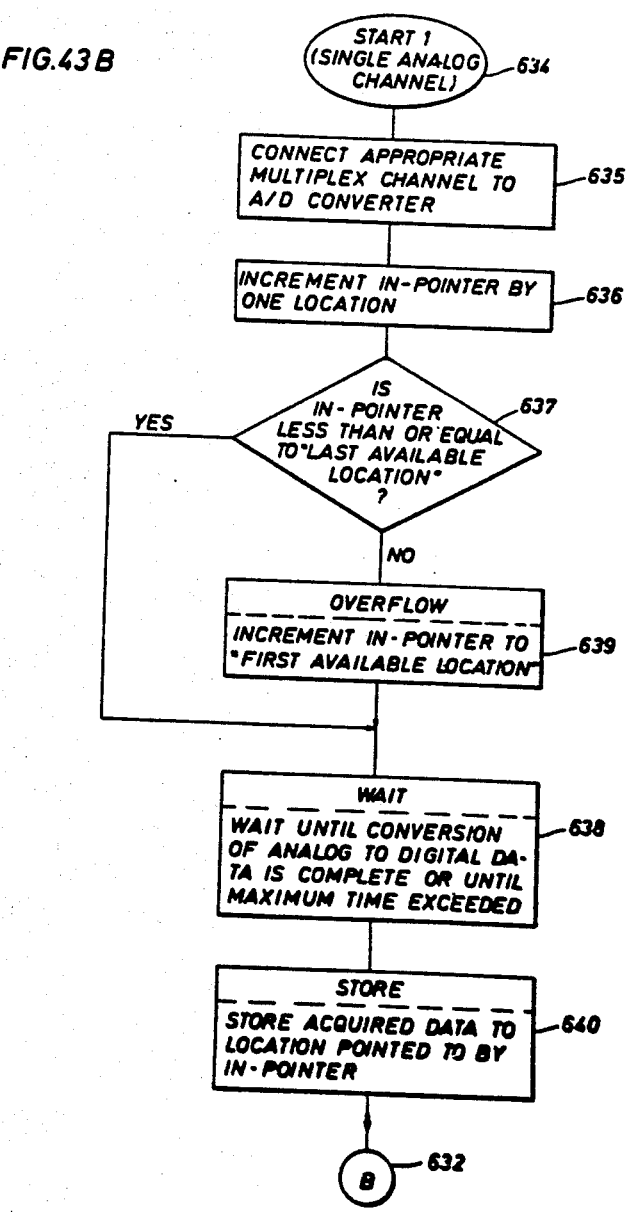
Figure 43D:
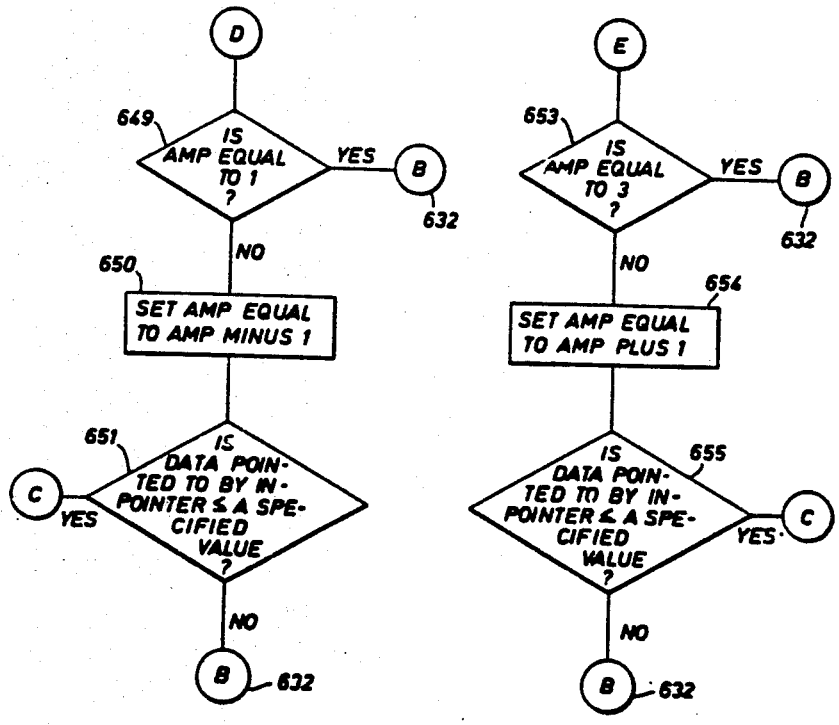

Referring now to FIG. 43B, item 634 shows the starting point for acquiring data from a single analog channel of the type discussed with respect to FIG. 21. As depicted in block 635, the next instruction is to connect, by way of multiplexer 202, a particular analog channel of analog data to the A/D converter 203 so that A/D converter 203 will start converting the analog data to digital form. This type of analog data includes, for example, resistivity measurements. After the computer connects the correct analog channel to the A/D converter and starts the conversion, the next instruction is that the storage location of the buffer in-pointer for this particular data should be incremented by one location (block 636). Following the act of incrementing the storage location, a decision element 637 is encountered for determining whether or not the address designated by the in-pointer is less than or equal to the last possible available location for this type of data. If the answer to the decision element is "yes", the task moves directly to block 638. If the answer to this decision element is "no", this means that the last of the available storage locations in the buffer assigned for that data has been used and that the in-pointer should be recycled back to the starting location in that data buffer such that new data will be written over previously stored data (see instruction 639). In practice, this will not create any problems because by the time the allotted data buffer is full, the data in the first few locations of the buffer will have already been processed.

The next instruction according to this program, is as shown in item 638, that the computer wait, if necessary, until the analog-to-digital conversion is complete or until a maximum allowable time has been exceeded. (It will be recalled from the discussion of the circuitry illustrated in FIG. 21 that in actual operation, the computer does not really wait until the analog-to-digital conversion is complete but instead, returns to processing other tasks. Then when the conversion is complete the converter sends an interrupt to the computer advising of this fact. The computer then returns to the processing of the program at block 638). After the conversion is complete or the maximum time is exceeded, the computer will then store the acquired data in the location pointed to by the in-pointer (block 640). At this point, the data has been acquired to satisfy the requirements of one particular table in the table list, and the computer returns to instruction 633 shown in FIG. 43A via point 632. The next instruction 633 of FIG. 43A as will be recalled is to go to the next table in the table list. The question in instruction 629 is again asked; and, assuming a "no" answer, the parameters of the new table are then set as per block 629, and the process is begun again. We will assume, however, this time that the new table requires data from a wide dynamic range type of analog signal. Such data includes conductivity logging signals. Thus, this data will be available on three channels having different analog amplifiers as was discussed with respect to FIG. 22.

Accordingly, referring to FIG. 43C, the second type of input program is started as is shown at entry point 641. The first action is to send a command as shown in instruction 642 to the multiplexer which controls which channel is applied to the analog-to-digital converter. The channel connected for this particular set of data will be one of three possible channels as determined by the value of AMP. If AMP=1, the channel with the lowest gain amplifier is connected. This would be amplifier 426 in FIG. 22. Similarly, if AMP=2, the intermediate amplification channel will be connected and if AMP=3, the highest amplification channel will be connected. Whether AMP equals 1, 2 or 3 will have been determined during the previous sampling of this data. How this value is determined will become clear as the discussion concerning this flow of instructions continues. The next step is to increment the storage location, pointed to by the buffer in-pointer by one as is shown at 643. The program then proceeds through instruction 644, 645, 646 and 647. These elements or instructions are identical to elements 637, 639, 638 and 640 respectively and previously described. After the acquired data has been stored in the location pointed to by the in-pointer and as instructed by block 647, the next instruction is to determine whether the data is less than or equal to a predetermined lower limit (block 648). If the answer is "yes", the task moves to block 649 (refer to FIG. 43D). If the answer is "no", however, the task will advance to the next decision element 652 for determining whether or not the data is greater than or equal to another predetermined value. If the answer to this determination is "no", the program will return by way of entry point 632 to block 633 shown in FIG. 43A.

Referring again to block 648, it should be recalled that upon receiving a "yes" answer, the program moves from that element to block 649. Element 649 then asks the question, "Is AMP equal to one?" It should be recalled that the AMP was set equal to one, two or three in the instructions outlined in block 629 of FIG. 43A according to a previous sampling of this data. If the answer to block 649 is "yes", the computer returns by way of entry point 632 to block 633 shown in FIG. 43A. If the answer is "no", the program's next instruction is to set AMP equal to AMP minus one as is shown in block 650 of FIGS. 43D. The next instruction as shown in block 651 is to determine whether the data is less than or equal to still another specific value. If the answer is "no", the program advances to block 633 of FIG. 43A. If the answer is "yes", this means that the amplifier of the channel connected to the converter has excessive gain for good resolution and that a channel having less gain should be used. The computer is then directed to block 652 on FIG. 43C which is identical to instruction 642 on that same FIGURE. However, since AMP was decremented by one (see block 650 of FIG. 43D) a channel having less gain will be connected to the A/D converter and digitized.

It will be recalled that the question was asked at element 652 whether the data was greater than an upper limit value. If the answer to this is "yes", the task advances to block 653 which is a decision element which asks the question, "Is AMP equal to three?" If the answer to this question is "yes", the task will return by way of entry point 632 to block 633 of FIG. 43A. If, however, the answer is "no", the program proceeds to set AMP equal to AMP plus one (block 654). The program then advances to decision element 655 to determine whether or not the data is greater than or equal to still another specific value. If the answer is "no", the program advances to instruction block 633 of FIG. 43A. If the answer is "yes", this means that the amplifier of the channel connected to the computer had too little gain for good resolution and that a channel having more gain should be used. The program flow then returns to instructions 652 on FIG. 43C and digitizes the data on a channel with more gain. This is because AMP was incremented by one (see instruction 654 of FIG. 43D).

Figure 43E:
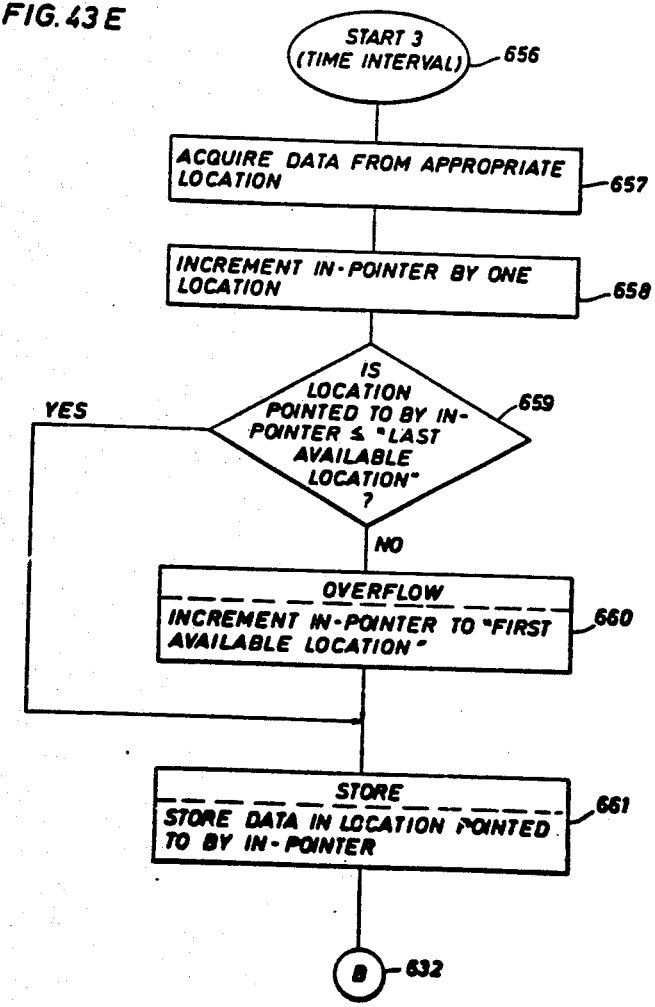

It will now, of course, be appreciated that the task will eventually be directed by way of entry point 632 to block 633 of FIG. 43A no matter what paths are followed. Instruction 633, of course, simply directs the program to go to the next table in the table list so that still another set of data might be acquired. Assume that the table is not complete and therefore the answer to block 627 is "no". Therefore, the task moves to block 629. The data required by the third table will be assumed to be time between two events such as is produced by circuitry of the type shown in FIG. 24. Therefore, parameters will be set and the program will branch to entry point 656 as shown in FIG. 43E. The first instruction 657 of this branch is to acquire the data from the appropriate location. The program then continues to the instructions found in blocks 658, 659 and 660. These instructions are the same as instructions found in blocks 636, 637 and 639 respectively and previously discussed in connection with FIG. 43B. The program then directs the computer to store the acquired data in the location pointed to by the in-pointer as shown at instruction 661. It should be noted that this branch differs from the previously discussed programs in that there is no "wait". In other words, a wait time is not necessary for the transfer of digital data as it was for the conversion of analog data to digital data. The program then returns to block 633 of FIG. 43A which directs the task to the next table in the table list.

The final type of input to be discussed is events-per-unit-time data as shown in FIG. 43F and produced by circuitry of the type illustrated in FIG. 24. Therefore, when the program was directed to the next table in the list of tables, it found instructions to set the parameters, according to instruction 629 of FIG. 43A, necessary for this type of data acquisition. After these parameters are set, the program then moves to entry point 662 of the events-per-unit-time branch illustrated in FIG. 43F. The first instruction as shown by instruction 663 is to acquire a number of events (E) present on a particular counter. The next three blocks of data 664, 665 and 666 are then the same as found in blocks 658, 659 and 660 of the time interval branch illustrated in FIG. 43F. The program then moves to the next instruction block 667 which instructs the computer to acquire the amount of time which elapsed while the events (E) accumulated. Therefore, we now have the number of events that have accumulated in a counter, and the amount of time which elapsed while these events were accumulating. The task then directs the computer to divide the number of events by the elapsed time (E/T) as is shown in block 668. This result is then stored in the location pointed to by the in-pointer (instruction 669). The task then returns to block 633 of FIG. 48A. Assuming that the events-per-unit-time parameters are the last table in the table list, the computer will then be directed back to the queue handler by instruction 628 of FIG. 43A for instruction as to what the next task for the computer will be.

Figure 44:
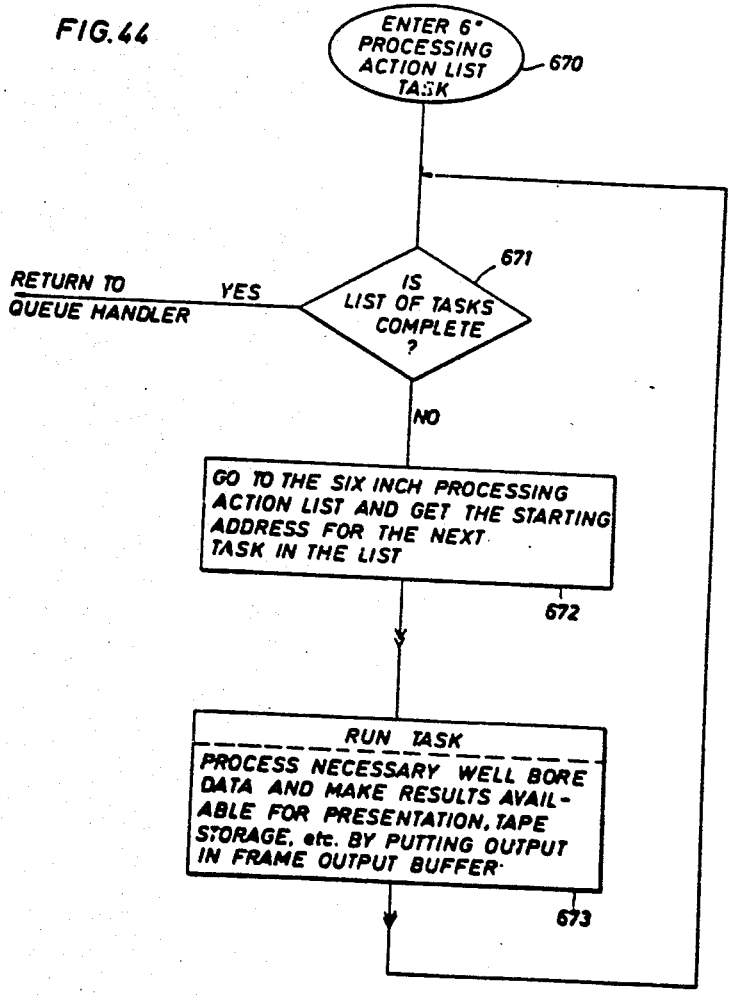
FIG. 44 is a flow diagram of a processing list program which might be used by the system of this invention for controlling the processing well logging data.

Six-Inch Processing List:

Assume now that there have been no higher priority taks placed in the queue list and that the queue handler has progressed and is operating on tasks at the priority two level. Therefore, eventually, the programs necessary for processing the data which was acquired by the Six-Inch Acquisition task will be processed by the computer since, in addition to the Six-Inch Acquisition list programs, there was a Six-Inch Processing list also queued. When the computer is directed to entry point 670 of the Six-Inch Processing program as illustrated by FIG. 44, the computer will first determine if all tasks have been completed as is illustrated at instruction 671. If all of the tasks on the list have not been completed (and since the program was just entered they will not have been completed) the computer will go to the first task or program designated in the Six-Inch Processing program as shown in block 672. The computer will then process the wellbore data as required by the called program and make results avaialable for presentation and tape storage by storing these results in appropriate temporary storage buffers. These instructions are represented by block 673 and, of course, may include a very lengthy program. After that particular program has been run, the computer then returns to block 671 of the Six-Inch Processing task. This procedure is continued until all programs required by the Six-Inch Processing task have been completed. As shown in block 671, when the last program in the list is completed, the computer is directed back to the queue handler for further instruction. Processing of data by the several programs included in the Six-Inch Processing list programs either may involve complex manipulations and computations or else simple operations such as moving raw data from one of the storage locations to an output buffer. As will be explained in more detail hereinafter, the last two programs to be run in accordance with the Six-Inch Processing task or program will be program for placing the data on magnetic tape and a program for display data on the presentation device 63 of FIG. 1.

Keyboard/Printer Programming:

It should be once again pointed out that during the processing of all of the above-mentioned tasks, interrupts from external sources may occur. If these interrupts are at a higher priority than the task then being accomplished by the computer, this task in process will be stopped, put into a hold condition, and the computer will then branch to the new higher-priority task. This higher-priority task will be completed before the computer returns to the task that was in progress when the interrupt arrived. It should be further noted that in addition to the external 0.1 inch interrupt, previously discussed, there may be other interrupts which have high priorities, some even at priority level five that occur asynchronously. For example, another important group of external events and their associated programs that contribute to the flexibility of the system of this invention are those interrupts associated with the Keyboard Input 81 and Teleprinter Output 71 combination hereinafter referred to as the keyboard/printer or alternatively as the keyboard/printer system.

The Keyboard/printer is the principal mechanism which provides the interface and communication between man and machine during operation of the present well-logging system. Such communications and interfacing informs the engineer of necessary actions on his part for proper operation of the system and also allows the engineer to make changes in the system operation according to his judgment. However, there are some special problems involved in using the Keyboard/printer as an operator command input device and a system output device. For example, various system programs, which may be running asynchronously, may at almost any time require use of the printer to output a message. This means that there may be competition among system programs for use of the printer. This problem is resolved by placing all printer output messages in a message output queue which might, for example, simply schedule the messages on a first in first out basis. The message output queue could, of course, schedule messages according to a priority basis, if desired. A Keyboard/printer supervisor program then outputs the appropriate messages when the printer device is available.

The problem of competition for the printer is further complicated by the fact that the operator or engineer may also be competing for use of the Keyboard/printer in order to input a command through the keyboard. In the present system, the basic approach is that operator input has priority over any system output, and techniques are provided whereby the operator can take control of the keyboard/printer combination away from the system at any time in order to input. As long as the operator keeps typing on the keyboard, he will retain control of the printer. However, if he pauses for a predetermined time period between typing characters, and the system requires the printer for output, it will re-take control of the keyboard/printer. This is done to insure that the engineer cannot stall the system by forgetting that he has taken control of the keyboard/printer from the system.

Two distinct modes for the keyboard/printer combination can be distinguished. The system is in "output" mode when a message generated by the software is being printed, and the system is in an "input" mode after the operator has struck the first character of an input message and until he terminates the input message. The system can also, of course, be "disabled".

Two basically different types of input modes may also be distinguished. One is "Command Input". Commands may be issued whenever the system is in the ready-for-input state. The other type of input is "Requested Input". In this case, the computer software has printed out a message that requires some sort of specific response from the operator and is waiting for that response.

Following is a description of how messages or commands may be input to the computer through the keyboard and also how messages (input or output) are generated by the printer whether they originate from the keyboard or from the computer. Setting up an operational example, the assumption is made that the printer is presently in the process of outputting a message from the computer. It is also assumed that the engineer has decided to type in a message to the computer without waiting until the message presently being printed is complete. The engineer will type in a specific character or some special combination of characters on keyboard 81 such as, for example, "+C". The act of typing this character will do two things; (1) it will cause an interrupt to be sent to the keyboard interrupt handler; and (2) it will store the character in a buffer located in the keyboard interface. This character as will become clear hereinafter will be recognized by the system as meaning that the keyboard is to be given control of the keyboard/printer combination.

Figure 45:
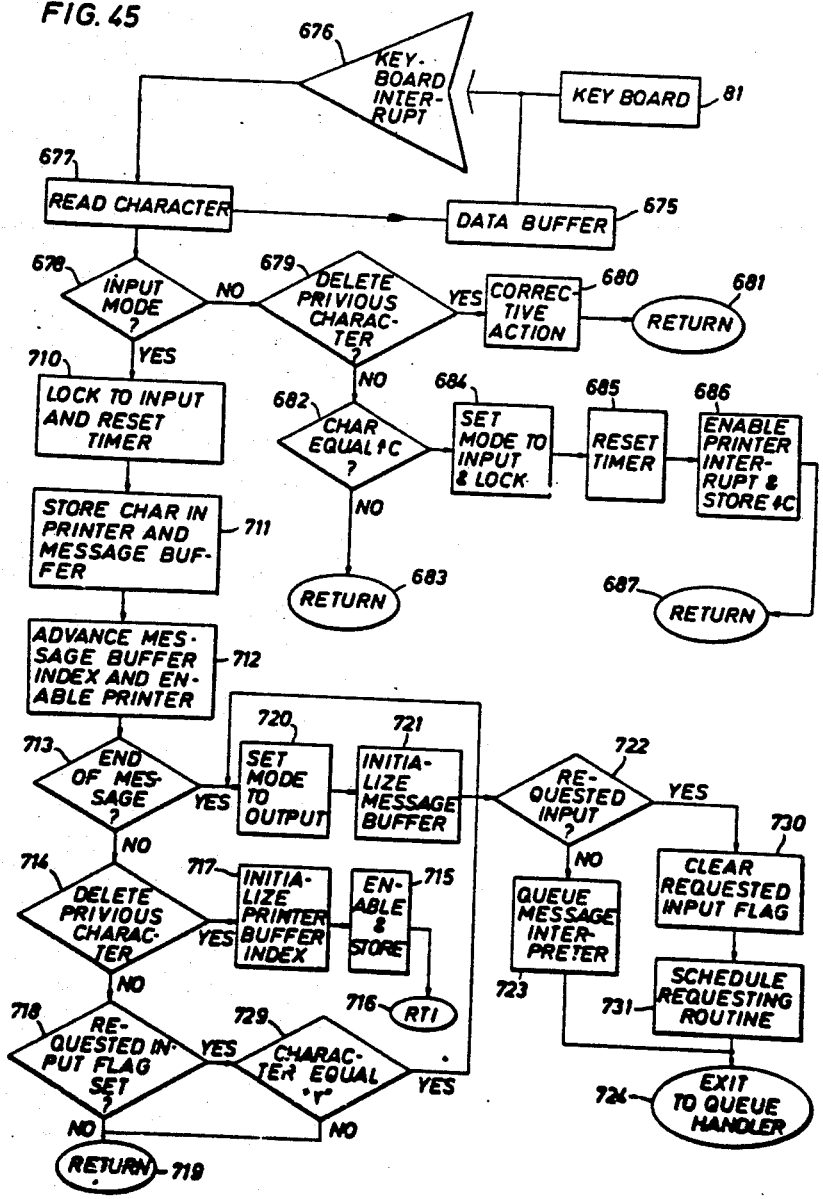
FIGS. 45-47 are typical programs for servicing the keyboard and teleprinter devices of this system.
Figure 46:
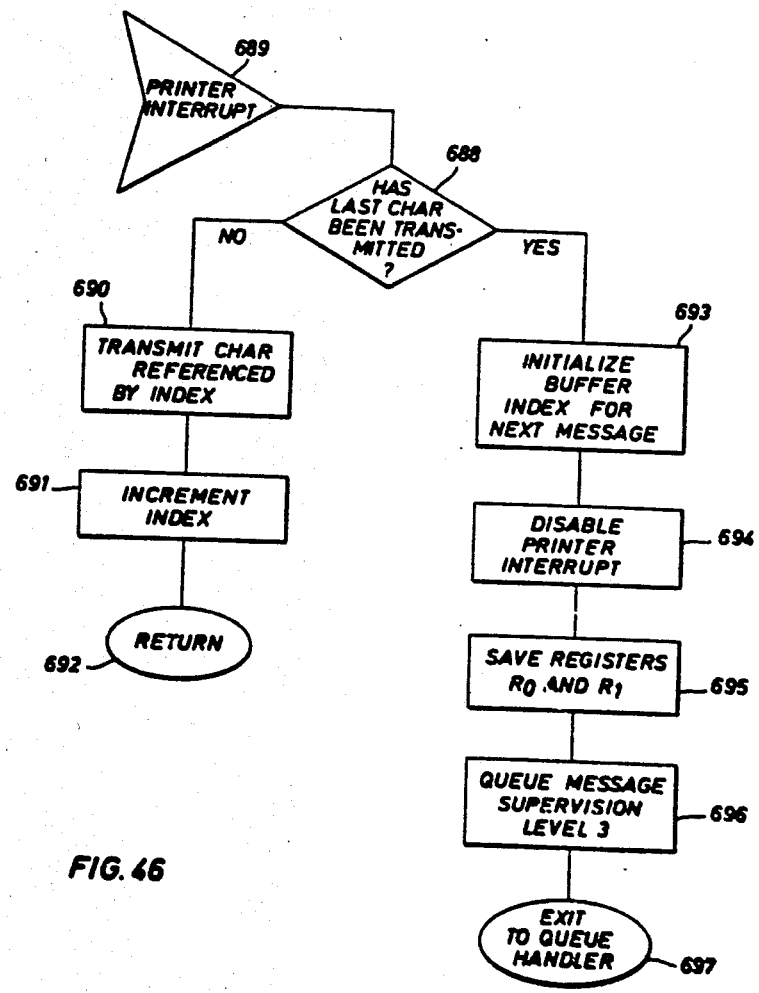
Figure 47:
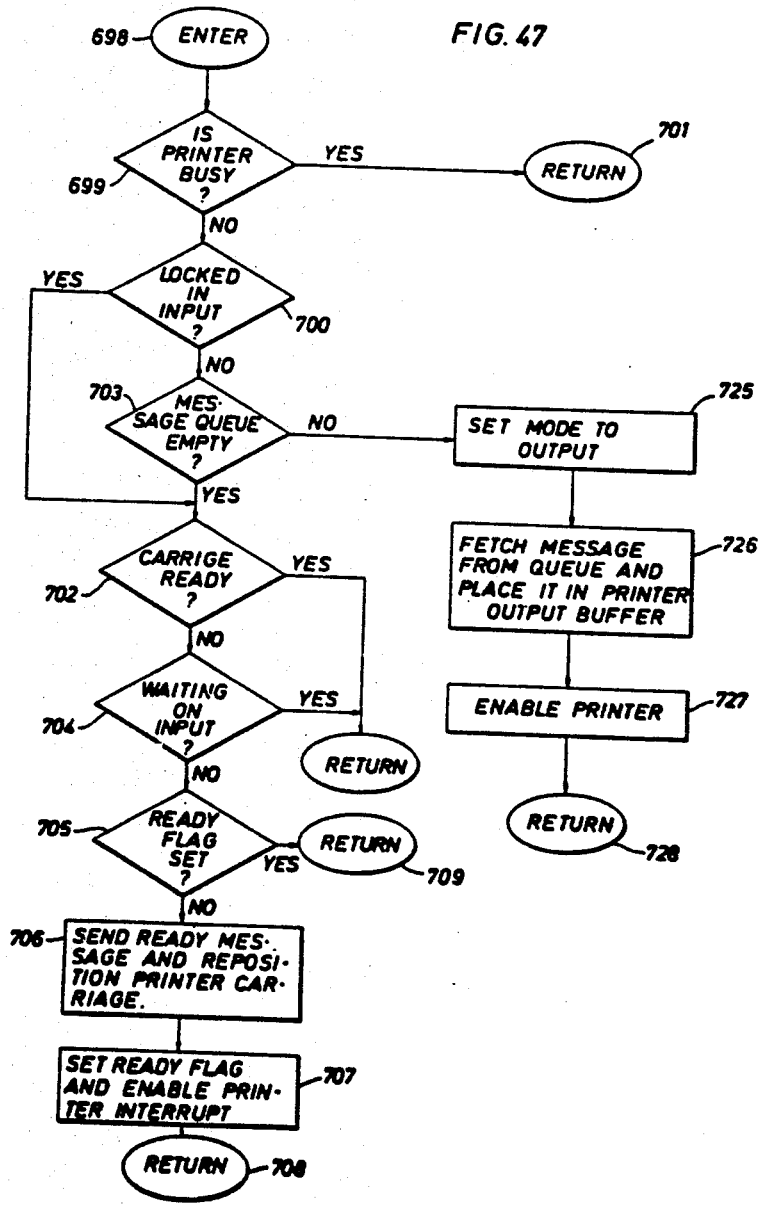

Referring now to FIGS. 45, 46 and 47 there are shown diagrams flow diagram of related software for operating the keyboard/teleprinter combination. As was mentioned above, the well logging engineer will type a character on keyboard 81. This character is stored in a data buffer 675 shown in FIG. 45, and an interrupt is sent to the computer. As was mentioned earlier, with respect to the discussion concerning the 0.1 inch interrupt and the associated hardware, such as interrupt first stores the contents of the PC and PS register in stack and it then directs the computer to a new task for handling the keyboard interrupt in response to a "vector address" also provided by the interrupt. The first action of the computer as shown in the flow chart of FIG. 45 after entering the Interrupt Handler program at entry point 676 is that the computer will read the character stored in data buffer 675 as is shown in instruction 677. The computer then must decide whether or not the keyboard/printer is in the "input" mode. This is shown in block 678. If the answer is "yes", further action to be taken by the computer, as will be discussed hereinafter, will follow. However, it is to be recalled that the system was in the process of outputting a message when the well logging engineer first made an entry on the keyboard 81. Therefore, since the printer was printing out a message, the keyboard/printer was not in the "input" mode but in the "output" mode. Consequently, the next action taken by the computer as shown at instruction 679 is to determine whether or not the typed character was some specific character, other than the +C, for indicating that a previously typed message (character) should be deleted. If the answer was "yes", this means that the engineer made a mistake and did not mean to type the previous character. In that case, the computer will take corrective action as shown in instruction 680 and then return directly to the program, from which it was interrupted as is indicated at instruction 681. However, in this example, it is to be remembered that the character typed was not a delete character. Therefore, the answer to the question asked at instruction 679 was "no" and the program moves to instruction 682 where the question is asked, "Is this character +C?" If the answer is "no", this means that evidently the engineer has made a mistake, did not want control of the keyboard/printer to type a message, and this character input is in error. Therefore, the computer returns directly to the interrupted program as is indicated at 683. For example, the engineer might have accidentally leaned against the keyboard. However, in this case, the key typed was +C and the answer to the question of Instruction 682 is "yes". Therefore, the computer moves to instruction 684 and sets the mode to "input" where it is locked for some preselected amount of time such as five seconds as determined by a timer and is ready to receive a message from the keyboard. The computer will then, as shown in instruction 685, cause the timer to be reset. At this point, as shown in at 686, the computer will enable the printer interrupt and store a character in the printer output buffer for printing. For example, this character may be the two part character +C originally typed to get control of the keyboard/printer combination. The program then returns control of the computer back to whatever program was being run when the interrupt occurs as is shown at 687. Therefore, the keyboard/printer is locked in the input mode for the preselected amount of time as determined by the time which was reset at instruction 685. This means that the keyboard now has control or priority over use of the printer and that the computer cannot use the printer for an output message until the keyboard relinquishes control.

Referring now to FIG. 46, there is shown the printer interrupt handler. Since the printer interrupt was enabled at instruction 686 of FIG. 45, an interrupt will occur just as soon as the system returns from the interrupt status which occurred for handling the keyboard interrupt. Therefore, as shown in FIG. 46, the first instruction 688 of the printer interrupt handler routine encountered after the entry point 689 is the question, "Has the last character (in the teleprinter storage buffer) been transmitted?" The computer will then look at the storage buffer and see that there is a character needing to be transmitted. Therefore, the answer is "no". It should be recalled at this time that as a result of the engineer using the keyboard, that the two part character +C indicative that the system was ready to receive a message, was entered into the buffer at instruction 686 of FIG. 45. Therefore, the first part of this symbol (+) will be transmitted to the printer (see instruction 690); and an index pointer which controls which character in the storage buffer is next to be transmitted, will be incremented one position as shown in instruction 691 and point to the next part of the character (C). Control of the system is then returned as shown at 692 to whatever program was interrupted when the printer interrupt occurred. Therefore, the computer will return to processing the interrupted task while the teleprinter is in the process of printing out the first part (+) of the two part character +C. As soon as the transmitted character (+) is printed by the teleprinter, the printer will immediately send another interrupt and again enter the printer Interrupt Handler at 689 shown in FIG. 46. Therefore, the question will again be asked (688), "Has the last character been transmitted?", and the answer of course will still be "no". Therefore, the second part (C) of the two part character +C will be transmitted to the printer, the pointer indexed and the computer returned to the program it was processing prior to being interrupted as is shown in instruction 690, 691 and 692 respectively. Upon completing the printing of the last part of the character +C stored in the storage buffer, an interrupt will occur once again. However, in this case, when the question is asked, at instruction 688, "Has the last character been transmitted?" the answer will be "yes". Therefore, the storage buffer for output messages will be initialized for receiving a new character(s) (item 693) and the printer interrupt is disabled as shown at instruction 694. Then, as shown at instruction 695, the program directs the computer to save register R0 and R1 in the CPU and at instruction 696 queues the "Message Supervisor" program at priority three. The computer is then instructed at item 697 to proceed to the Queue Handler program for further instruction. The operation of the "Queue Handler" is, of course, as was described with respect to FIGS. 41A and 41B heretofore. Therefore, it will be understood that eventually and according to priorities, the Queue Handler will eventually direct the computer to run the "Message Supervisor" program.

Referring now to FIG. 47, after being directed to execute the Message Supervisor program, the computer will enter the program at entry point 698. The first instruction encountered at 699 is the question, "Is the printer busy?" In this situation, the answer will, of course, be "no" and the computer will proceed to instruction 700. If the printer had been busy, the computer would then return to executing the task that might have been interrupted as is shown at item 701. Instruction 700 asks the question, "Is the printer locked in the input mode?" In this situation, the answer is, of course, "yes" as the printer was locked in "input" at instruction 684 of FIG. 45. Therefore, the computer moves on to instruction 702. As will be discussed later, if the answer to instruction 700 had been "no", the computer would have moved to instruction 703 to determine if the "message queue" was empty. Instruction 702 asks the question, "Carriage ready?" (i.e., has the printer carriage been returned to a position suitable for entering complete message). It will be recalled that no such instructions have been sent to the printer, therefore, the answer is "no" and the computer moves on to instruction 704 where the question "Waiting on input?" is asked. Since the engineer has not yet been informed by the printer that the system is "ready" or waiting on his input message so at this time the answer is "no". The computer then moves to instruction 705 where the question is asked, "Is the ready flag set?" Again, the answer is "no"; and therefore, the computer will send a ready message character, (such as for example ">"), and a character to reposition the printer carriage to the printer storage buffer as is indicated by instruction 706. The computer will then set the ready flag referred to in instruction 705, enable the printer interrupt and return to processing lower priority programs as indicated by instruction 707 and 708 respectively.

Now since the ready character and the carriage position character have been loaded in the printer storage buffer and the printer interrupt has been enabled, it will be appreciated that the printer will immediately initiate an interrupt, and the computer will be once again directed to the Printer Interrupt Handler program. The operation of the printer interrupt handler is, of course, the same as described above. Therefore, the carriage reposition character will be transmitted to the printer and then the symbol ">" will be printed in accordance with instruction 688, 690, 691 and 692 of FIG. 46. Of course, after the symbol ">" has been printed the Printer Interrupt Handler is again called and since there are no further characters to be transmitted to the printer, the program flow will follow instruction path 688, 693, 694, 695, 696 and 697. Therefore, it can be seen that the "Message Supervisor" is again queued and the computer directed to the Queue Handler program. When the "Message Supervisor" program is finally entered at point 698, the program flow will follow the same path as heretofore discussed down to 705. However, this time when the question is asked, "Is the Ready Flag set?", the answer will be "yes" and the computer will return to processing an interrupted task if such a task had been previously interrupted as shown at instruction 709. When the symbol ">" is printed out on the teleprinter, the engineer will recognize that the system is ready to receive his input message. In fact, the engineer must begin his message within five seconds or control of the printer will be taken from the keyboard. Therefore, the engineer will type in a command message such as, for example, "modify X to Y"; i.e., change some parameter X to a new value Y. Referring again to the Keyboard Interrupt Handler illustrated in FIG. 45 it can be seen that as each character of the modify message is typed by the keyboard, the character is stored in the hardware data buffer 675 and a keyboard interrupt is sent to the computer. Therefore, when the computer responds to each of these interrupts, it reads the character loaded in the data buffer 675 according to instruction 677. The following sequence of events is, therefore, the same for every character in the message "modify X" and consequently will be discussed only once. In response to each of the keyboard interrupts, the computer then proceeds, as shown in block 678, to find out if the system is in an input mode. It will be recalled that when the Keyboard Interrupt Handler was called in response to the engineer, typing the character +C that the keyboard printer sysem was set to the "input" mode in response to instruction 684. Therefore, the answer to the question at item 678 is "yes". Consequently, the next instruction resets the five second timer, as shown in block 710, and then causes the character to be stored in the printer buffer and a message buffer according to instruction 711. The messsage buffer index is then advanced at instruction 712 so that the next or following character will be stored in a new location. The printer interrupt is also enabled by this instruction. The question is then asked, at instruction 713 for each character "End of Message?"; i.e., is the input message complete. Since the end of a message is indicated by typing a special character such as for example, the carriage return, it will be appreciated that for all the characters in the message "Modify X", of course, the answer is "no". Therefore, the next question at instruction 714 is "Delete previous character?" This question at instruction 714 is identical to the previous instruction 679 and is for the same purpose. Therefore, instruction 715 and 716 operate identical and for the same purpose as the earlier instruction 686 and 687. However, the instruction 717 is necessary to remove the erronous character stored in the message buffer. The answer to instruction 714, however, for all the letters in the modify message is "no". The question is then asked, at instruction 718, "Requested Input Flag Set?"(i.e., is the system waiting on a request input). As will be explained later, Requested Input is used when the computer has requested an input from the keyboard. Therefore, the answer to question 718 is "no", and the computer returns to processing other tasks as shown at 719. As was explained earlier, the computer will be directed along the just described path of the Keyboard Interrupt Handler for each character of the modify message. Therefore, since with each character the printer storage buffer was loaded and the printer interrupt enabled, it will be appreciated that the printer will interrupt the computer after each character is typed so that the character will be printed. After the engineer has typed in the complete modify message, he will then type in a carriage return character. The carriage return character will also cause the keyboard interrupt handler to interrupt the computer, and the computer will proceed to execute the instructions 677, 678, 710, 711 and 712 in exactly the same manner as was described for the character of the modify message. However, when the computer arrives at instruction 713 where the question is asked, "End of Message?" the answer is "yes" since the carriage return is the character selected to be indicative of the end of a message. The next instruction 720, therefore, is that the keyboard/printer mode to be set to "output"; that is, change from the input to the output mode. The message storage buffer is now initialized by instruction 721 so that the buffer can receive a new message, and the computer is then directed to the question at item 722, "Requested Input". The answer is "no" in this situation, and therefore, the next action shown by instruction 723 is that a message-interpretor program is queued at a suitable priority level. The computer is then directed to the queue handler by item 724. Eventually, depending on the priority of the tasks already in the queue, the message interpretor program scheduled by the modify message will be run by the computer. This routine will compare the modify message to a list of messages available and see if there is a match. If the message was typed wrong or does not exist an error message would be placed in a message queue to be discussed hereinafter for printout by the printer, and the computer would resume executing other tasks. In the present system the system software is set up so that the "Message Supervisor" program (which may, of course, be scheduled in the queue by other programs such as for example, instruction 696 of the Printer Interrupt Handler) is called at least every five seconds. Therefore, the error message will be eventually printed out without further instructions in the following manner. After the Message Supervisor is entered at item 698 of FIG. 47, the computer will proceed through instruction 699 to instruction 700 to determine if the keyboard printer is in the input mode. The answer will be "no" since the mode was changed from input to output at instruction 720 of FIG. 45. Therefore, the computer will proceed to instruction 703 for determining if the message queue is empty. Since the error message was entered in the message queue the answer to the question of instruction 703 is "no", and the computer advances to instruction 725 along a program path that will result in the error message being printed. This path will be discussed in more detail hereinafter. The above discussion was based on there being no match to the modify message; if, however, we assume that there was such a message, once a match has been found the computer will be directed to an appropriate routine for handling that message. The called routine, in this case, hereinafter referred to as the "Modify" routine, will then be processed up to the point where a change is ready to be made in the parameter X, and the requested input flag referred to with respect to instruction 718 of FIG. 45 will be set. The modify routine will then place the address of a message (requesting that the engineer verify that the value he gave is really the value to which parameter X is to be changed). In addition, the message supervisor program will be placed in the program queue. The purpose of the message queue is to provide an orderly sequence for printing messages if more than one message is awaiting output in the queue at the same time. The present system uses a "first in, first out" scheduling arrangement, but it will be also appropriate that a technique based on a priority order such as is used for the program or task queue could be used. After the message is queued, and the message supervisor program is placed in the queue, the system will return to the queue handler for determination of the next task to be accomplished. Eventually, of course, the queue handler will direct the computer to the Message Supervisor program illustrated in FIG. 47. The program flow will then continue through instruction 699 and 700 to 703 where the computer determines whether or not the message queue is empty. Since the modify program placed a message in the message queue, the answer will be "no". Therefore, the computer will reset the keyboard/printer mode to output at instruction 725, and then remove the message from the message queue and place it in the printer output buffer at instruction 726. After enabling the printer interrupt at 727, the computer will then return to processing "other" programs at 728.

Since the printer was enabled, a printer interrupt will immediately occur. Therefore, the message from the modify program requesting that the engineer reaffirm the change to parameter X will be printed out in the manner already discussed with respect to FIG. 46; after which the computer will return to any task it may have waiting for execution.

When the engineer sees the request for the reaffirmation of the change to parameter X he will then type in a special character such as for example "V" for verify, which in this example instructs the computer that the change to be made in parameter X is correct. When the engineer hits the "V" key, a keyboard interrupt occurs and the computer is directed again to the Keyboard Interrupt Handler program. The program flow this time is through instruction 677, 678, 710, 711, 712, 713 and 714 to instruction 718. Instruction 718 asks if the Requested Input Flag is set?" Since the flag was set by the modify program, the computer then moves to instruction 729 and asks if the typed character was "V". Since the character typed by the engineer was a "V", the computer is then directed to instruction 720 of the program and then on through instruction 721 to instruction 722. Instruction 722 again asks if the "Requested Input Flag is Set?" Therefore, since the flag is set, the computer then clears the "Requested Input" flag at instruction 730 and again queues the Modify program at instruction 731 before returning to the Queue Handler at 724. Then, when the modify program is eventually called by the Queue Handler, the change to parameter X takes place. After the change is performed by the modify program, the computer then continues its normal operation.

Depth Shifting

Figure 48:
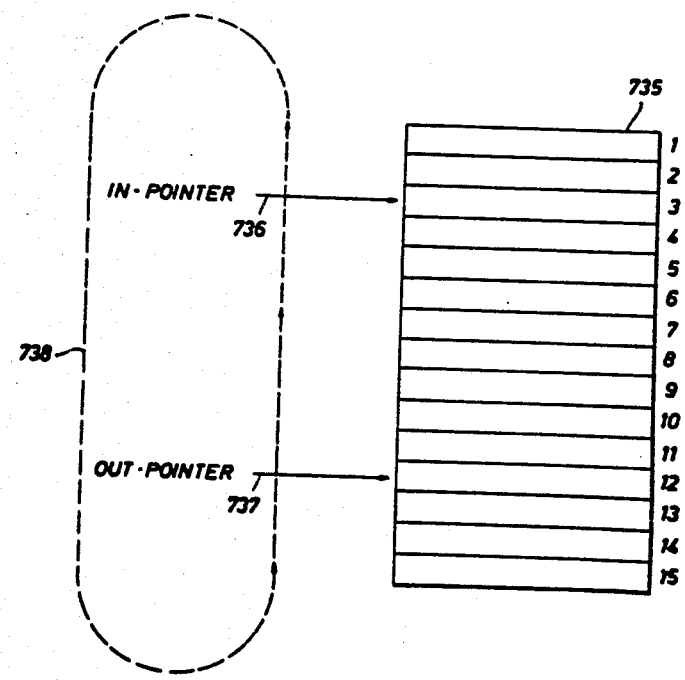
FIG. 48 illustrates how data obtained from various depth levels of the wellbore are depth shifted by the system of this invention.

As has been discussed heretofore, it is desirable that all processed and recorded data be referenced to a particular depth. However, all of the sondes or transducers on a typical logging tool which produces data are not at the same position on the tool. Therefore, if a measuring point on the tool is considered to be at the lowest point on a well tool 50 and if there are three sondes respectively spaced from the lower portion of the tool by, for example, 36-inches, 54-inches and 72-inches, the various logging data must be depth shifted by these same distances if the data is to be correctly correlated with depth. Referring now to FIG. 48, there is shown an example of how such depth shifting is accomplished. There is shown a so-called cyclic buffer 735 which has fifteen consecutive storage locations. The in-pointer 736 (which is the same in-pointer discussed with respect to block 629 of FIG. 43A) points to the storage location within the buffer 735 where the next data acquired from a particular location is to be stored. The out-pointer 737 points to the storage location within buffer 735 from which the next-to-be processed data will be taken. The in-pointer 736 will be incremented by one storage location each time data is acquired, and the out-pointer 737 will be incremented one storage location each time data is removed from the buffer 735 for processing by the specific program needing that data. Although during a time interval it is possible that data could be acquired more times than it is removed, eventually, the amount of data acquired and the data removed must be the same. That is, one sample of data removed for every sample acquired. Both pointers will be cyclic; that is, they are incremented from one location in the buffer to a contiguous location until they reach the last buffer location assigned for storage of that data. Then as shown by the dashed path 738, the pointers 736 and 737 will then be directed back to the starting storage location contained within the buffer 735.

Assuming that data is to be acquired every six inches, the logging data obtained from the logging sonde spaced 54-inches above the measuring point of the tool 50 must be depth shifted by nine storage locations or 54-inches (9×6). Therefore, a *minimum* spacing of nine locations is shown separating in-pointer 736 and out-pointer 737 of FIG. 48. It is to be noted that there are fifteen storage locations and a minimum on only nine storage locations separating the two pointers. The reason for the extra locations is to allow for the possible situation where processing of data at queue priority level two will get behind acquisition of data which is at priority level four. Therefore, in the example shown in FIG. 48, acquisition of data could occur at least six times without any processing taking place and still no data would be lost. Depth shifting for the other sondes of the logging tool 20 is accomplished in a similar manner except that the spacing between the in-pointer 736 and out-pointer 737 would be correspondingly varied. For example, for 36 inches of depth shifting, in-pointer 736 and out-pointer 737 would be separated by a minimum of six storage (i.e., 6×6"=36") locations; and for 72 inches of depth shifting, the two pointers would be separated by a minimum of twelve (i.e., 12×6"=72") storage locations. Thus, it can be seen that the data is already depth shifted when taken from buffer 735 for processing; and it is therefore necessary only to place the processed data in the desired output buffer.

Data Storage

FIG. 49 illustrates how processed data is finally relocated from an output buffer to the output data tape. A frame output buffer 739 (located in core) is loaded with data from the individual processing programs. That is, as a processing task is completed, the processed and depth shifted data is placed in the proper location of the frame output buffer 739. In the buffer shown in FIG. 49, there is, for example, depth data located in the first word of the buffer followed by the twelve words of sonic data. The sonic data is followed by one word each of data such as, for example, SP, conductivity, $V_o$, and $I_o$ (from Laterolog), events-per-unit-time, SP compensated, resistivity (by reciprocating conductivity) and any other measurement that might be obtained by processing the other data acquired during a well logging operation. One of the bits of the last data word is used to mark the end of a frame data. In the example depicted in FIG. 49, there are twelve sonic words in the buffer for each word of other types of data since the sonic data has been acquired at every one-half inch and all of the other data has been acquired at every six inches of wellbore depth. Therefore, the frame of data represents a six inch sampling of data which corresponds to a particular wellbore depth.

Once all of the processing programs have been completed and their respective data is placed in the appropriate location of frame output buffer 739, a buffer packer program represented by circle 740 in FIG. 49 is then run by the computer. This program takes the data from the output buffer 739 and places it in one of two magnetic tape output buffers. In the illustration shown in FIG. 49, buffer packer 740 would, for example, first place the data in magnetic tape output buffer 741. Buffer 741 comprises contingous locations in core and preferably has a much larger capacity than the frame output buffer 739. Therefore, it is possible that several data frames from the buffer 739 may be successively placed in spaced locations in the magnetic tape output buffer 741. Eventually, of course, the magnetic tape output buffer 741 will be filled and at that time the buffer packer program 740 stops storing the data frames from the frame buffer 739 into the output buffer 741 and starts storing the subsequent data frames in a second magnetic tape output buffer 742. The magnetic tape controller 67 will be notified when magnetic tape output buffer 741 is full and will start transferring data from output buffer 741 through the magnetic tape contrller and onto an output data tape 743 which as is illustrated in FIG. 1 is on tape transport 69. This transfer of data from magnetic tape output buffer 741 to the magnetic tape 743 may be carried on while additional data frames from the buffer 739 are being transferred to magnetic tape output buffer 742.

It is, of course, necessary for proper operation, that all transfer of data from magnetic tape output buffer 741 to tape 743 be completed before magnetic tape output buffer 742 is also filled. Assuming that this is the case, once the output buffer 742 is filled, buffer packer program 740 will redirect the transfer of data from the frame buffer 739 so that the data frames are transmitted to the first magnetic tape output buffer 741 once again. Then, as magnetic tape output buffer 741 is again being filled by the data frames from the frame buffer 739, the magnetic tape output buffer 742 will transfer its contents by way of the magnetic tape controller 67 to data tape 743.

Data Tape

The illustrative example of the data tape 743 of FIG. 49 shows a single frame of data on the magnetic tape. However, a data tape written by this system will preferably contain a complete record of everything that occurred during the logging operations for a given service, and not just the logging data. Therefore, the data tape will be regarded as a standard product of the system. This other information is recorded on the data tape since without the ability to recover calibration information, recovery from a system crash would be very difficult. In addition, by knowing every step of the logging operation, the calibration parameters used and other information, the entire operation can be recreated and data which was obtained improperly may be reprocessed and computed to produce a proper and valuable log.

FIGS. 50 through 50G illustrate the data tape format. Referring now to FIG. 50, it can be seen that the data tape is composed of a series of Data Files. Data files are separated by EOF's and are identified by file number which run in sequence from the beginning of the tape. As shown in FIG. 50A, the information within a Data File is composed of a series of records which are also separated by EOF's. These records also have associated record numbers and run in sequence from the beginning of the data file. As shown in FIGS. 50B and 50C, the first six words of each record comprise a record-header. The header contains such information as record type, record number, file number and other bookkeeping information.

Refering again to FIG. 50, it can be seen that the first file on the Data Tape might typically be the Label-File. The Label-File is used for tape reel identification for later data processing on an office computer system. It includes such information as the reel number, the date of generation, and the service that generated it. The Label-File is generated during the Setup phase and the act of labelling a data tape indicates, to the Logging System Software, the intention to write a Data Tape throughout all of the operations of the service.

The next two files on the data tape would typically include Testing and Calibration and would also be generated during the Setup phase, whereas subsequent files will be generated by other phases. As each successive phase takes control, it starts a new file on the Data Tape. Before giving up control, a phase ends the current file by binding the tape which involves writing a double EOF at the end of the tape. In the Initialization of the next phase, the Data Tape is repositioned to a point just after the first of the two EOF's. Thus, the first record output by the new phase will overwrite or erase the second EOF and unbind the tape. The tape will generally remain unbound until the new phase ends and binds it.

All messages input by the operator from the keyboard and all messages output to the operator will be recorded on the data tape. Each such message will appear on the Data tape as a single physical record. The record type code in the record header, see FIG. 50B, will indicate that it was a keyboard/printer message and will indicate its source.

To permit recovery of the information contained in the Tables and Common areas of the computer memory, these areas are periodically dumped onto the data tape. This is done routinely at the end of each phase, just before binding the tape, since the greatest danger of something going wrong arises during the Overlay process. Thus, it is wise to save on the Data tape an accurate copy of the information contained in the Tables and Common portion of core at a time immediately preceding such a risk. Each of the two areas is written as a single record on the tape. The record type in the record header identifies the record either as a Table dump or as a Common dump.

Referring now to FIGS. 50D through 50G there is illustrated the data tape format for the logging phase of the operation which is unique among the various phases of the Logging System Software in that it can generate more than one Data File on the Data Tape. When the LOG command is issued, data output will begin in the then current file. When the corresponding STOP command is issued the Data File will be terminated with an EOF and a new Data File will be begun. The file generated after the LOG command and up to the STOP command will be referred to hereinafter as a Log-run Data File. Log-run Data Files are the most important on the Data Tape as they contain the actual data from downhole measurement. Recalling FIG. 49 and the discussion concerning the writing of data on a magnetic tape, it should be remembered that the data for each six-inch interval is packed into a single data frame as shown at 743 of FIG. 49. Now as can be seen from FIGS. 50F and 50G, a group of these Data frames make up a Logging Data Record. The Logging Data Record is a particular record type which is identified in the record header.

Now referring to FIGS. 50D and 50F, it can be seen that a Log-run Data File may contain Logging Data Records in addition to other records such as Tables, Common, etc. At the beginning of the Data File as is shown in FIG. 50E is a Format Record. This record contains information describing the exact format of the Data frames for that logging run. It includes for each output value in the frame its mnemonic name, its relative position in the frame, the data format used to represent it, units, sealing, etc. This Format Record may be used later by generalized playback programs which may process or merge the data. It offers the considerable advantage that exact Data Frame Format need not be hardware-coded into such playback programs. They can adapt themselves to whatever format was used when the tape was generated. As has already been mentioned, a Log-run Data File also contains dumps of the Tables and Common at the beginning of the file in addition to the record format. Since Tables and Common are also dumped on exit from the Log Phase Control programs, this means that each Log-run Data File will be accomplished by copies of the controlling parameters in these memory areas at times corresponding to both the start of the log and the end of it.

While there have been described what are at present considered to be preferred embodiments of this invention, it will be obvious to those skilled in the art that various changes and modifications may be made therein without departing from the invention, and the invention is, therefore, intended to cover all such changes and modifications as fall within the true spirit and scope of the invention.

What is claimed is:

1. A method of acquiring and processing well logging data which are representative of measurements provided by a well logging tool adapted for investigating characteristics of earth formations around a well bore comprising the steps of:

moving a well logging tool through a well bore;
supporting a measuring means with said well logging tool;
acquiring well logging data relating to a selection of well bore characteristics with said measuring means;
providing selected electrical outputs from said measuring means representative of said acquired data;
receiving and processing said acquired well logging data according to selected sequences of processing steps for each of said selected well bore characteristics, each of said selected sequences having a selected priority level, and wherein processing a first one of said acquired well logging data is in response to the receipt of a first selected electrical output representative of the occurrence of a first selected event and according to a first one of said selected sequences of processing steps associated with said first selected event; and
controlling said receiving and processing in response to said selected electrical outputs such that said selected sequences of processing steps is appropriate for the well bore characteristics represented by said acquired well logging data, said controlling and processing including the steps of:
receiving a second selected electrical output upon the occurrence of a second selected event, said second event indicative of additional required processing of well logging data,
stopping said processing of said first one of said acquired well logging data in response to receiving said second selected electrical output, and storing information relating to the processing of data according to said first sequence of steps,
providing information relating to said second event in response to said received second selected electrical output, including the identification of the required sequence of processing steps necessary for said additional required processing and the selected priority level of said required sequence of steps,
comparing said selected priority level of said first sequence and said required sequence of steps according to a third sequence of steps for determining an execution order for said required sequence and said first sequence, and
processing of said well logging data according to said required sequence and said first sequence as determined by said execution order, said processing including retrieving, said stored information and resuming processing of said first well logging data according to said first sequence of steps.

2. The method of claim 1 wherein said step of receiving and processing includes transmitting control data to said well logging tool in response to the occurrence of at least one of said selected events, and according to one of said selected sequences of processing steps.

3. The method of claim 1 wherein one of said selected events represents well logging depth information.

4. The method of claim 1 wherein at least one of said selected events represents external request or commands.

5. The method of claim 1 wherein said step of receiving and processing includes storing said well logging data on a storage medium according to one of said selected sequences of processing steps.

6. The method of claim 1 wherein said step of receiving and processing includes displaying said well logging data on a display device according to one of said selected sequences of processing steps.

7. The method of claim 1 wherein at least one of said selected events may occur asynchronously.

8. The method of claim 1 wherein at least one of said selected events occurs external to any apparatus used to accomplish said receiving and processing step.

9. The method of claim 1 wherein at least one of said selected events occurs asynchronously and external to any apparatus used to accomplish said receiving and processing step.

10. The method of claim 1 wherein said receiving and processing step and said controlling step is accomplished with a general purpose computer.

11. The method of claim 10 wherein said sequences of steps are list of instructions for controlling said general purpose computer.

12. The method of claim 11 wherein at least one of said list of instructions includes instructions to control said computer to provide at least part of said acquired data to peripheral components of said computer.

13. The method of claim 11 and further comprising the step of providing a priority-structured queue for receiving said provided information relating to said second event, as well as other information relating to a selection of other events, and wherein said comparing step includes determining the highest priority information placed in said priority structured queue.

14. Apparatus for acquiring and processing well logging data which are representative of measurements provided by a well logging tool adapted for investigating characteristics of earth formations around a well bore comprising:
means for moving a well logging tool through a well bore;
measuring means supported by said well logging tool for acquiring well logging data relating to a selection of well bore characteristics and for providing selected electrical outputs from said measuring means representative of said acquired data;
means for receiving and processing said acquired well logging data according to selected sequences of processing steps for each of said selected well bore characteristics, each of said selected sequences having a selected priority level, and including means for processing a first one of said acquired well logging data in response to the receipt of a first selected electrical output representative of the occurrence of a first selected event and according to a first one of said selected sequences of processing steps associated with said first selected event; and
means for controlling said means for receiving and processing in response to said selected electrical outputs such that said selected sequences of processing steps is appropriate for the well bore characteristics represented by said acquired well logging data, and means for controlling and processing comprising:
means for receiving a second selected output upon the occurrence of a second selected event, said second event indicative of additional required processing of well logging data,
means for stopping said processing of said first one of said acquired well logging data in response to receiving said second selected electrical output, for storing information relating to the processing of data according to said first sequence of steps, and for providing information relating to said second event in response to said received second selected electrical output, which information includes the identification of the required sequence of processing steps necessary for said additional required processing and the selected priority level of said required sequence of steps, and means for comparing said selected priority level of said first sequence and said required sequence of steps according to a third sequence of steps for determining an execution order for said required sequence and said sequence such that said processing of said well logging data by said means for receiving and processing is according to said required sequence and said first sequence as determined by said execution order, said processing of said first sequence including retrieving said stored information and resuming processing of said first well logging data.

15. The apparatus of claim 14 and further including means for transmitting control data from said means for receiving and processing to said well logging tool in response to the occurrence of at least one of said selected events and according to one of said selected sequences of processing steps.

16. The apparatus of claim 14 and further including means for providing depth information as one of said selected events.

17. The apparatus of claim 14 and further includes means for storing said well logging data according to one of said selected sequences of processing steps.

18. The apparatus of claim 14 and further including means for displaying said well logging data according to one of said selected sequences of processing steps.

19. The apparatus of claim 14 wherein at least one of said selected events may occur asynchronously.

20. The apparatus of claim 14 wherein said means for receiving and processing and said means for controlling is a general purpose computer.

* * * * *